(12) United States Patent
Ito et al.

(10) Patent No.: US 7,672,920 B2
(45) Date of Patent: Mar. 2, 2010

(54) APPARATUS AND METHOD FOR EMBEDDING RECURRENT NEURAL NETWORKS INTO THE NODES OF A SELF-ORGANIZING MAP

(75) Inventors: Masato Ito, Tokyo (JP); Katsuki Minamino, Tokyo (JP); Yukiko Yoshiike, Tokyo (JP); Hirotaka Suzuki, Kanagawa (JP); Kenta Kawamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 593 days.

(21) Appl. No.: 11/699,428

(22) Filed: Jan. 30, 2007

(65) Prior Publication Data

US 2007/0185825 A1 Aug. 9, 2007

(30) Foreign Application Priority Data

Jan. 31, 2006 (JP) ............................. 2006-021804
Apr. 6, 2006 (JP) ............................. 2006-105545
Aug. 22, 2006 (JP) ............................. 2006-225203

(51) Int. Cl.
*G06N 5/00* (2006.01)
(52) U.S. Cl. .......................................... 706/30; 706/45
(58) Field of Classification Search ................... 706/30, 706/15, 25, 20, 45
See application file for complete search history.

(56) References Cited

U.S. PATENT DOCUMENTS 5,761,386 A * 6/1998 Lawrence et al. ............. 706/20
6,578,020 B1 * 6/2003 Nguyen ....................... 706/15
6,609,119 B1 * 8/2003 Meghlaoui ................... 706/25

* cited by examiner

*Primary Examiner*—Wilbert L Starks, Jr.
(74) *Attorney, Agent, or Firm*—Finnegan, Henderson, Farabow, Garrett & Dunner, L.L.P.

(57) ABSTRACT

A learning system is provided, which includes network storage means for storing a network including a plurality of nodes, each of which holds a dynamics; and learning means for self-organizationally updating the dynamics of the network on the basis of measured time-series data.

30 Claims, 29 Drawing Sheets

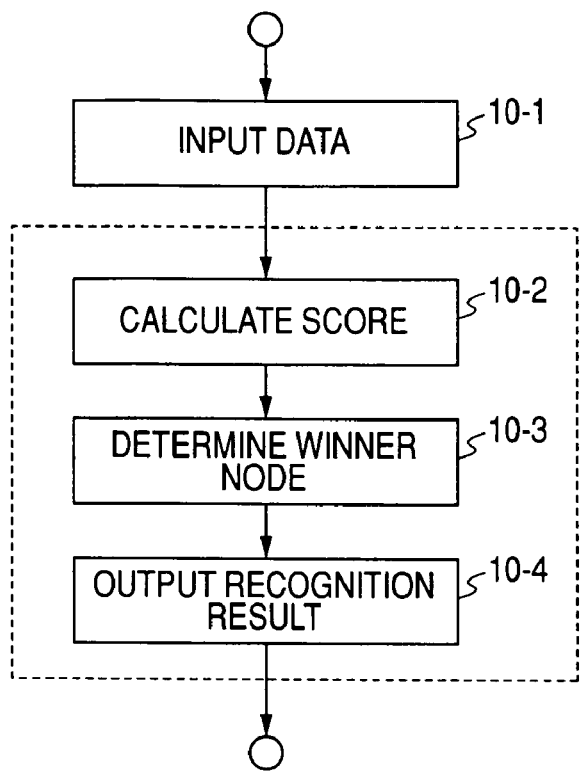
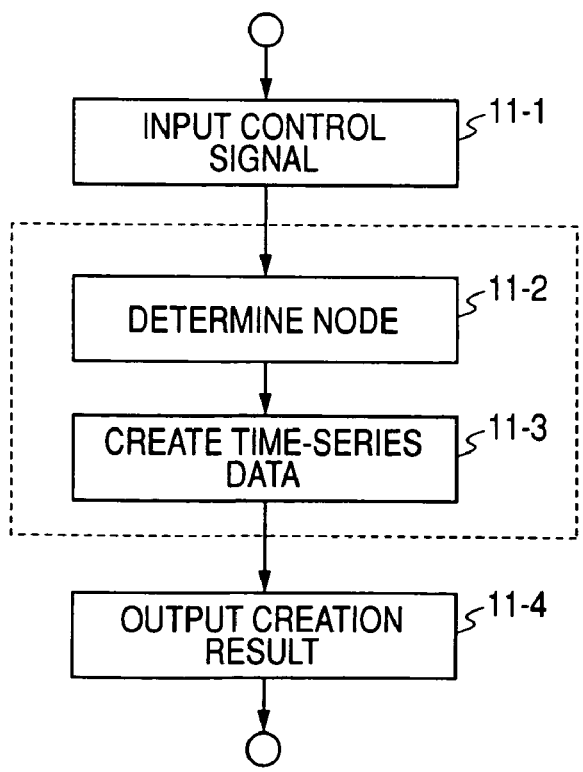

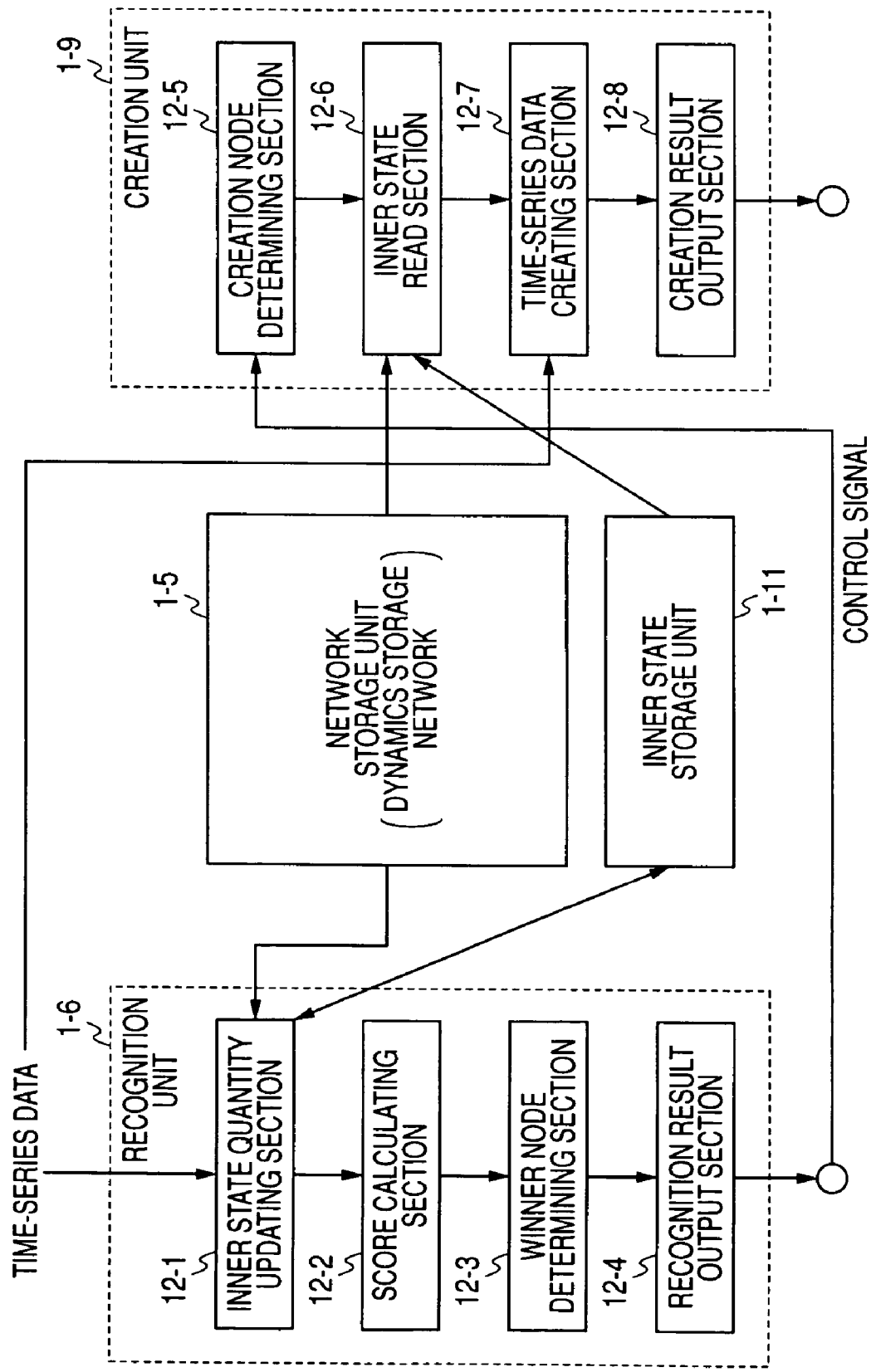

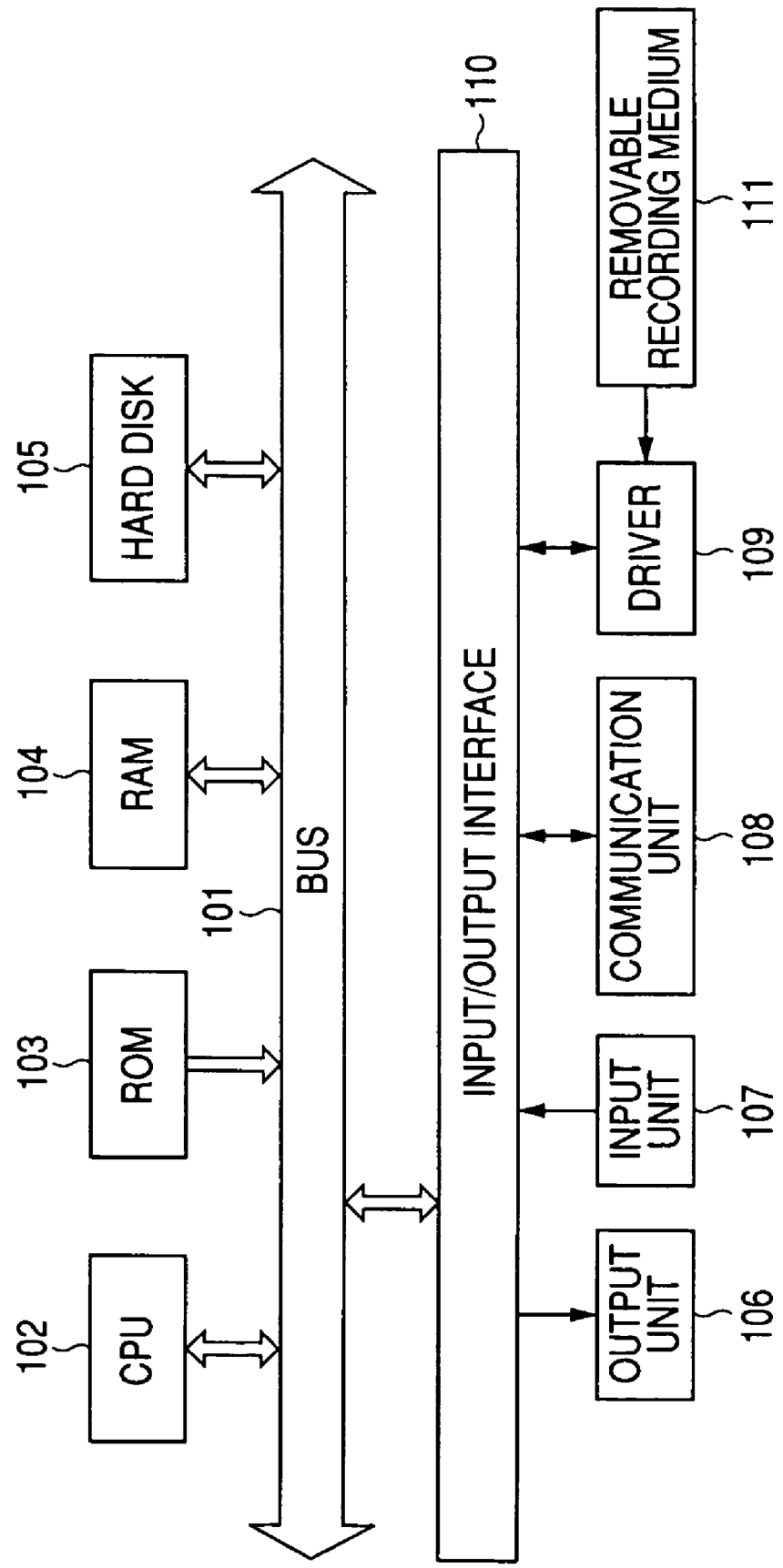

APPARATUS AND METHOD FOR EMBEDDING RECURRENT NEURAL NETWORKS INTO THE NODES OF A SELF-ORGANIZING MAP

CROSS REFERENCES TO RELATED APPLICATIONS

The present invention contains subject matter related to Japanese Patent Applications JP 2006-021804, JP 2006-105545 and JP 2006-225203 filed in the Japanese Patent Office on Jan. 31, 2006, Apr. 6, 2006 and Aug. 22, 2006, respectively, the entire contents of which are incorporated herein by reference.

BACKGROUND OF THE INVENTION

1. Field of the Invention

The present invention relates to learning system and method, recognition device and method, creation device and method, recognition and creation device and method, and programs, and more particularly, to learning system and method, recognition device and method, creation device and method, recognition and creation device and method, and programs, capable of autonomically learning a plurality of dynamics from measured time-series data and recognizing input time-series data are recognized or creating and outputting time-series data from a predetermined input on the basis of the learning result.

2. Description of the Related Art

It was known that actions (movements) of a system such as a robot can be described as dynamical systems determined by a rule of time evolution and the dynamical systems of various actions can be embodied by a specific attractor dynamics.

For example, a walking movement of a bipedal robot like a human being can be described in limit cycle dynamics in which a movement state of a system is secured to a certain specific cyclic orbit from a variety of initial states (for example, see G. Taga, 1998, "Self-organized control of bipedal locomotion by neural oscillators in unpredictable environment", Biological Cybernetics, 65, 147-159 (Non-patent Document 1) and Gentaro Taga, "Nonlinear Dynamical System and Development of Dynamical Design Movement and Recognition of Brain and Body", published by Kanekoshobo (Non-patent Document 2). A reaching movement of an arm robot like extending a hand to an object can be described in fixed-point dynamics in which the movement is secured to a certain fixed-point from a variety of initial states. It could be also said that all the movements can be embodied by a combination of a discrete movement describable in the fixed-point dynamics and a cyclic movement describable in the limit cycle dynamics.

When controlling actions (movements) of a system such as a robot by the use of the attractor dynamics, it is important, first, how to construct the attractor dynamics depending on the tasks and second, that a corresponding motor power is created in accordance with the attractor dynamics on the basis of information acquired from an input to a sensor. In order to solve the important points, it is necessary to create action outputs (movement outputs) of the system so that the attractor dynamics continuously interact with environments.

There has been suggested a method of learning such attract dynamics instead of a person's design. For example, a method using a recurrent neural network (hereinafter, referred to as RNN) is known. As the RNN, a network which has a context unit coupled to the network in a feedback loop and which can theoretically approximate a dynamical system by holding an inner state therein is known. However, in a learning model including a network module coupled densely, when a plurality of dynamics necessary for learning a large scale of actions is learned, the interference between dynamics to be stored is too large, thereby making the learning difficult. Accordingly, there have been suggested several learning models employing a modular architecture in which a set of a plurality of network modules constitutes a learning model. In the modular architecture, the number of dynamics to be stored can be easily increased by increasing the number of modules in principle, but there is a problem with a module selection determining with which module to learn a given learning sample.

The method of performing the module selection is classified into two methods of a supervised learning method in which a person determines to which module the learning sample (learning data) should be assigned and an unsupervised learning method in which a learning model autonomically determines the module. In order for a robot or a system to autonomically perform a learning operation, it is necessary to perform a learning operation of a module by the use of the unsupervised learning method.

As an example of the module learning method, there has been suggested a learning model called a mixture of RNN expert (for example, see JP-A-11-126198 (Patent Document 1)). In the learning model, outputs of a plurality of RNN modules are integrated in a gate mechanism to determine the final output and the learning of the RNN modules is performed while adjusting the gate mechanism by the use of a maximum likelihood estimation method. However, in the method based on such entire optimization, there is a problem in that it is difficult to perform the learning operation when the number of modules is great. On the contrary, in methods using a self-organization map (hereinafter, referred to as SOM) (for example, see T. Kohonen, "Self-organization Map", published by Springer Verlag, Tokyo (Non-patent Document 3)) used to learn a category of a vector pattern or neural-gas (for example, see T. M. Martinetz, S. G. Berkovich, K. J. Schulten, ""Neural-Gas" Network for Vector Quantization and its Application to Time-Series Prediction", IEEE Trans. Neural Networks, VOL. 4, No. 4, pp. 558-569, 1999 (Non-patent Document 4)), it is known that a learning rule based on the entire optimization is not used and thus the optimization is not ensured, but an appropriate category architecture can be self-organizationally learned in an unsupervised learning manner. In the methods, it is possible to practically perform the learning even when the number of modules is great.

SUMMARY OF THE INVENTION

The applicant of the present invention has suggested a model for learning a time-series pattern instead of a vector pattern (Japanese Patent Application No. 2004-353382 (JP-A-2006-162898)).

However, there has not been suggested a method of continuously recognizing an external input or continuously creating time-series data from the external input on the basis of the learning of dynamics or a plurality of learned dynamics.

In view of the above-mentioned situations, there is a need for learning a plurality of dynamics necessary for learning large-scaled actions (motions) of a robot and continuously recognizing an input from an external environment or creating time-series data from the input on the basis of the plurality of dynamics stored by learning.

According to a first embodiment of the invention, there is provided a learning system including: network storage means for storing a network including a plurality of nodes, each of which holds a dynamics; and learning means for self-organizationally updating the dynamics of the network on the basis of measured time-series data.

A learning method or program according to the first embodiment of the invention includes the step of: self-organizationally updating dynamics of a network including a plurality of nodes, each of which holds a dynamics, on the basis of measured time-series data.

In the learning system, the learning method, and the program according to the first embodiment, the dynamics of the network including a plurality of nodes, each of which holds a dynamics, are updated on the basis of the measured time-series data.

According to a second embodiment of the invention, there is provided a recognition device including: network storage means for storing a network including a plurality of nodes, in which a dynamical approximate model having an inner state quantity is set as a node and a dynamics is held in each node; and recognition means for determining a winner node which is a node holding the dynamics most suitable for measured time-series data while updating the inner state quantity on the basis of the measured time-series data, and outputting information indicating the winner node as a recognition result of the measured time-series data.

A recognition method or program according to the second embodiment of the invention includes the step of: determining a winner node which is a node holding the dynamics most suitable for measured time-series data while updating the inner state quantity on the basis of the measured time-series data, among nodes of a network including a plurality of nodes in which a dynamical approximate model having an inner state quantity is set as a node and a dynamics is held in each node, and outputting information indicating the winner node as a recognition result of the measured time-series data.

In the recognition device, the recognition method, and the program according to the second embodiment, a winner node which is a node holding the dynamics most suitable for measured time-series data, among nodes of a network including a plurality of nodes in which a dynamical approximate model having an inner state quantity is set as a node and a dynamics is held in each node, is determined while updating the inner state quantity on the basis of the measured time-series data, and information indicating the winner node is output as a recognition result of the measured time-series data.

According to a third embodiment of the invention, there is provided a creation device including: network storage means for storing a network including a plurality of nodes, in which a dynamical approximate model having an inner state quantity is set as a node and a dynamics is held in each node; and creation means for determining a creation node which is a node used to create time-series data and creating the time-series data while updating the inner state quantity of the creation node.

A creation method or program according to the third embodiment of the invention includes the step of: determining a creation node which is a node used to create time-series data, among nodes of a network including a plurality of nodes in which a dynamical approximate model having an inner state quantity is set as a node and a dynamics is held in each node, and creating the time-series data while updating the inner state quantity of the creation node.

In the creation device, the creation method, and the program according to the third embodiment, a creation node which is a node used to create time-series data, among nodes of a network including a plurality of nodes in which a dynamical approximate model having an inner state quantity is set as a node and a dynamics is held in each node, is determined and the time-series data are created while updating the inner state quantity of the creation node.

According to a fourth embodiment of the invention, there is provided a recognition and creation device including: network storage means for storing a network including a plurality of nodes, in which a dynamical approximate model having an inner state quantity is set as a node and a dynamics is held in each node; recognition means for determining a winner node which is a node holding the dynamics most suitable for measured time-series data while updating the inner state quantity on the basis of the measured time-series data, and outputting information indicating the winner node as a recognition result of the measured time-series data; inner state storage means for storing the inner state quantity acquired in determining the winner node; and creation means for determining the winner node as a creation node which is a node used to create time-series data on the basis of the recognition result, determining the inner state quantity of the creation node on the basis of the value stored in the inner state storage means, and creating the time-series data while updating the inner state quantity of the creation node.

A recognition and creation method or program according to the fourth embodiment of the invention includes the steps of: determining a winner node which is a node holding the dynamics most suitable for measured time-series data while updating the inner state quantity on the basis of the measured time-series data, among nodes of a network including a plurality of nodes in which a dynamical approximate model having an inner state quantity is set as a node and a dynamics is held in each node, and outputting information indicating the winner node as a recognition result of the measured time-series data; storing the inner state quantity acquired in determining the winner node in inner state storage means; and determining the winner node as a creation node which is a node used to create time-series data on the basis of the recognition result, determining the inner state quantity of the creation node on the basis of the value stored in the inner state storage means, and creating the time-series data while updating the inner state quantity of the creation node.

In the recognition and creation device, the recognition and creation method, and the program according to the fourth embodiment of the invention, a winner node which is a node holding the dynamics most suitable for measured time-series data, among nodes of a network including a plurality of nodes in which a dynamical approximate model having an inner state quantity is set as a node and a dynamics is held in each node, is determined while updating the inner state quantity on the basis of the measured time-series data, and information indicating the winner node is output as a recognition result of the measured time-series data. The inner state quantity acquired in determining the winner node is stored in inner state storage means and the winner node is determined as a creation node which is a node used to create time-series data on the basis of the recognition result. The inner state quantity of the creation node is determined on the basis of the value stored in the inner state storage means, and the time-series data are created while updating the inner state quantity of the creation node.

According to the first embodiment of the invention, it is possible to autonomically learn a plurality of dynamics from the time-series data.

According to the second embodiment of the invention, it is possible to recognize the input time-series data on the basis of the learning result of autonomically learning a plurality of dynamics from the time-series data.

According to the third embodiment of the invention, it is possible to create and output time-series data relative to a predetermined input on the basis of the learning result of autonomically learning a plurality of dynamics from the time-series data.

According to the fourth embodiment of the invention, it is possible to recognize the input time series data on the basis of the learning result of autonomically learning a plurality of dynamics from the time-series data and to create and output time-series data on the basis of the recognition result.

BRIEF DESCRIPTION OF THE DRAWINGS

FIG. 10 is a flowchart illustrating a flow of a recognition process.

FIG. 11 is a flowchart illustrating a flow of a creation process.

FIG. 12 is a block diagram illustrating exemplary configurations of recognition unit 1-6 and creation unit 1-9 when performing a recognition and creation process in consideration of an inner state quantity.

FIG. 31 is a block diagram illustrating a configuration of a computer according to an embodiment of the invention.

DETAILED DESCRIPTION OF PREFERRED EMBODIMENTS

Figure 1:
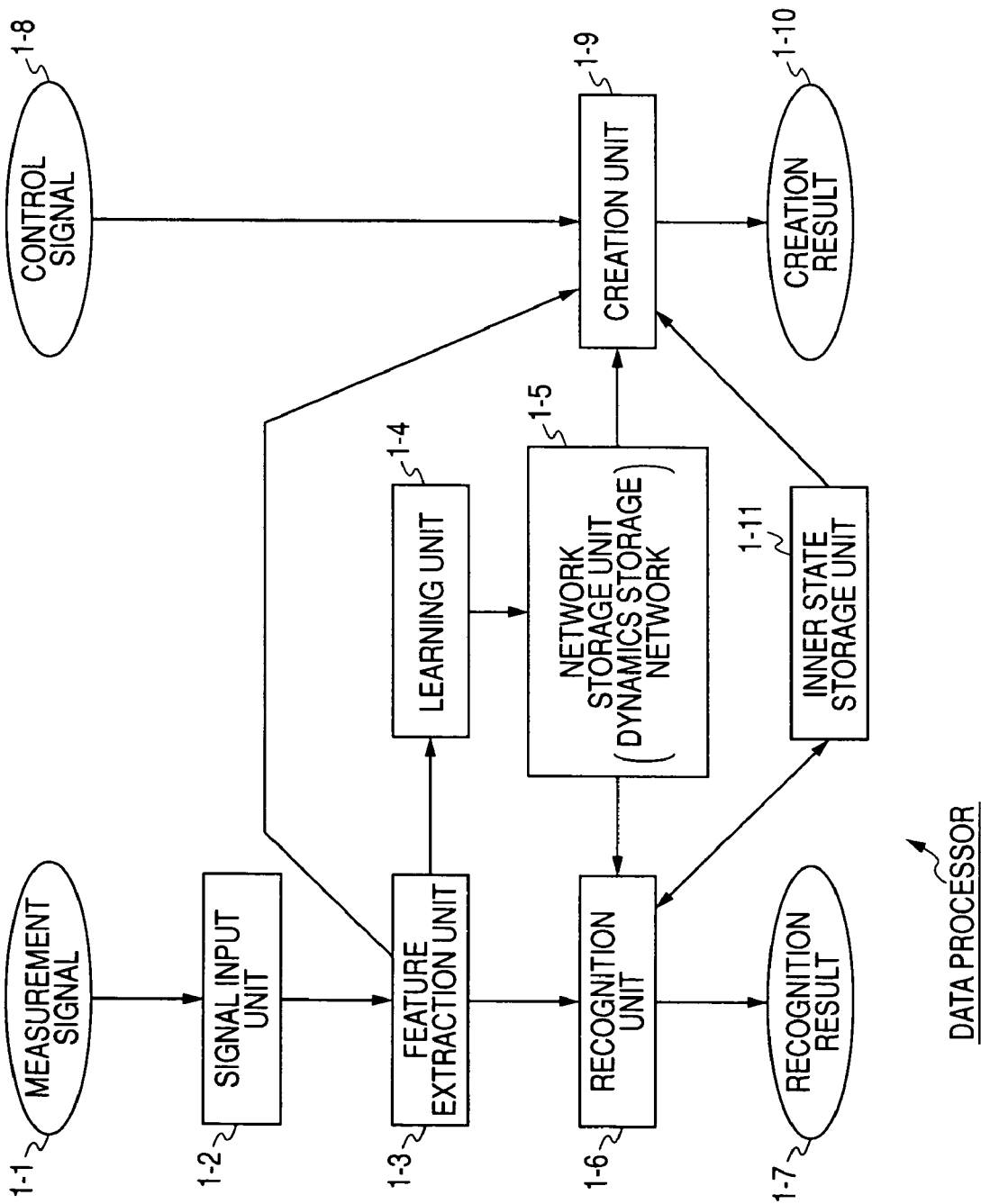
FIG. 1 is a block diagram illustrating a configuration of a data processor according to an embodiment of the invention.

Embodiments of the invention will be described below, in which correspondence of constituent requirements of the invention to the embodiments described or shown in the specification or the drawings is as follows. This description is to confirm that the embodiments supporting the invention are described or shown in the specification or the drawings. Accordingly, even when any embodiment described in the specification or the drawings but not described as the embodiments corresponding to the constituent requirements of the invention exist, it does not means that the embodiment does not correspond to the constituent requirements. On the contrary, even when an embodiment is described as corresponding to the constituent requirements of the invention, it does not mean that the embodiment does not correspond to constituent requirements other than the constituent requirements of the invention.

The learning system according to the first embodiment of the invention includes: network storage means (for example, network storage unit 1-5 in FIGS. 1 and 21) for storing a network including a plurality of nodes, each of which holds a dynamics; and learning means (for example, learning unit 1-4 in FIG. 1 or learning unit 21-4 in FIG. 21) for self-organizationally updating the dynamics of the network on the basis of measured time-series data.

In the learning system according to the first embodiment of the invention, learning data storage means (for example, learning data storage unit 6-2 in FIG. 6) for storing learning data corresponding to the dynamics held by the respective nodes may be further provided, and the learning means may update the learning data by mixing the measured time-series data with the learning data stored in the learning data storage means and may update the dynamics on the basis of the updated learning data.

The recognition device according to the second embodiment of the invention includes: network storage means (for example, network storage unit 1-5 in FIGS. 1 and 21) for storing a network including a plurality of nodes, in which a dynamical approximate model having an inner state quantity is set as a node and a dynamics is held in each node; and recognition means (for example, recognition unit 1-6 in FIGS. 1 and 21) for determining a winner node which is a node holding the dynamics most suitable for measured time-series data while updating the inner state quantity on the basis of the measured time-series data, and outputting information indicating the winner node as a recognition result of the measured time-series data.

The creation device according to the third embodiment of the invention includes: network storage means (for example, network storage unit 1-5 in FIGS. 1 and 21) for storing a network including a plurality of nodes, in which a dynamical approximate model having an inner state quantity is set as a node and a dynamics is held in each node; and creation means (for example, creation unit 1-9 in FIGS. 1 and 21) for determining a creation node which is a node used to create time-series data and creating the time-series data while updating the inner state quantity of the creation node.

The recognition and creation device according to the fourth embodiment of the invention includes: network storage means (for example, network storage unit 1-5 in FIG. 12) for storing a network including a plurality of nodes, in which a dynamical approximate model having an inner state quantity is set as a node and a dynamics is held in each node; recognition means (for example, recognition unit 1-6 in FIG. 12) for determining a winner node which is a node holding the dynamics most suitable for measured time-series data while updating the inner state quantity on the basis of the measured time-series data, and outputting information indicating the winner node as a recognition result of the measured time-series data; inner state storage means (for example, inner state storage unit 1-11 in FIG. 12) for storing the inner state quantity acquired in determining the winner node; and creation means (for example, creation unit 1-9 in FIG. 12) for determining the winner node as a creation node which is a node used to create time-series data on the basis of the recognition result, determining the inner state quantity of the creation node on the basis of the value stored in the inner state storage means, and creating the time-series data while updating the inner state quantity of the creation node.

Figure 7:
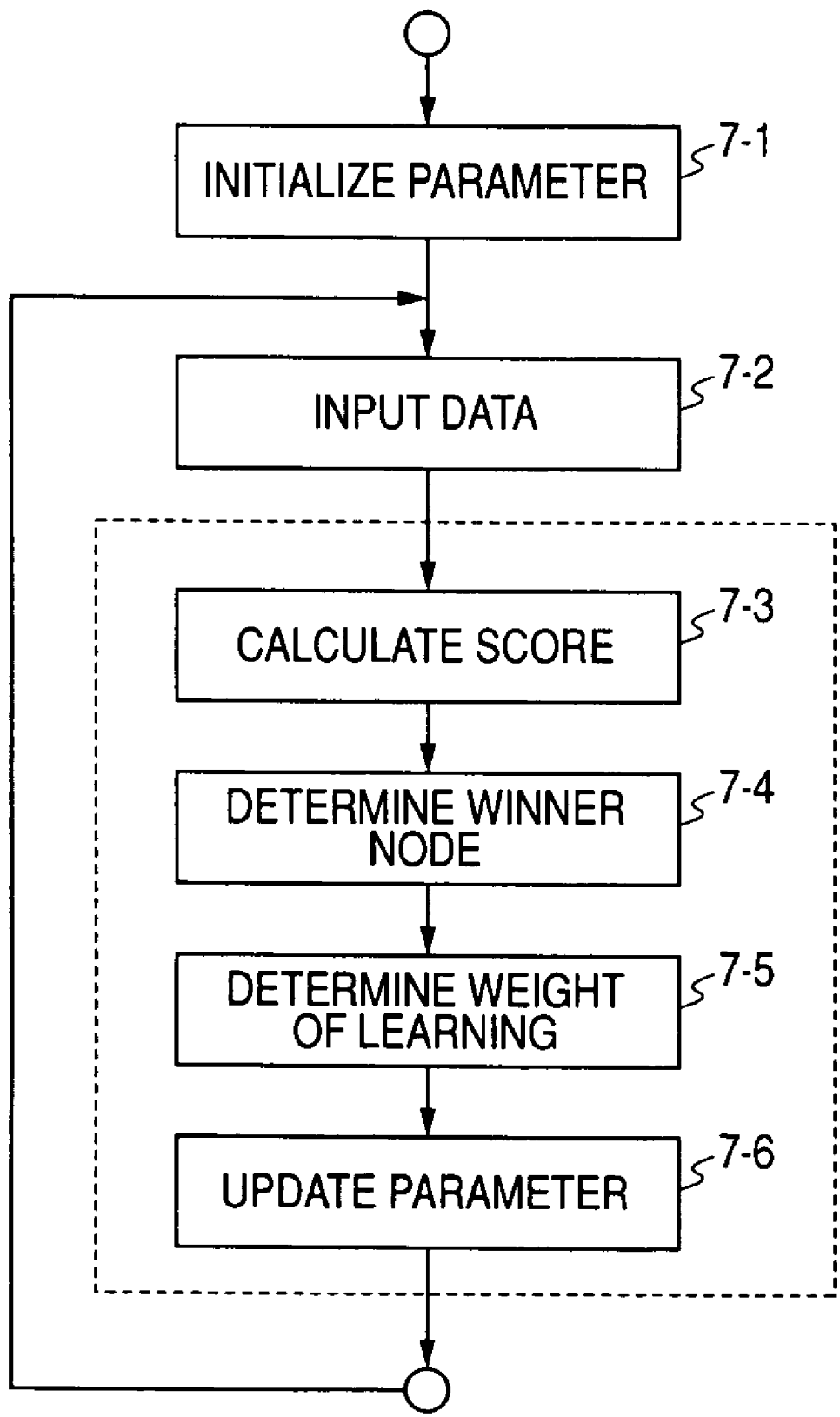
FIG. 7 is a flowchart illustrating a flow of a learning operation.
Figure 23:
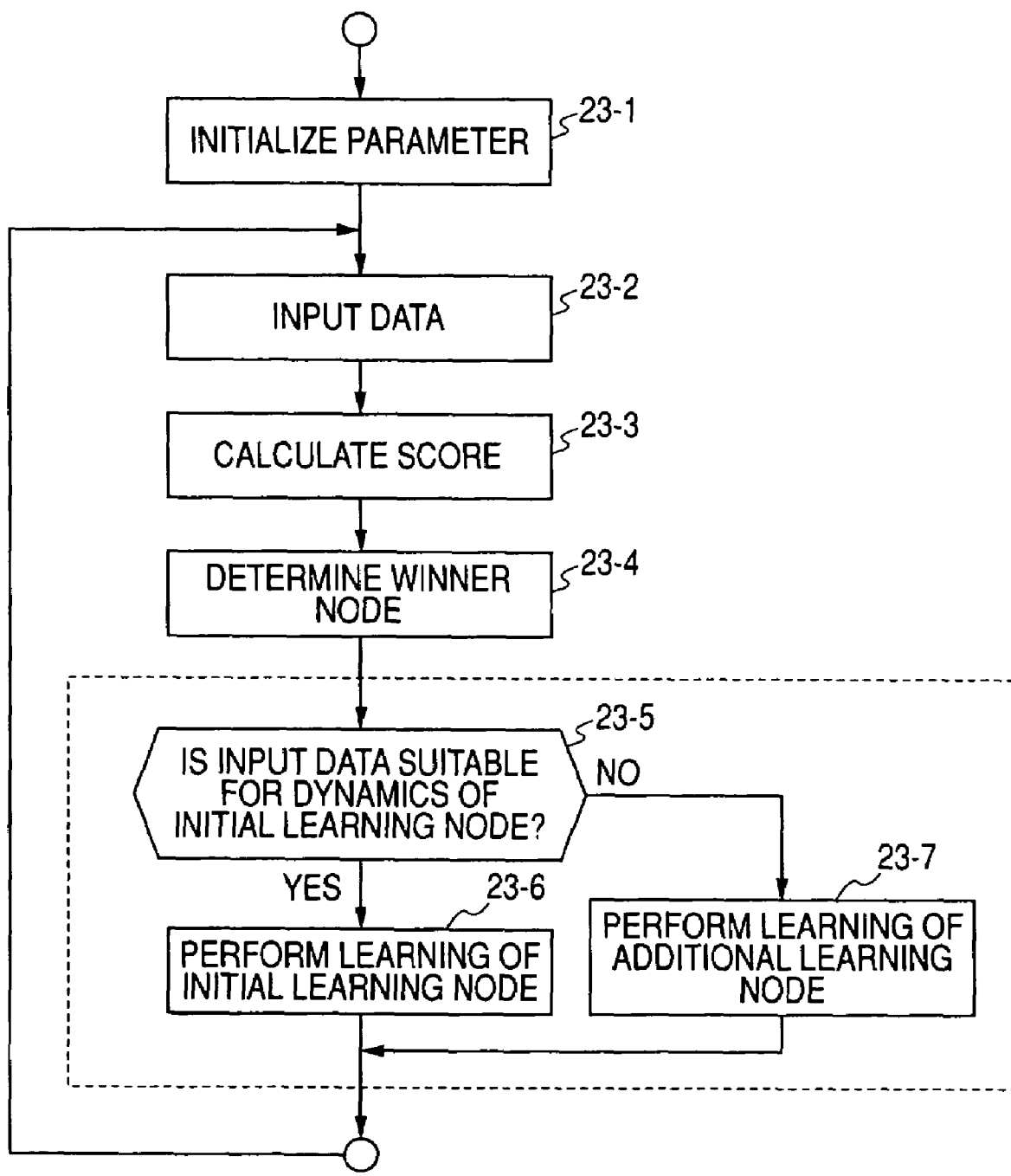
FIG. 23 is a flowchart illustrating a flow of a learning process performed to the network correlated with an additional learning function.

The learning method or program according to the first embodiment of the invention includes the step of: self-organizationally updating dynamics of a network including a plurality of nodes, each of which holds a dynamics, on the basis of measured time-series data (for example, steps 7-3 to 7-6 in FIG. 7 and step 23-6 in FIG. 23).

The recognition method or program according to the second embodiment of the invention includes the step of: determining a winner node which is a node holding the dynamics most suitable for measured time-series data while updating the inner state quantity on the basis of the measured time-series data, among nodes of a network including a plurality of nodes in which a dynamical approximate model having an inner state quantity is set as a node and a dynamics is held in each node, and outputting information indicating the winner node as a recognition result of the measured time-series data (for example, steps 10-2 to 10-4 in FIG. 10).

The creation method or program according to the third embodiment of the invention includes the step of: determining a creation node which is a node used to create time-series data, among nodes of a network including a plurality of nodes in which a dynamical approximate model having an inner state quantity is set as a node and a dynamics is held in each node, and creating the time-series data while updating the inner state quantity of the creation node (for example, steps 11-2 and 11-3 in FIG. 11).

Figure 14:
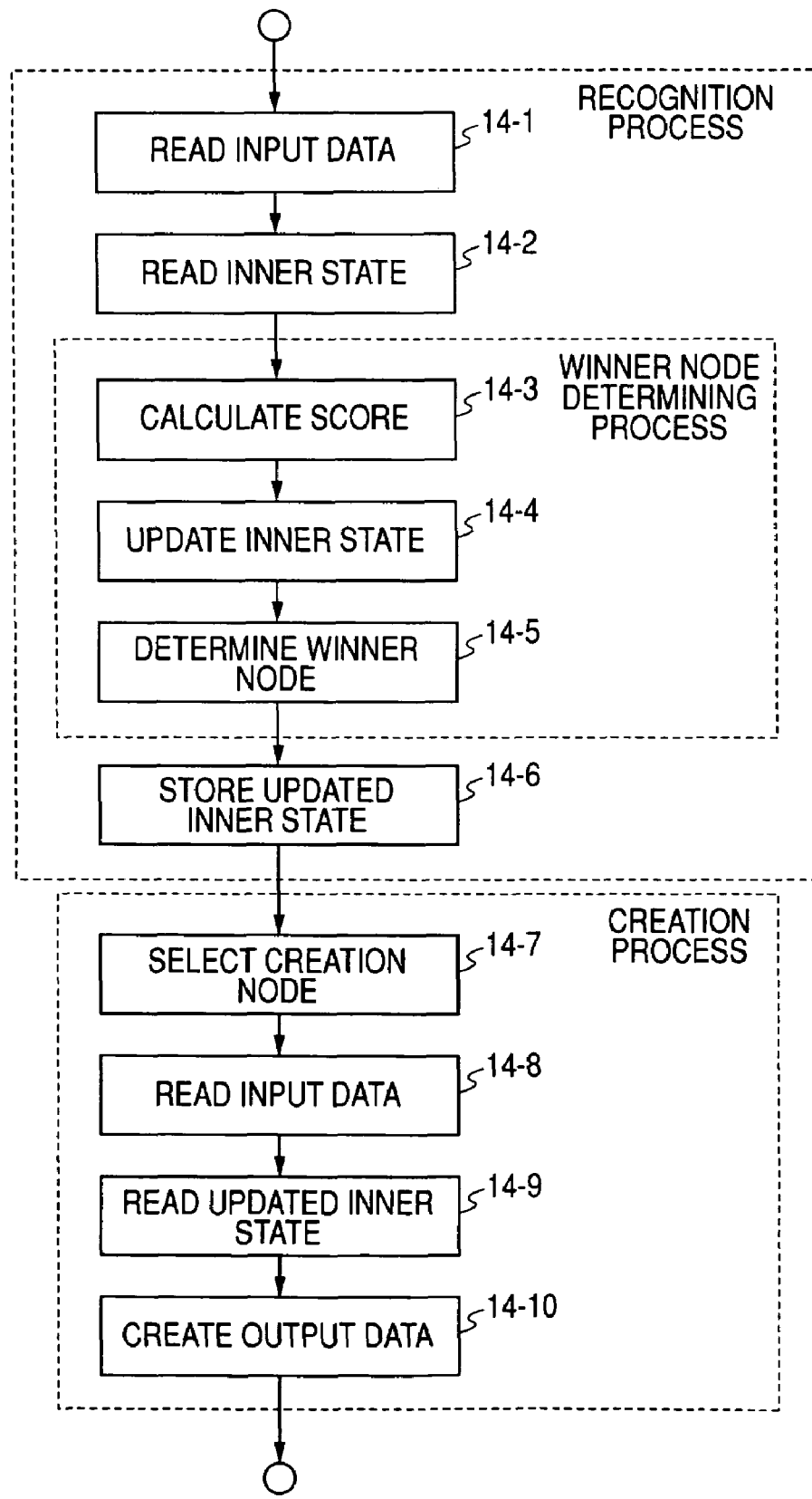
FIG. 14 is a flowchart illustrating a flow of a recognition and creation process.
Figure 16:
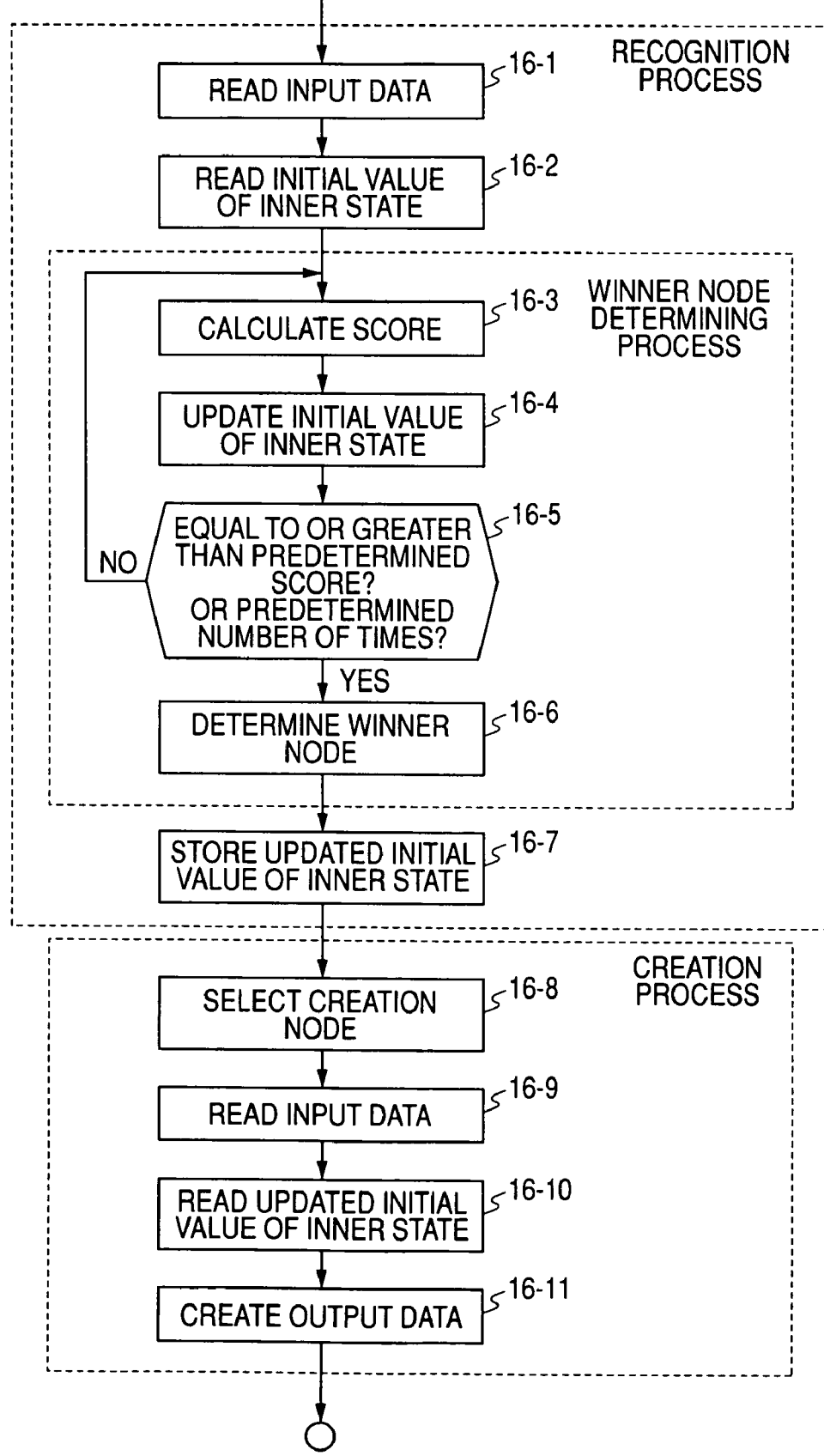
FIG. 16 is a flowchart illustrating a flow of a recognition and creation process.

The recognition and creation method or program according to the fourth embodiment of the invention includes the steps of: determining a winner node which is a node holding the dynamics most suitable for measured time-series data while updating the inner state quantity on the basis of the measured time-series data, among nodes of a network including a plurality of nodes in which a dynamical approximate model having an inner state quantity is set as a node and a dynamics is held in each node, and outputting information indicating the winner node as a recognition result of the measured time-series data (for example, steps 14-3 to 14-5 in FIG. 14 and steps 16-3 to 16-6 in FIG. 16); storing the inner state quantity acquired in determining the winner node in inner state storage means (for example, step 14-6 in FIG. 14 and step 16-7 in FIG. 16); and determining the winner node as a creation node which is a node used to create time-series data on the basis of the recognition result, determining the inner state quantity of the creation node on the basis of the value stored in the inner state storage means, and creating the time-series data while updating the inner state quantity of the creation node (for example, steps 14-7 to 14-10 in FIG. 14 and steps 16-8 to 16-11 in FIG. 16).

FIG. 1 is a block diagram illustrating a configuration of a data processor according to an embodiment of the present invention.

The data processor shown in FIG. 1 includes network storage unit 1-5 storing a dynamic storage network in which a dynamical approximate model having an inner state quantity among dynamical approximate models which approximate a dynamical system is set as a node and learning unit 1-4 self-organizationally learning parameters of the dynamics storage network. Dynamical characteristics of time-series data are stored as dynamics in the respective node of the dynamics storage network. The dynamics which are defined by the parameters learned by learning unit 1-4 and which are stored and held in the nodes of the dynamics storage network are used to recognize or create time-series data.

The data processor shown in FIG. 1 is used to recognize or create control signals of robots, manipulator systems, pan tilt cameras, ships, airplanes, vehicles, and other electronic apparatuses. Specifically, the data processor is used to learn, recognize, and create input and output signals of sensors and motors in autonomic systems such as autonomic robots.

In the data processor shown in FIG. 1, measurement signal 1-1 measurable is input to signal input unit 1-2. Examples of measurement signal 1-1 can include a sound signal, an image signal, brightness of a light emitting diode, and a rotation angle or an angular velocity of a motor and may be signals input to a system and signals output from the system.

Signal input unit 1-2 outputs an electrical signal corresponding to measured measurement signal 1-1. Specifically, signal input unit 1-2 corresponds to a microphone when measurement signal 1-1 is a sound signal and corresponds to a camera when measurement signal 1-1 is an image signal. An instrument of measuring a rotation angle or a rotation speed of a motor corresponds to signal input unit 1-2.

Here, measurement signal 1-1 can include signals output from signal input unit 1-2, in addition to signals input to signal input unit 1-2. Measurement signal 1-1 can include a non-static signal varying with time as well as a static signal.

Hereinafter, a sensor motor signal (for example, a vector using a signal output from a sensor or a signal (a control signal controlling a motor) input to a motor as a component) in a robot system is mainly described as an example of measurement signal 1-1.

In the following description, as the sensor motor signal, a signal of an interval detected as a process target by an interval detector is output from signal input unit 1-2.

However, measurement signal 1-1 is not limited to the sensor motor signal. That is, any input/output time-series signal related to the system can be employed as measurement signal 1-1.

As for the interval of a signal, a signal blocked in an appropriate length can be input and the blocking method is not particularly limited. Accordingly, a signal blocked in a length most suitable for measurement signal 1-1 can be input to signal input unit 1-2.

Feature extraction unit 1-3 extracts a feature from measurement signal 1-1 input to signal input unit 1-2. For example, a sound signal which is one of a sensor signal is subjected to frequency analysis with a constant interval of time and features such as melCepstrum are extracted in a time series.

Here, the melCepstrum is a feature widely used in voice recognition. The time-series data having a feature obtained by allowing feature extraction unit 1-3 to extract the feature from measurement signal 1-1 in a time series are sent to learning unit 1-4, recognition unit 1-6, or creation unit 1-9, as needed.

Learning unit 1-4 updates parameters of the dynamics storage network stored in network storage unit 1-5 by the use of the time-series data sent from feature extraction unit 1-3.

The updating of parameters may be called learning.

Although details of the learning by learning unit 1-4 will be described in detail, an unsupervised learning operation self-organizationally acquiring a specific dynamics is performed by repeatedly labeling the time-series data having no label. As a result, representative dynamics are efficiently stored in the dynamics storage network. The dynamics stored in the dynamics storage network can be used at any time by recognition unit 1-6 or creation unit 1-9.

Hereinafter, data sent from feature extraction unit 1-3 are called time-series data and data stored in the dynamics storage network are called dynamics.

Here, a dynamics indicates a dynamical system varying with time and can be expressed by, for example, a specific function. Time-varying features of the time-series data are stored as the dynamics in the dynamics storage network.

Recognition unit 1-6 compares the dynamics stored in the dynamics storage network by learning up to now with the time series data sent from feature extraction unit 1-3, determines the dynamics most similar to the time-series data from the feature extraction unit 1-3, and outputs the determination result as recognition result 1-7.

On the other hand, time-series data can be created from the dynamics stored in the dynamics storage network as needed. Creation unit 1-9 performs the process of creating the time-series data.

Creation unit 1-9 first receives control signal 1-8 indicating from which dynamics the time-series data should be created and creates the time-series data from the dynamics indicated by control signal 1-8. The time-series data created by creation unit 1-9 are output as creation result 1-10.

Inner state storage unit 1-11 stores an inner state quantity of the dynamics storage network. The inner state quantity stored in inner state storage unit 1-11 is updated, for example, by recognition unit 1-6 and is used for a creation process of creation unit 1-9.

Hitherto, the entire configuration has been described schematically. Learning unit 1-4 and the dynamics storage network will be described now in detail. Learning (Initial Learning) A learning operation can be divided into a supervised learning operation and an unsupervised learning operation. Learning unit 1-4 performs the unsupervised learning operation of time-series data, but the supervised learning operation is described before describing the unsupervised learning operation.

Figure 2:
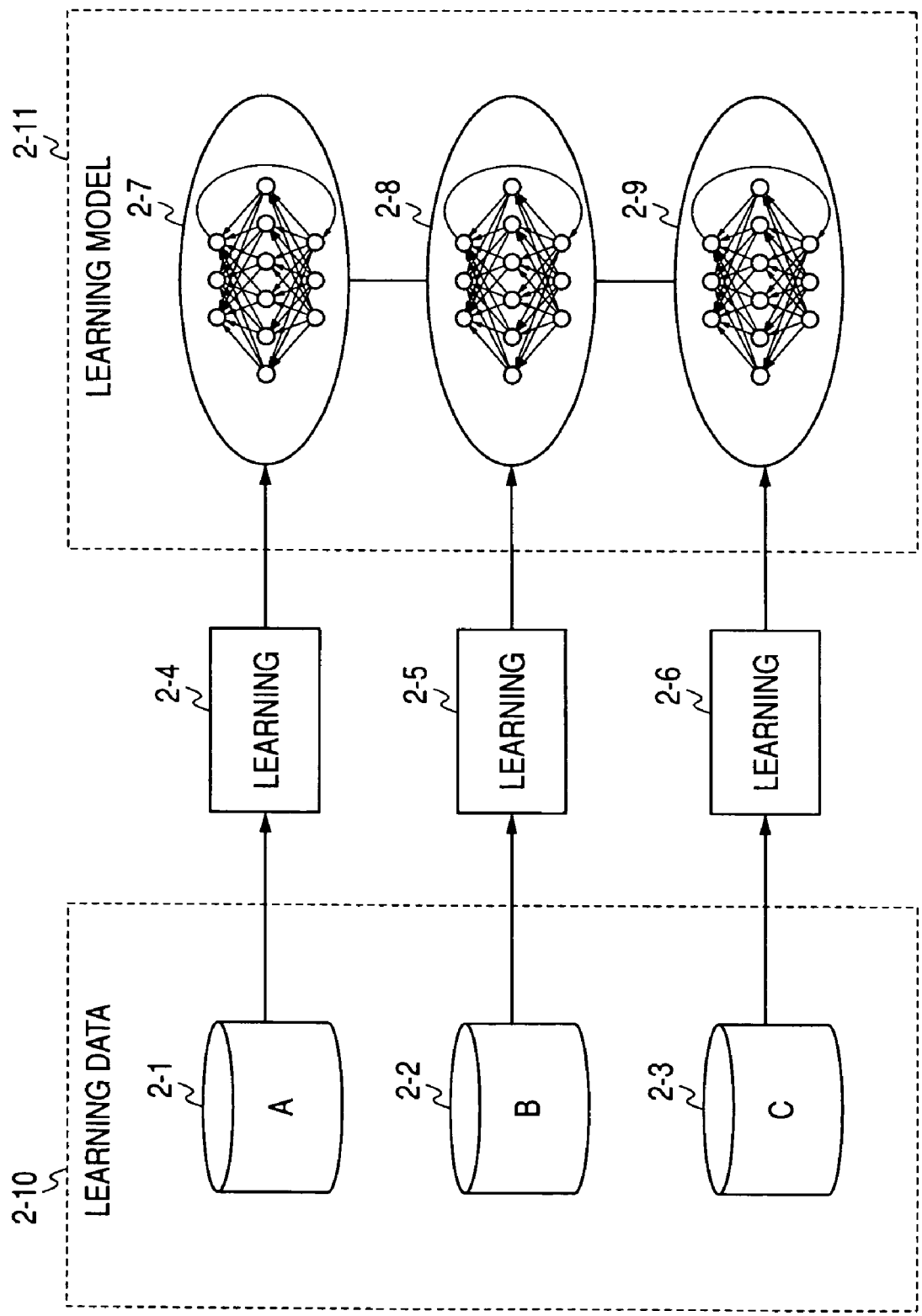
FIG. 2 is a diagram illustrating a supervised learning operation.

FIG. 2 illustrates an example of a method of learning the time-series data in a supervised learning operation.

First, learning data which are time-series data used for learning are prepared for each category. For example, when sensor motor signals of tasks "A", "B", and "C" are learned, a plurality of sensor motor signals corresponding to the tasks are prepared. Here, the sensor motor signal of task "A" is a time-series vector which contains a time-series sensor signal output from a sensor of a robot and a time-series motor signal for driving a motor so as to allow the robot to do an action of task "A" as components, for example, when the robot performs task "A." The sensor motor signals of tasks "B" and "C" are similar.

In FIG. 2, learning data 2-1 is a sensor motor signal of category (task) "A" and learning data 2-2 is a sensor motor signal of category "B." Learning data 2-3 is a sensor motor signal of category "C."

A model used for the learning operation is prepared for each category. For example, an RNN is used as the model.

In FIG. 2, model 2-7 is a model of category "A" (a model corresponding to category "A ") and model 2-8 is a model of category "B." Model 2-9 is a model of category "C."

The learning (updating) of a parameter in a model is performed using only the corresponding learning data. For example, the learning of model (learning model) 2-7 of category "A" is performed using learning data 2-1 corresponding to category "A." The same is true of categories "B" and "C".

In the supervised learning operation, the corresponding learning data should be necessarily given to the respective categories so as to perform the learning operation for each category, while a model may be constructed for each category.

Figure 3:
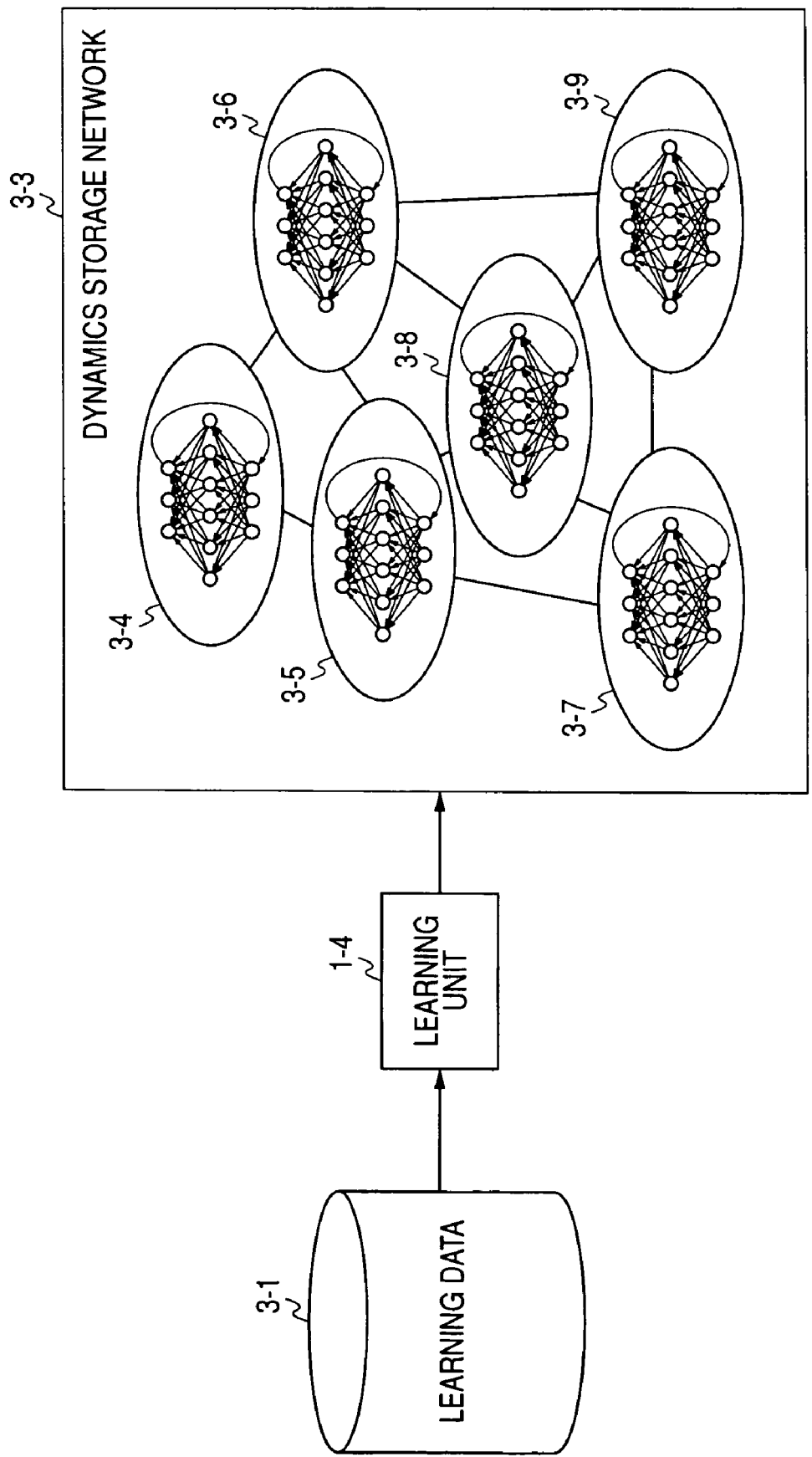
FIG. 3 is a diagram illustrating a learning operation in learning unit 1-4.

On the contrary, FIG. 3 illustrates an example of a learning method of the unsupervised learning operation performed by learning unit 1-4.

First, the unsupervised learning operation is greatly different from the supervised operation shown in FIG. 2, in that it is not known which category data are included in learning data 3-1 and the number of categories is not known.

A label (information indicating which category data belongs to) is not given to the respective data included in learning data 3-1. Accordingly, the supervised operation shown in FIG. 2 cannot be performed using learning data 3-1.

Therefore, a dynamics storage network is introduced. The dynamics storage network is a network including a plurality of nodes, each of which holds a dynamics.

In this embodiment, it is assumed that the dynamics held in a node of the dynamics storage network is modeled, for example, by a dynamical approximate model having an inner state quantity. In this case, the dynamics storage network is a network (a network including nodes holding (storing) a dynamical approximate model having an inner state quantity) in which a dynamical approximate model having an inner state quantity is set as a node.

A model having an inner state quantity is a model having an inner state quantity indicating an inner state of the model which cannot be measured from the outside, independently of an input and an output which can be measured from the outside, when a model providing an output depending on an input is assumed. In the model having an inner state quantity, since an output is required using the inner state quantity in addition to the input, a different output is provided when the same input and different inner state quantities are provided.

In FIG. 3, dynamics storage network 3-3 includes 6 nodes 3-4 to 3-9.

Learning unit 1-4 performs a learning operation so as to appropriately express a feature of learning data 3-1 by the use of the whole of dynamics storage network 3-3. The learning operation is self-organizationally performed in the nodes 3-4 to 3-9 of dynamics storage network 3-3. This learning operation corresponds to the unsupervised learning operation.

Here, it should be noted in the dynamics storage network that one node does not necessarily correspond to one category. To the contrary, it can be considered that a plurality of nodes constitutes one category. For example, when 3 categories of categories "A", "B", and "C" are included in learning data 3-1, each of categories "A", "B", and "C" may be learned by a plurality of nodes. Even when the categories of data included in learning data 3-1 cannot be clearly distinguished (a person cannot identify the category), the learning operation can be performed.

The dynamics storage network is a network including a plurality of nodes. Each node is used to hold a time-series pattern (pattern of time-series data) as dynamics. A node and a node have a correlation. The correlation is called a link. In dynamics storage network 3-3 shown in FIG. 3, for example, node 3-4 is correlated with node 3-5 and correlated with node 3-6. The correlations correspond to links.

Figure 4:
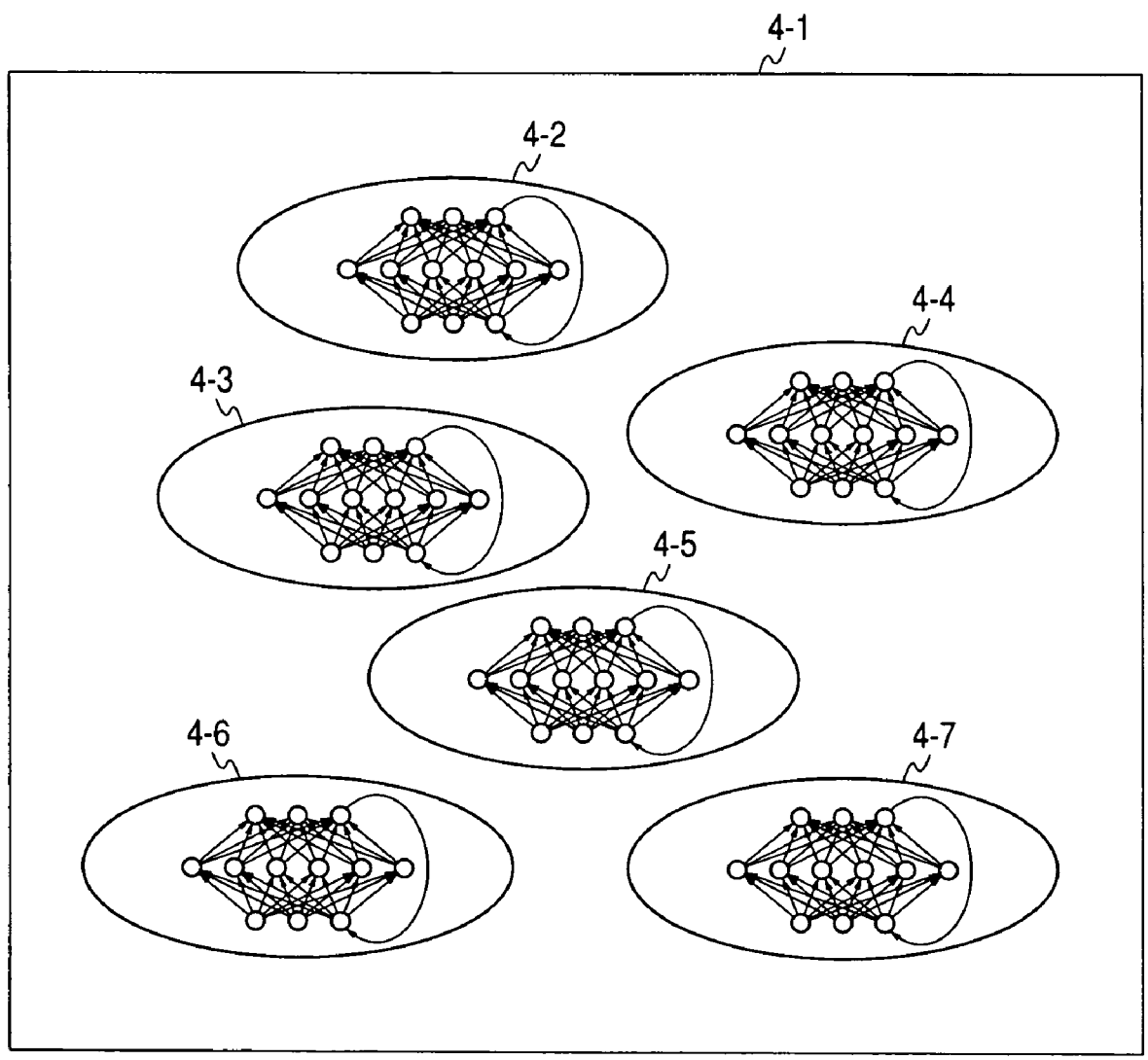
FIG. 4 is a diagram illustrating an example of a dynamics storage network.
Figure 5:
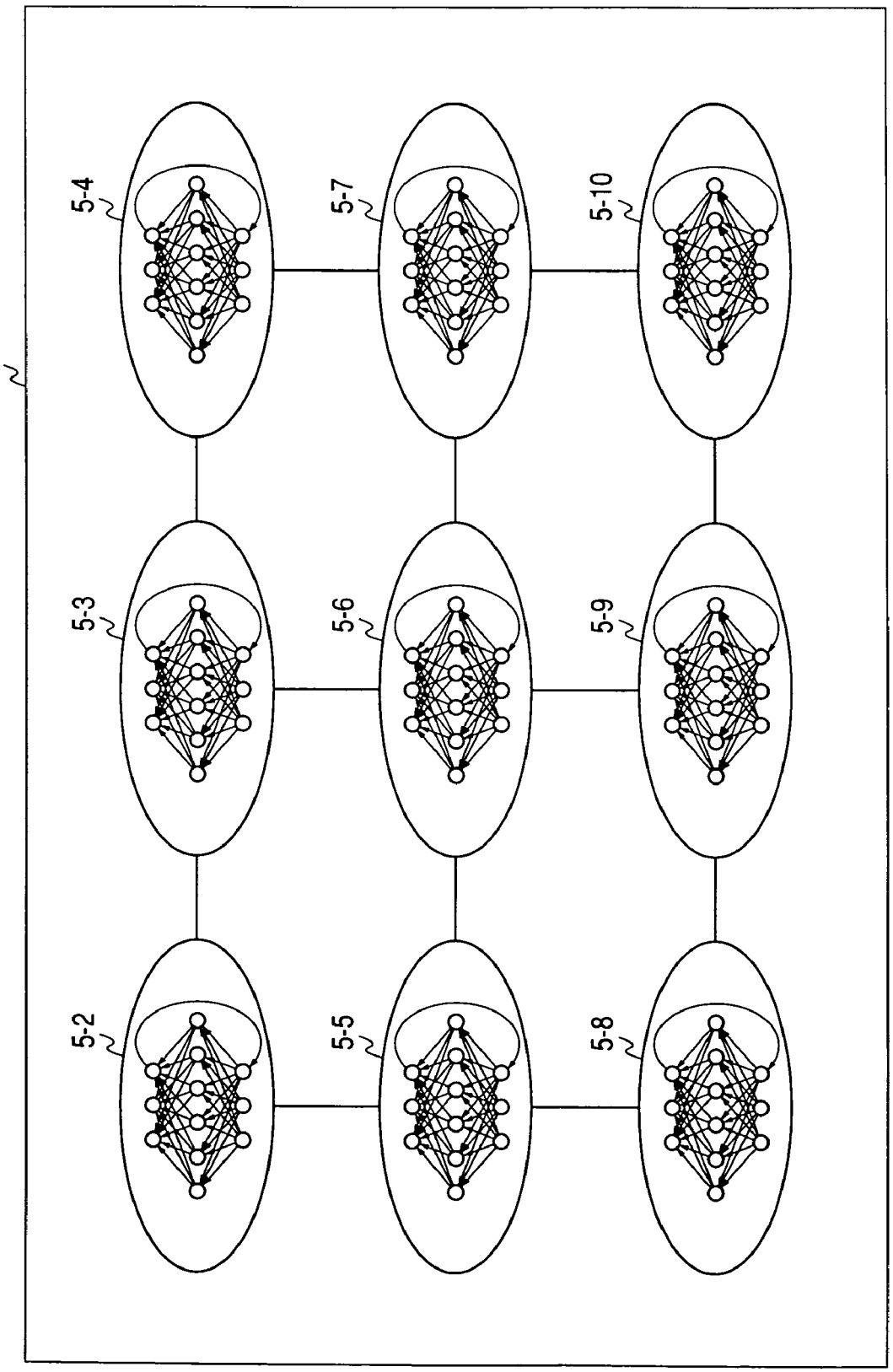
FIG. 5 is a diagram illustrating another example of the dynamics storage network.

FIGS. 4 and 5 illustrate representative examples of the dynamics storage network.

FIG. 4 illustrates dynamics storage network 4-1 in which all nodes 4-2 to 4-7 do not have a link.

FIG. 5 illustrates dynamics storage network 5-1 in which all nodes 5-2 to 5-10 are arranged two-dimensionally and a link is given between the nodes adjacent in the vertical direction and the horizontal direction. Here, the link is used to provide a structure in which nodes are arranged in space. That is, dynamics storage network 5-1 shown in FIG. 5 is an example of a dynamics storage network having a two-dimensional arrangement structure of nodes, and dynamics storage network 4-1 shown in FIG. 4 is an example of a dynamics storage network having no spatial restriction in arrangement of node.

A spatial distance relation between nodes is determined on the basis of a spatial arrangement structure of nodes given by links. For example, when a certain node is noted in FIG. 5, a node adjacent to the noted node and coupled directly to the noted node through a link is closest to the noted node (the distance from the noted node is smallest) and a node reached by sequentially tracking the prior link from the adjacent node becomes more distant (the distance from the noted node becomes greater).

On the other hand, the spatial distance relation is not shown in FIG. 4.

The spatial arrangement structure of nodes may be changed by a link constructing method other than FIG. 4 or 5 and the arrangement structure may be set using links.

Figure 6:
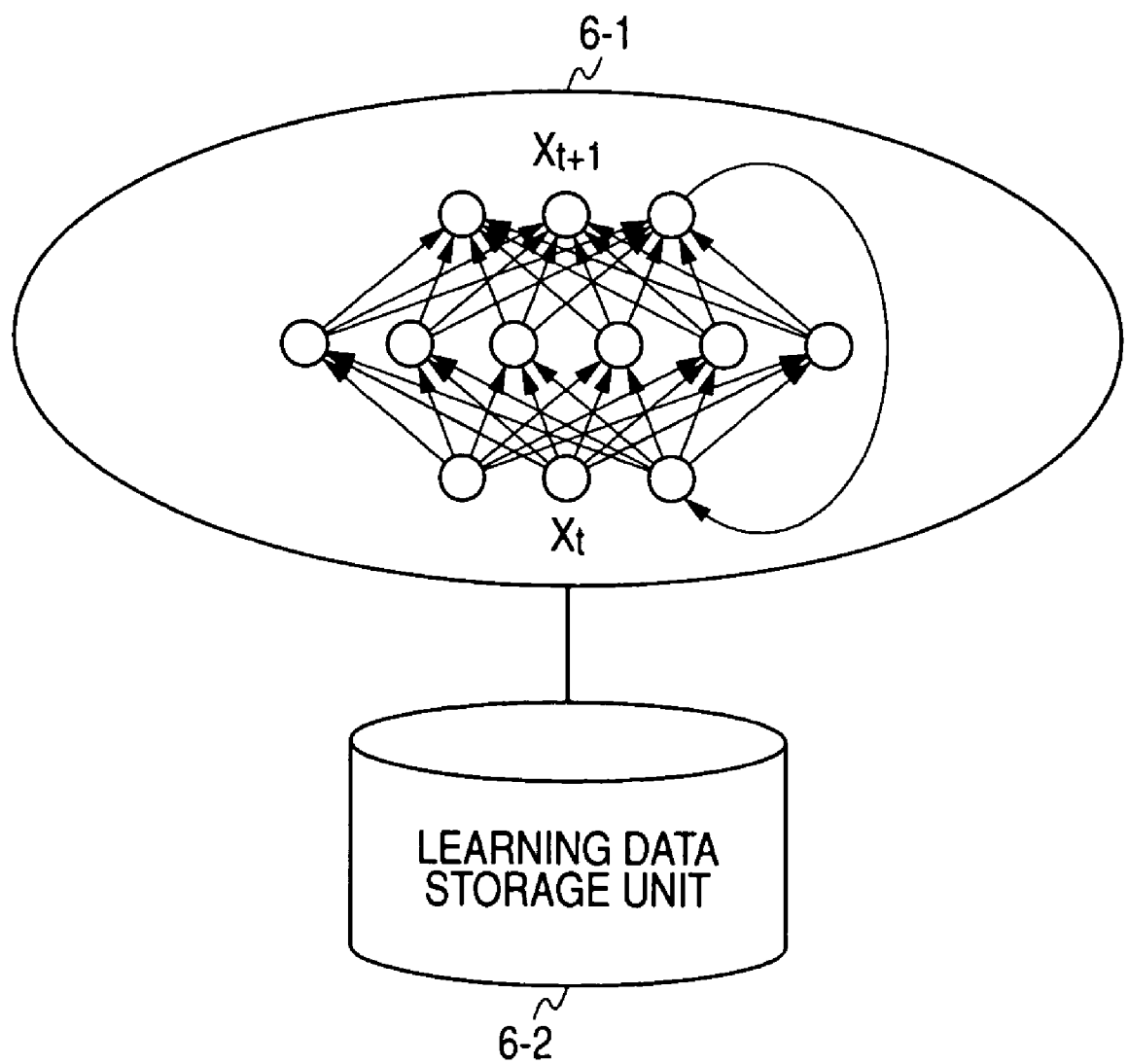
FIG. 6 is a diagram illustrating nodes of the dynamic storage network.

FIG. 6 is a diagram illustrating a node of the dynamics storage network in detail.

One node includes dynamical approximate model 6-1 having an inner state quantity and learning data storage unit 6-2 storing data (learning data) for learning parameters of dynamic approximate model 6-1. For example, an RNN can be used as dynamical approximate model 6-1 having an inner state quantity. In this case, a context fed back to an input layer from an output layer of the RNN is used as the inner state quantity. Learning data storage unit 6-2 is a part of a storage area of network storage unit 1-5 (FIG. 1).

In FIG. 6, an RNN having a feedback loop to an input layer from an output layer of three-layered neural network (NN) is used as dynamical approximate model 6-1. By the use of the RNN, a rule of time evolution of time-series data to be learned can be learned by inputting a state vector $X_T$ at time T of time-series data and learning (prediction learning) the predicting and outputting of a state vector $X_{T+1}$ at time T+1.

For example, a BPTT (Back-Propagation Through Time) method is used as a method of estimating a parameter of the dynamical approximate model having an inner state quantity, such as an RNN. The BPTT method is described, for example, in D. E. Rumelhart, G. E. Hinton & R. E. Williams, 1986 "Learning internal representations by error propagation", D. E. Rumelhart & J. McClelland, "Parallel distributed processing", pp. 318-364, Cambridge, Mass.: MIT Press, or R. J. Williams and D. Zipser, "A learning algorithm for continually running fully recurrent neural networks", Neural Computation, 1:270-280, 1989. The BPTT method is a technique obtained by expanding a back-propagation method which is a learning technique based on the steepest descent method for the purpose of learning the RNN. The back-propagation method is described in "Neural Computing Guide" by R. Bill and T. Jackson (Kaibundo).

In dynamical approximate model 6-1 having an inner state quantity, a dynamical characteristic of the learning data stored in learning data storage unit 6-2 is learned. Accordingly, dynamical approximate model 6-1 having an inner state quantity and the learning data stored in learning data storage unit 6-2 have a correlation with each other.

Here, the learning data used for learning are time-series data and dynamical approximate model 6-1 having an inner state quantity learns time-series patterns as dynamics.

For example, on-line learning is employed in the learning of the dynamics storage network and the parameters of dynamical approximate model 6-1 are gradually updated by performing a learning operation using measurement signal 1-1 as the learning data every time measurement signal 1-1 is input. This is embodied because the learning data stored in learning data storage unit 6-2 gradually vary as the learning advances. That is, the learning data stored in learning data storage unit 6-2 varies gradually and the parameters of dynamical approximate model 6-1 having an inner state quantity is updated with the variation.

Subsequently, a learning process of the dynamics storage network using the data processor shown in FIG. 1 will be described with reference to FIG. 7.

First, learning unit 1-4 initializes all the parameters of the dynamics storage network stored in network storage unit 1-5 (step 7-1). Specifically, appropriate values are given as initial values to the parameters of dynamical approximate model 6-1 having an inner state quantity of the respective nodes of the dynamics storage network. Here, for example, when dynamical approximate model 6-1 of the nodes of the dynamics storage network is an RNN, weights (coupling loads) given to signals input to units of the RNN are used as parameters of dynamical approximate model 6-1 in step 7-1 and appropriate initial values are set and the parameters.

When measurement signal 1-1 is input to signal input unit 1-2, feature extraction unit 1-3 extracts the feature quantity of measurement signal 1-1 in a time-series manner and sends the extracted feature quantity as time-series data to learning unit 1-4 (step 7-2). By using the time-series data sent from feature extraction unit 1-3 as input data, learning unit 1-4 calculates a score of the input data relative to dynamical approximate model 6-1 having an inner state quantity corresponding to (belonging to) the respective node of the dynamics storage network stored in network storage unit 1-5 while updating the inner state quantity (step 7-3).

Here, for example, when dynamical approximate model 6-1 having an inner state quantity is given as an RNN, a true value of an output to be acquired from the input and an output error (prediction error) which is an error between the input and an output value output from the RNN are used as a score. Generally, a mean square error is used as the output error (to calculate the output error). However, the output error is not limited to the average square error. As the calculation result of a score, a score indicating a degree by which the corresponding node is suitable for the input data is given to the respective nodes.

For example, when dynamical approximate model 6-1 is given as the RNN, a value making a score best among values which are obtained by using a predetermined value as a reference and varying (updating) the predetermined value is determined as an initial value of a context as the inner state quantity of the RNN, and the scores are calculated while updating the context from the initial value.

For example, a random value or the final updated value (hereinafter, appropriately referred to as previous updated value) of the context obtained at the time of previously learning the RNN can be employed as the predetermined value used to determine the initial value of the context.

For example, when it is known that the input data used in the current learning operation has no relation with the input data used in the previous learning operation, a random value can be employed as the predetermined value used to determine the initial value of the context.

For example, when it is known that the input data used in the current learning operation has a certain relation with the input data used in the previous learning operation like continuous time-series data, the previous updated value can be employed as the predetermined value used to determine the initial value of the context. When the previous updated value is employed as the predetermined value used to determine the initial value of the context, the previous updated value can be determined as the initial value of the context.

Here, that a score is good or high means that the value of the score is small when the score is a distance or an error and that the value of the score is large when the score is probability.

Learning unit 1-4 determines a winner node which is a node having the best score, that is, a node suitable for the input data, by comparing the scores of the nodes constituting the dynamics storage network (step 7-4).

Learning unit 1-4 determines weights of the nodes about the winner node (step 7-5).

Learning unit 1-4 updates the parameters of dynamical approximate model 6-1 having an inner state quantity of each node in accordance with the learning weights (step 7-6).

Here, the method of updating only the parameter of the winner node corresponds to WTA (Winner-Take-All) and the method of updating the parameters of the nodes adjacent to the winner node corresponds to SMA (Soft-Max Adaptation). Learning unit 1-4 updates the parameters by the use of SMA.

Thereafter, when next measurement signal 1-1 is input to signal input unit 1-2, the processes of step 7-2 to step 7-6 are repeated. That is, every time measurement signal 1-1 is input, the processes of step 7-2 to step 7-6 are repeated.

Figure 8:
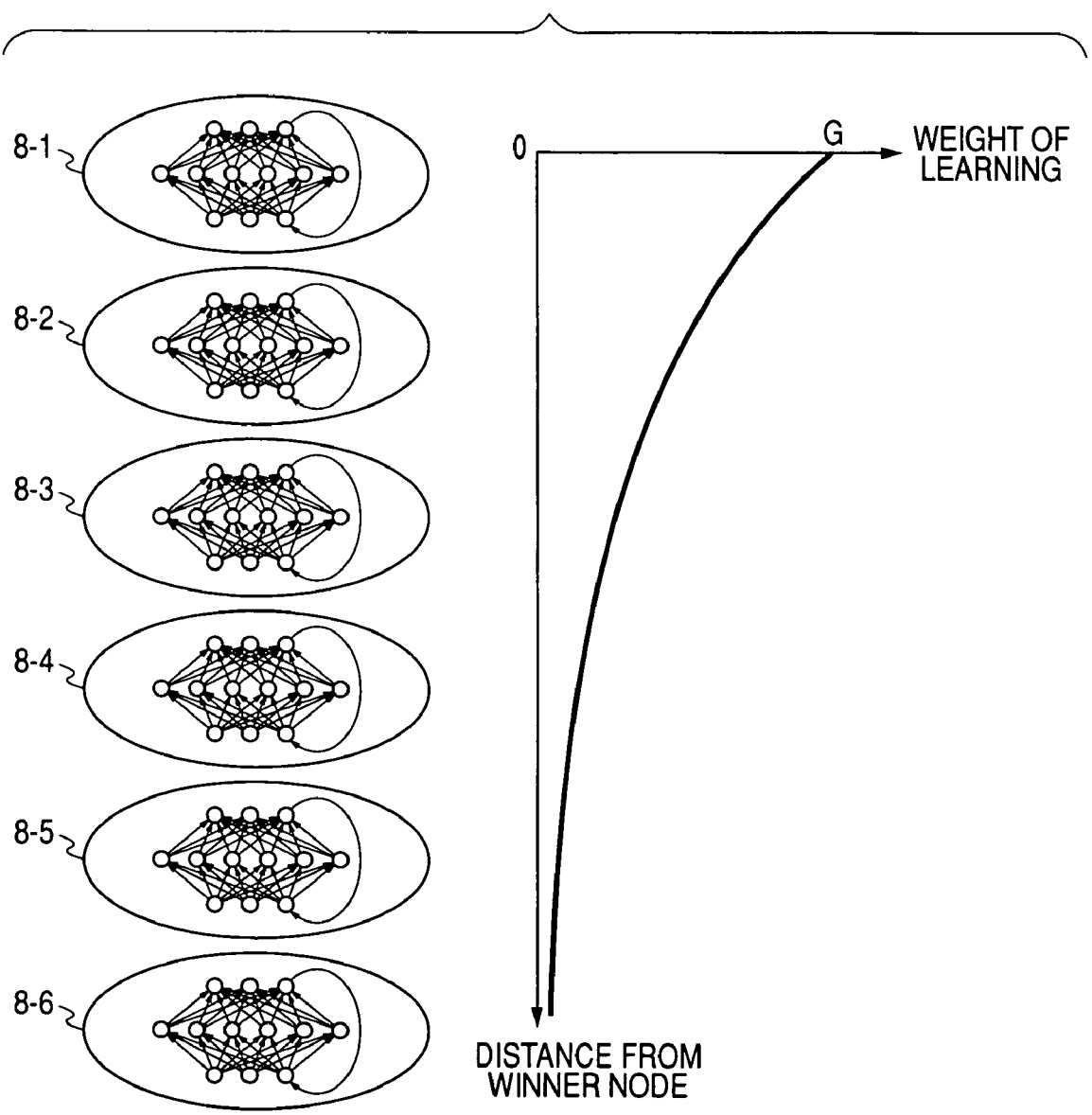
FIG. 8 is a diagram illustrating a relation between a distance from a winner node and a learning weight.

FIG. 8 illustrates the learning weight used to update the parameters of the nodes by the use of SMA.

In the left of FIG. 8, nodes 8-1 to 8-6 are nodes constituting the dynamics storage network. Node 8-1 among nodes 8-1 to 8-6 is a winner node and nodes 8-2 to 8-6 are arranged in the order in which the distances from the winner node 8-1 become more distant.

The graph shown in the right of FIG. 8 illustrates a relation between a learning weight and a distance from the winner node, where the vertical axis indicates the learning weight and the vertical axis indicates a distance from the winner node.

Referring to the graph shown in the right of FIG. 8, the learning weights are determined so that the learning weight of winner node 8-1 is the largest and the learning weights of nodes 8-2 to 8-6 becomes smaller as the distances thereof from the winner node 8-1 becomes more distant.

The distance from the winner node is determined on the basis of a spatial arrangement structure of nodes given by links of the dynamics storage network. For example, in dynamics storage network 5-1 in which nodes 5-2 to 5-10 shown in FIG. 5 are two-dimensionally arranged, when node 5-7 is the winner node, nodes 5-4, 5-6, and 5-10 adjacent to winner node 5-7 are closest to the winner node, nodes 5-3, 5-5, and 5-9 are less close to the winner node, and nodes 5-2 and 5-8 are most distant from the winner node. In this case, when the least number of links connecting the nodes is set as the distance, 1, 2, and 3 are given as the distances in the order of increasing the distance.

When no link is given as shown in FIG. 4, the nodes are ranked in the order in which the score becomes better which is calculated in the nodes on the basis of the input data (the time-series data used to calculate the scores of the nodes) and the ranks are used as the distances from the winner node. That is, 0, 1, 2, 3, . . . are given as the distances from the winner node in the order of enhancing the scores. The method of giving the distance from the winner node is similar to the method used in the above-mentioned SOM or the neural-gas algorithm. The relationship between the distance from the winner node and the learning weight is expressed by the following expression.

$$\alpha = G \times \gamma^{\frac{d}{\Delta}}$$ Expression 1

Here, $\alpha$ denotes a learning weight, G denotes a learning weight given to a winner node (among learning weights $\alpha$), $\gamma$ denotes an attenuation coefficient which is a constant in the range of $0<\gamma<1$, d denotes a distance from the winner node, and $\Delta$ denotes a variable for adjusting the learning weight in the vicinity in the SMA.

In Expression 1, the learning weight $\alpha$ is calculated as G times attenuation coefficient $\gamma \times d/\Delta$. In Expression 1, since attenuation coefficient $\gamma$ is a positive value smaller than 1, the learning weight $\alpha$ decreases as distance d increases.

Now, it is assumed that 1, 2, 3, . . . are sequentially given to distance d in the order increasing the distance from the winner node and d=0 is given to the winner node. At this time, for example, when G=8, $\gamma$=0.5, and $\Delta$=1, learning weights $\alpha$ are 8, 4, 2, and 1 as distance d from the winner node increases. Here, when variable $\Delta$ is allowed to approach 0, learning weight $\alpha$ becomes smaller as the distance from the winner node increases. When variable $\Delta$ is close to 0, the learning weights of the nodes other than the winner node become almost 0, which is similar to the WTA. By adjusting variable $\Delta$, it is possible to adjust learning weight $\alpha$ in the vicinity of the winner node in the SMA. Basically, the adjustment is performed so that variable $\Delta$ is great at the time of the start of learning and becomes smaller with the lapse of time.

On the basis of learning weight $\alpha$, the parameters of other nodes (nodes other than the winner node) are updated so that the parameters of the winner node are strongly affected by the input data and less affected as the distance from the winner node increases.

Figure 9:
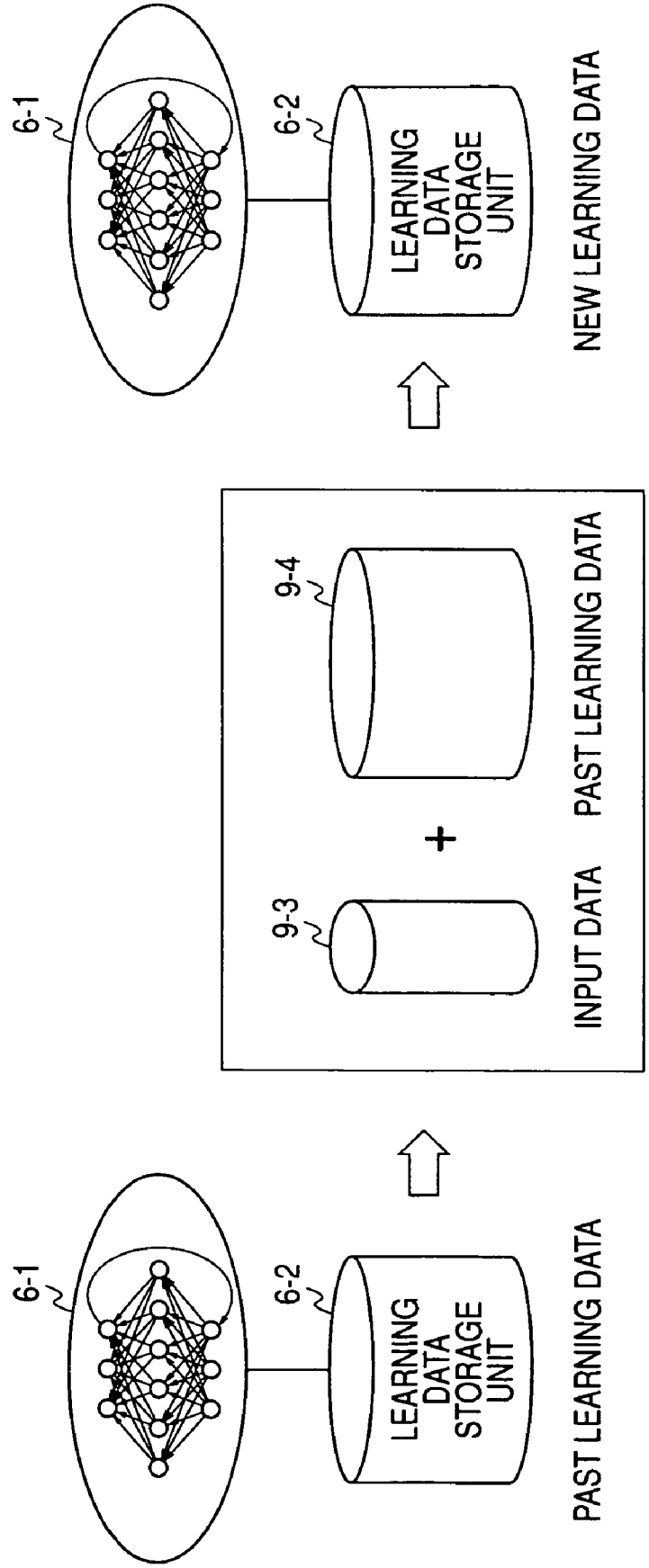
FIG. 9 is a diagram illustrating a method of updating learning data.

FIG. 9 is a diagram illustrating a method of updating a parameter of a node.

Now, it is assumed that the learning data used to learn the parameters of dynamical approximate model 6-1 having an inner state quantity before updating parameters of a node are stored in learning data storage unit 6-2.

The learning data before updating the parameters of a node is referred to as past learning data.

The updating of the parameters of a node is performed using new learning data acquired by adding input data 9-3 to past learning data 9-4 in accordance with learning weight α determined relative to the node. That is, the new learning data is constructed by adding (mixing) input data 9-3 and past learning data 9-4 in accordance with learning weight α and the new learning data is stored in learning data storage unit 6-2. The parameters of dynamical approximate model 6-1 having an inner state quantity are updated by the new learning data.

The updating of the parameters is performed by setting the parameters of dynamical approximate model 6-1 having an inner state quantity before updating to initial values and estimating the parameters based on the new learning data by the use of the BPTT method as described above.

Here, a ratio with which input data 9-3 and past learning data 9-4 are added at the time of constructing the new learning data will be described.

If the ratio of input data 9-3 and past learning data 9-4 is 1:0, the new learning data is constructed by only input data 9-3.

On the other hand, if the ratio of input data 9-3 and past learning data 9-4 is 0:1, the new learning data is constructed by only past learning data 9-4 without adding input data 9-3. That is, by changing the ratio of input data 9-3 and past learning data 9-4, the strength of influence of input data 9-3 on the parameters can be changed.

By appropriately adjusting the ratio of input data 9-3 and past learning data 9-4 on the basis of learning weight α described above, it is possible to perform the learning operation in which the influence of the input data can be given to the parameters. One adjustment method will be described.

First, the number of time-series data which a node can store in learning data storage unit 6-2 is kept constant and the value is set to H. That is, it is assumed that the parameters of dynamical approximate model 6-1 having an inner state quantity is learned using H time-series data. The ratio of input data 9-3 and past learning data 9-4 is adjusted to be α:H-α in accordance with learning weight α of a node. For example, when H=100 and α=8, the ratio of input data 9-3 and past learning data 9-4 is adjusted to be 8: 92. By adding input data 9-3 and past learning data 9-4 at this ratio, H new learning data are constructed.

As the method of adding input data 9-3 and past learning data 9-4 at the ratio of α:H-α, the following method can be used.

That is, first, since one time-series data is given to input data 9-3, data acquired by multiplying the input data by a is added. For example, when α=8, 8 time-series data equal to input data 9-3 are added.

On the other hand, the number of past learning data 9-4 is H and it is necessary to adjust the number of data to H-α. For example, as described above, when α=8, it is necessary to reduce the number of past learning data 9-4 from 100 to 92. Accordingly, by removing a oldest data in the time order of 100 time-series data as past learning data 9-4 stored in learning data storage unit 6-2, the number of past learning data 9-4 is adjusted to H-α.

By adding input data 9-3 and past learning data 9-4 of which the numbers are adjusted so as to construct the new learning data, only the H latest time-series data are stored as the learning data in learning data storage unit 6-2. In this way, it is possible to adjust the ratio of input data 9-3 occupying the learning data (new learning data) in accordance with learning weight α.

In addition to the method described in this specification, any method may be used so long as it can reflect input data 9-3 in the parameters in accordance with learning weight α. It is important that the parameters are slightly corrected every time new data (input data 9-3) is given and that the strength of influence of input data 9-3 on the learning is adjusted in accordance with learning weight α at that time.

In order to appropriately perform the learning operation, it is very important to appropriately adjust learning weight α with the lapse of time. Although the method of adjusting learning weight α by the use of variable Δ has been described in this embodiment, it is basically important to adjust learning weight α so that the nodes affected by input data 9-3 slowly becomes the nodes in a narrow range from the nodes in a wide range about the winner node and any method may be used so long as it can realize the adjustment.

Hitherto, the learning operation has been described in detail. By using the learning technique described in this embodiment, the parameters of the nodes (parameters of dynamical approximate model 6-1 of the nodes) in the dynamics storage network are self-organizationally updated every time time-series data (input data) is input to learning unit 1-4.

Recognition

Next, a process of recognizing time-series data using the dynamics storage network with the data processor shown in FIG. 1 will be described with reference to FIG. 10.

The nodes of the dynamics storage network stored in network storage unit 1-5 learn the dynamics by the use of dynamical approximate model 6-1 having an inner state quantity as described above.

Here, the number of dynamics learned by the dynamics storage network is equal to the number of nodes in the dynamics storage network. For example, when the number of nodes is 100, 100 types of dynamics are learned. It is possible to perform the recognition process of measurement signal 1-1 on the basis of the dynamics.

First, measurement signal 1-1 is input to signal input unit 1-2. Measurement signal 1-1 is sent to feature extraction unit 1-3 from the signal input unit 1-2. Feature extraction unit 1-3 extracts features of measurement signal 1-1 in a time-series manner and sends the extracted features as the time-series data to recognition unit 1-6 (step 10-1).

Recognition unit 1-6 performs to the time-series data sent from feature extraction unit 1-3 a score calculation using dynamical approximate model 6-1 having an inner state quantity held in the nodes in the dynamics storage network stored in network storage unit 1-5 while updating the inner state quantity (step 10-2). The score calculation is equal to the score calculation performed to determine the winner node at the time of learning. For example, when dynamical approximate model 6-1 having an inner state quantity is given as the RNN, a mean square error of a prediction output (output of the RNN) is used as the score.

A score is given to each node as the result of the score calculation. Recognition unit 1-6 determines a node having the best score, that is, the winner node, on the basis of the score (step 10-3).

In recognition unit 1-6, the dynamics (the dynamics (the dynamics held in the corresponding node) modeled by dynamical approximate model 6-1 of the node) corresponding to the node having the best score is selected as the dynamics most suitable for the input time-series data (the time-series data which is supplied to recognition unit 1-6 from feature extraction unit 1-3 and of which a score is calculated in recognition unit 1-6). Recognition unit 1-6 outputs information indicating (dynamics corresponding to) which node is selected, that is, information on the winner node, as recognition result 1-7 (step 10-4). This is a process of recognition unit 1-6.

Here, for example, the learning of the dynamics storage network using sensor motor signals of tasks "A", "B", and "C" and the recognition using the dynamics storage network acquired as a result will be described in brief.

It is assumed that the sensor motor signals include a variety of signals.

When the sensor motor signals are classified into three types of sensor motor signals of "A", "B", and "C", various sensor motor signals of task "A" exist in the same sensor motor signal of task "A" due to difference in speed or amplitude or different in initial state (for example, position or posture of a robot).

When learning unit 1-4 performs the learning of the dynamics storage network by the use of all the sensor motor signals classified into tasks "A", "B", and "C" without distinguishing tasks "A", "B", and "C", the dynamics corresponding to the number of nodes constituting the dynamics storage network are learned in the dynamics storage network.

That is, the entire sensor motor signals are learned using all the nodes constituting the dynamics storage network. Accordingly, when the number of nodes in the dynamics storage network is greater than 3 which the number of tasks "A", "B", and "C", the nodes can learn various sensor motor signals of task "A".

Thereafter, for example, when one sensor motor signal of task "A" is input, recognition unit 1-6 selects one node (winner node) most suitable for the input sensor motor signal from the dynamics storage network. That is, in the dynamics storage network, the node most suitable for the input sensor motor signal is selected among the nodes corresponding to task "A."

That is, recognition unit 1-6 does not determine which sensor motor signal of three types of tasks "A", "B", and "C" the input sensor motor signal is, but determines which node is most suitable for a time-series pattern acquired as the dynamics through the learning of the dynamics storage network.

As described above, learning unit 1-4 classifies and learns the dynamics with fineness corresponding to the number of nodes in the dynamics storage network and recognition unit 1-6 recognizes the time-series data with the fineness.

When labels of tasks "A", "B", and "C" are appropriately given to all the learned nodes, recognition unit 1-6 can recognize which type of signal of tasks "A", "B", and "C" the input sensor motor signal is.

Creation

Next, a process of creating time-series data using the dynamics storage network with the data processor shown in FIG. 1 will be described with reference to FIG. 11.

As described above, the respective nodes of the dynamics storage network learns the dynamics by the use of dynamical approximate model 6-1 having an inner state quantity.

It is possible to create time-series data (time-series data of time-series pattern acquired as the dynamics) corresponding to the dynamics modeled by dynamical approximate model 6-1 from dynamical approximate model 6-1 having an inner state quantity of each node.

When the RNN is used as dynamical approximate model 6-1 having an inner state quantity, it is possible to easily create the time-series data from the dynamics held in the nodes having the RNN by giving a predetermined inner state quantity to the RNN.

Specifically, when a state vector at time T is given to an input of the RNN, a state vector at next time T+1 is output. Accordingly, by performing this operation by a predetermined time steps, it is possible to create time-series data from the respective nodes in the dynamics storage network.

Creation unit 1-9 of the data processor shown in FIG. 1 performs the above-mentioned process of creating the time-series data.

That is, control signal 1-8 indicating which node the time-series data is created from is first sent to creation unit 1-9 (step 11-1).

Creation node 1-9 determines a node (hereinafter, referred to as creation node) which should create the time-series data among the nodes constituting the dynamics storage network stored in network storage unit 1-5 on the basis of control signal 1-8 (step 11-2).

Creation unit 1-9 creates the time-series data while updating the inner state quantity of dynamical approximate model 6-1 on the basis of the parameters of dynamical approximate model 6-1 having an inner state quantity and held in the creation node (step 11-3). Creation unit 1-9 outputs the time-series data created from dynamical approximate model 6-1 of the creation node as creation result 1-10 (step 11-4).

Here, when dynamical approximate model 6-1 is, for example, the RNN, for example, a random value is used as the initial value of a context of the RNN as the inner state quantity at the time of creating the time-series data in creation unit 1-9. A random value or data other than the context output from an output layer of the RNN at previous time T can be used as the data other than the context input to an input layer of the RNN at time T+1.

In the learning of the dynamics storage network, since the dynamics corresponding to the number of nodes in the dynamics storage network, creation unit 1-9 can create the time-series data corresponding to the number of nodes in the dynamics storage network.

For example, the creation operation of the time-series data by the use of the dynamics storage network learning using the sensor motor signals of tasks "A", "B", and "C" without distinguishment will be described in brief.

As described above, various sensor motor signals of task "A" exist in the same sensor motor signal of task "A" due to difference in speed or amplitude or difference in initial state (for example, position or posture). In the dynamics storage network, a plurality of nodes can learn various sensor motor signals of task "A."

When one node is specified by control signal 1-8 given to creation unit 1-9, creation unit 1-9 sets a node specified by control signal 1-8 among the nodes constituting the dynamics storage network stored in network storage unit 1-5 as a creation node, creates the time-series data corresponding to the dynamics held in the creation node, and outputs the created time-series data as creation result 1-10. The time-series data correspond to one of the various sensor motor signals of task "A."

Creation result 1-10 output from creation unit 1-9 is the time-series data (data corresponding to the time-series feature extracted by feature extraction unit 1-3) corresponding to the dynamics held in the nodes in the dynamics storage network and the time-series data is converted into output signal such as a sensor motor signal as needed. The conversion (conversion of a time series of feature into a time series of output signal to be finally obtained) is not described.

By using the learning method and the creation method of the time-series data, a variety of signals such as a sound signal, signals with various variations relative to an image signal, and a motor signal can be stored as dynamics in the dynamics storage network and can be created as needed.

Recognition and Creation

Next, a process of recognizing and creating time-series data with the data processor shown in FIG. 1 will be described with reference to FIG. 12.

FIG. 12 shows a detailed configuration of recognition unit 1-6 and creation unit 1-9 of the data processor shown in FIG. 1.

Here, the recognition and creation (of time-series data) means to recognize input time-series data and to create new time-series data on the basis of the recognition result.

In the recognition and creation, for example, when a person generates a voice for commanding a robot, a motor signal for doing a movement corresponding to the voice or a parameter signal for generating a synthesized voice responding to the voice is generated from the robot.

The dynamics storage network stored in network storage unit 1-5 learns the dynamics by the use of dynamical approximate model 6-1 having an inner state quantity. When the recognition and creation is performed using dynamical approximate model 6-1 having an inner state quantity, it is difficult to perform the recognition and creation in consideration of the inner state quantity, only by sequentially combining the recognition process (FIG. 10) and the creation process (FIG. 11).

Therefore, in the data processor, by storing the inner state quantity (inner state) of dynamical approximate model 6-1 updated in the recognition process in inner state storage unit 1-11 and using the inner state quantity together with measurement signal 1-1 in the creation process, the recognition and creation process of outputting creation result 1-10 corresponding to measurement signal 1-1 is performed.

That is, in recognition unit 1-6 (FIG. 12), inner state quantity updating section 12-1 reads the inner state quantity updated and stored previously from inner state storage unit 1-11. Accordingly, in dynamical approximate model 6-1, it is possible to update the inner state quantity by setting the value which inner state quantity updating section 12-1 reads from inner state storage unit 1-11 as an initial value, on the basis of the input time-series data.

In recognition unit 1-6, score calculating section 12-2 performs a score calculation such as a process performed to determine the winner node at the time of learning, that is, a score calculation while updating the inner state quantity of dynamical approximate model 6-1 of a node on the basis of the input time-series data. As the result of the score calculation in score calculating section 12-2, a score is given to each node. As described above, when the RNN is given as dynamical approximate model 6-1 having an inner state quantity, a mean square error of a prediction output is used as a score.

Recognition unit 1-6 performs the score calculation while updating the inner state quantity. Determination section 12-3 of recognition unit 1-6 determines a node having the best score, that is, a winner node, on the basis of the score acquired by score calculating section 12-2. In determination section 12-3, the dynamics corresponding to the node (winner node) having the best score is the dynamics most suitable for the input time-series data.

In recognition unit 1-6, inner state quantity updating section 12-1 stores the updated value of the inner state quantity (updated inner state quantity) at the time of determining the winner node and the initial value of the inner state quantity at the time of determining the winner node in inner state storage unit 1-11.

Here, the updated inner state quantity stored in inner state storage unit 1-11 is used in the next score calculation of recognition unit 1-6. The initial value of the inner state quantity stored in inner state storage unit 1-11 is used in the creation of time-series data in creation unit 1-9.

Output section 12-4 of recognition unit 1-6 outputs information indicating which node is selected by determination section 12-3 as recognition result 1-7 (FIG. 1). In this way, the process (recognition process) of recognition unit 1-6 in the recognition and creation is finished.

Subsequently, in the creation process of the recognition and creation, recognition result 1-7 output from recognition unit 1-6 is used as control signal 1-8 (FIG. 1) indicating that the time-series data is created from a node corresponding to which dynamics.

That is, recognition result 1-7 output from output section 12-4 is supplied as control signal 1-8 to creation node determining section 12-5 of creation unit 1-9. Creation node determining section 12-5 determines a node (creation node) which should create the time-series data on the basis of control signal 1-8. That is, the winner node determined in the recognition process of recognition unit 1-6 is determined as the creation node. Creation unit 1-9 creates the time-series data from the winner node determined in the recognition process of recognition unit 1-6.

That is, inner state reading section 12-6 of creation unit 1-9 reads the value stored in inner state storage unit 1-11 as the initial value of the inner state quantity of dynamical approximate model 6-1 of the creation node in the dynamics storage network stored in network storage unit 1-5.

That is, inner state reading section 12-6 reads the initial value of the inner state quantity when the creation node is determined as the winner node by recognition node 1-6 among the values stored in inner state storage unit 1-11 and sets the read value as the initial value of the inner state quantity of dynamical approximate model 6-1 of the creation node.

Time-series data creating section 12-7 of creation unit 1-9 reads the time-series data of features extracted by feature extraction unit 1-3 and creates the time-series data while updating the inner state quantity on the basis of the time-series data and dynamical approximate model 6-1 of which the initial value of the inner state quantity is set by inner state reading section 12-6. The time-series data created by time-series data creating section 12-7 is output as creation result 1-10 (FIG. 1) from output section 12-8 of creation unit 1-9.

Here, since the number of dynamics learned by the dynamics storage network is equal to the number of nodes in the dynamics storage network, it is possible to recognize the time-series data corresponding to the number of nodes and to create the time-series data in accordance with the recognition result.

Next, the recognition and creation process will be described with reference to FIGS. 13 to 16.

In the recognition and creation process, recognition unit 1-6 recognizes input data at time (sampling point) T or at time T and several times retracing the past from time T among the input data as the time-series data supplied from feature extraction unit 1-3 and creation unit 1-9 creates data obtained by predicting input data at next time T+1 as output data on the basis of the recognition result.

That is, recognition unit 1-6 determines the winner node which a node (node holding the dynamics) corresponding to the dynamics most suitable for the input data among the dynamics held in the nodes of the dynamics storage network while updating the inner state quantity of dynamical approximate model 6-1 of the nodes of the dynamics storage network stored in network storage unit 1-5 on the basis of the input data supplied from feature extraction unit 1-3, and outputs information indicating the winner node as recognition result 1-7 of the input data.

Recognition unit 1-6 supplies the inner state quantity of dynamical approximate model 6-1, which is acquired in the process of determining the winner node, to inner state storage unit 1-11 and stores the inner state quantity therein.

Creation node 1-9 determines the winner node determined by recognition unit 1-6 as the creation node which is a node used to create the output data as the time-series data on the basis of recognition result 1-7 output from recognition unit 1-6, determines the inner state quantity of the creation node on the basis of the values stored in inner state storage unit 1-11, creates the output data while updating the inner state quantity of the creation node, and outputs the created data as creation result 1-10.

That is, creation unit 1-9 determines a node determined as the winner node by recognition unit 1-6 as the creation node and creates the output data using the creation node, the values stored in inner state storage unit 1-11, and the input data supplied from feature extraction unit 1-3.

Here, as the method of performing the recognition and creation process, there are a first method of recognizing the input data at time T and creating the output data which is data obtained by predicting the input data at next time T+1 on the basis of the recognition result and a second method of recognizing the input data at time T and several times retracing the past from time T and creating the output data which is data obtained by predicting the input data at next time T+1 on the basis of the recognition result.

First, the first method of recognizing the input data at time T and creating the output data which is data obtained by predicting the input data at next time T+1 on the basis of the recognition result will be described with reference to FIGS. 13 and 14.

In FIGS. 13 and 14 and FIGS. 15 and 16, it is assumed that the RNN is used as dynamical approximate model 6-1 of the nodes of the dynamics storage network.

In the first method, at the time of performing the recognition process, the scores are calculated relative to the input data while updating the context of the RNN as the inner state quantity of the nodes in the dynamics storage network by using only the calculation in the forward time direction, and a node having the best score is determined as the winner node. At the time of performing the creation process, the winner node is set as the creation node, the final updated value of the context obtained in determining the winner node in the recognition process is set as the initial value of the context of the RNN as the inner state quantity, and the output data is created while updating the context.

Figure 13:
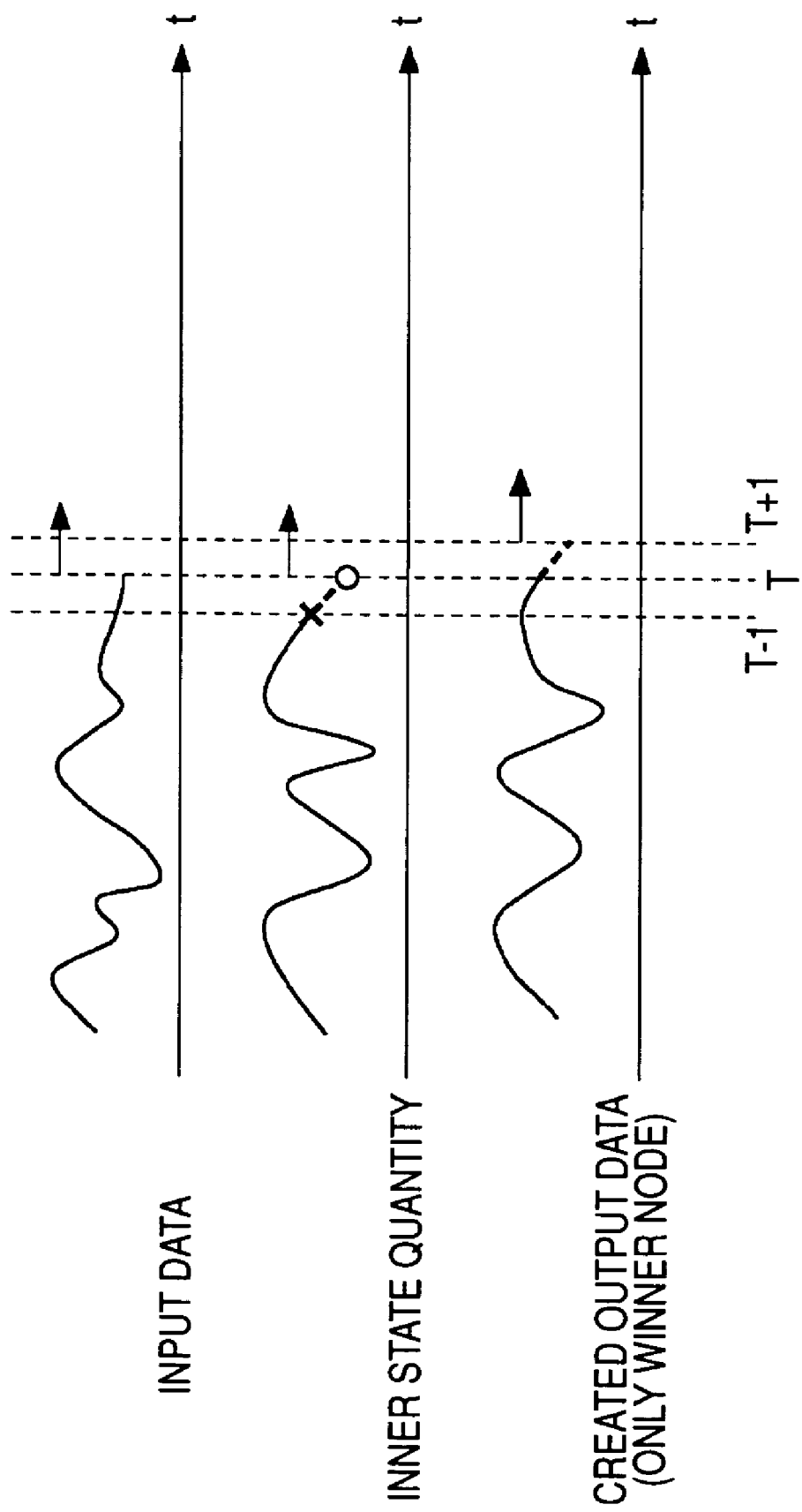
FIG. 13 is a diagram illustrating input data, an inner state quantity, and output data.

That is, FIG. 13 shows temporal variations of the input data used in the first method, the context as the inner state quantity, and the output data created in the first method.

When recognition unit 1-6 recognizes the input data at time T and creation unit 1-9 creates the data obtained by predicting the input data at time T+1 as the output data at time T on the basis of the recognition result of recognition unit 1-6, recognition unit 1-6 sets the updated value (value indicated by marks X in FIG. 13) of the context obtained in determining the winner node in the process of recognizing the input data at time T as the initial value of the context of the RNN of the nodes in the dynamics storage network and calculates the scores relative to the input data at time T while updating the context from the initial value (here, once updating).

Here, in the first method, the updating of the context of the RNN is performed by the one-time calculation method in the forward time direction called a propagation method.

When the scores of all the nodes in the dynamics storage network are calculated, recognition unit 1-6 determines the node having the best score as the winner node and supplies and stores the updated value of the context of the RNN of each node, that is, the updated value (values indicated by mark O in FIG. 13) of the context of each node obtained in determining the winner node in the process of recognizing the input data at time T, to inner state storage unit 1-11.

Creation unit 1-9 determines the winner node determined by recognition unit 1-6 as the creation node, sets the value stored in inner state storage unit 1-11, that is, the updated value of the context of the RNN of the winner node which is obtained in determining the winner node in the process of recognizing the input data at time T, as the initial value of the context of the RNN of the creation node, inputs the input data at time T to the RNN of the creation node, and creates the output data at time T while updating the context from the initial value (here, once updating).

Here, the value stored in inner state storage unit 1-11, that is, the updated value of the context obtained in determining the winner node in the process of recognizing the input data at time T, is used as the initial value of the context of the RNN of the creation node at the time of creating the output data at time T as described, and in addition, is also used as the initial value of the context of the RNN of the node in the dynamics storage network at the time of recognizing the input data at next time T+1.

Next, the flow of the recognition and creation process using the first method will be described with reference to FIG. 14.

Measurement signal 1-1 is supplied to feature extraction unit 1-3 through signal input unit 1-2 and features of measurement signal 1-1 are extracted in a time-series manner by feature extraction unit 1-3, thereby obtaining the input data as the time-series data.

When recognition unit 1-6 recognizes the input data at time T and creation unit 1-9 creates the data obtained by predicting the input data at time T+1 as the output data at time T on the basis of the recognition result of the input data at time T in recognition unit 1-6, recognition unit 1-6 reads the input data at time T to be recognized and the input data at previous time T−1 from feature extraction unit 1-3 (step 14-1).

Recognition unit 1-6 (FIG. 12) supplies the input data at time T and time T−1 read by feature extraction unit 1-3 to inner state quantity updating section 12-1.

When the input data at time T and time T−1 are supplied, inner state quantity updating section 12-1 the updated value of the context (value indicated by mark X in FIG. 13), which is obtained in determining the winner node in the process of recognizing the input data at time T to be recognized and the input-data at previous time T−1 and stored in inner state storage unit 1-11, reads from inner state storage unit 1-11, reads the (parameters of the) RNN of each node in the dynamics storage network from network storage unit 1-5, and sets the value (the final context (context at time T−1) updated in determining the winner node in the process of recognizing the input data at previous time T−1) read from inner state storage unit 1-11 as the initial value of the context of the RNN. Inner state quantity updating section 12-1 supplies the RNN of each node in the dynamics storage network to score calculating section 12-2 together with the input data at times T and T−1 (step S14-2).

When the RNN of each node in the dynamics storage network and the input data at times T and T−1 are supplied from inner state quantity updating section 12-1, score calculating section 12-2 performs the process of determining the winner node relative to the input data at time T to be recognized (steps 14-3 to 14-5).

That is, score calculating section 12-2 acquires the output data at time T−1, that is, the data obtained by predicting the input data at time T, of the nodes in the dynamics storage network by inputting the input data at time T−1 supplied from inner state quantity updating section 12-1 to the RNN of each node in the dynamics storage network supplied from inner state quantity updating section 12-1, and calculates the scores on the basis of the output data at time T−1 (step 14-3).

Specifically, for example, when the output layer of the RNN of each node in the dynamics storage network has I+1 units, the output value at time T−1 of the (i+1)-th unit (where I=0, 1, . . . , I), that is, the value obtained by predicting the input value at time T subsequent to time T−1, is expressed by $X'_{i,T}$, and the ideal output value at time T−1 of the (i+1)-th unit, that is, the (i+1)-th component of the input data (vector) at time T subsequent to time T−1, is expressed by $Y'_{i,T}$, score calculating section 12-2 calculates score S by the use of Expression 2. Score S in Expression 2 is a score which is better as the value becomes smaller. Score S in Expression 3 is similar.

$$S = \frac{1}{2}\sum_{i=0}^{I}(Y_{i,T} - X'_{i,T}) \qquad \text{Expression 2}$$

Score calculating unit 12-2 updates the context as the inner state quantity of the RNN of each node in the dynamics storage network by the use of the context at next time T, which is obtained in acquiring the output data at time T−1 (step 14-4).

That is, when score calculating section 12-2 inputs the input data at time T−1 to the RNN of each node in the dynamics storage network and acquires the output data at time T−1, the context of which the initial value is set in step 14-2 by inner state quantity updating section 12-1 is used in addition to the input data at time T−1, and the context (the context which should be input to the context unit of the input layer of the RNN at next time T) is acquired in addition to the output data at time T−1. Score calculating section 12-2 updates the context as the inner state quantity of the RNN of each node in the dynamics storage network by the use of the context at time T obtained in this way.

Thereafter, determination section 12-3 determines the node having best score S, which is acquired in step 14-3 by score calculating section 12-2 among the nodes in the dynamics storage network, as the winner node (step 14-5). Output section 12-4 supplies information indicating the winner node determined by determination section 12-3 as recognition result 1-7 to creation unit 1-9.

Inner state quantity updating section 12-1 stores in inner state storage unit 1-11 the context as the inner state quantity of the RNN updated by the use of the context at time T obtained in step 14-4 by score calculating section 12-2 and updates the contents stored in inner state storage unit 1-11 (step 14-6).

The context stored in inner state storage unit 1-11 in step 14-6 is read in step 14-9 subsequently performed by creation unit 1-9 and is read in step 14-2 performed by recognition unit 1-6 in recognizing the input data at next time T+1.

Here, step 14-1 to step 14-6 are the recognition process performed by recognition unit 1-6 in the recognition and creation process.

On the other hand, creation unit 1-9 (FIG. 12) performs the creation process (steps 14-7 to 14-10) on the basis of recognition result 1-7 supplied from recognition unit 1-6.

That is, creation unit 1-9 receives recognition result 1-7 of the input data at time T supplied from recognition unit 1-6 and supplies the received recognition result to creation node determining section 12-5.

Creation node determining section 12-5 determines (selects as the creation node the node indicated by recognition result 1-7, that is, the winner node having best score S obtained as the recognition result of the input data at time T, among the nodes in the dynamics storage network stored in network storage unit 1-5 on the basis of recognition result 1-7, and supplies information indicating the creation node to inner state reading section 12-6 (step 14-7).

In creation unit 1-9, time-series data creating section 12-7 reads the input at time T from feature extraction unit 1-3 (step 14-8).

In creation unit 1-9, inner state reading section 12-6 specifies the creation node on the basis of the information supplied from creation node determining section 12-5 in step 14-7.

Then, inner state reading section 12-6 reads from inner state storage unit 1-11 the updated value of the context of the creation node among the updated values (values indicated by mark O in FIG. 13) of the contexts which are obtained in determining the winner node in the process of recognizing the input data at previous time T and stored in inner state storage unit 1-11, reads the (parameters of the) RNN of the creation node in the dynamics storage network from network storage unit 1-5, and sets the value read from inner state storage unit 1-11 (the final context (context at time T) of the creation node (winner node) updated in determining the winner in the process of recognizing the input data at previous time T) as the initial value of the context of the RNN of the creation node. Thereafter, inner state reading section 12-6 supplies the RNN of the creation node to time-series data creating section 12-7 (step 14-9).

Time-series data creating section 12-7 acquires the output data at time T (data obtained by predicting the input data at time T+1) by inputting the input data at time T read in step 14-8 to the RNN of the creation node supplied from inner state reading section 12-6 (step 14-10). The output data at time T is supplied and output to output section 12-8 from time-series data creating section 12-7.

When time-series data creating section 12-7 acquires the output data at time T by inputting the input data at time T read in step 14-8 to the RNN of the creation node 14-8, the context of which initial value is set in step 14-9 by inner state reading section 12-6 is used in addition to the input data at time T and the context at time T+1 is acquired in addition to the output data at time T (the context as the inner state quantity of the creation node is updated).

Next, the second method of recognizing the input data at time T and several times retracing the past from time T and creating as the output data at time T the data which is obtained by predicting the input data at next time T+1 on the basis of the recognition result will be described with reference to FIGS. 15 and 16.

In the second method, a plurality of continuous times are set as a target interval to be recognized in the recognition and creation process, repeated calculations in the forward time direction and the backward time direction are performed so as to maximize the score (to minimize the prediction error) obtained relative to the input data in the target interval in the recognition process, and thus the context (the initial value of the context) at time previous by one time to the start time of the target interval which maximizes the score and the score of each node in the dynamics storage network are obtained.

That is, in the recognition process, the initial value of the context maximizing the score (hereinafter, referred to as score maximizing initial value) is obtained and the scores of the respective nodes of the dynamics storage network relative to the input data in the target interval are obtained while updating the contexts by using the score maximizing initial value as the initial value of the context.

In the recognition process, the node having the best score is determined as the winner node.

In the second method, in the creation process the winner node is used as the creation node, the score maximizing initial value obtained in determining the winner node in the process of recognizing the input data in the target interval is set as the initial value of the context of the RNN of the creation node, the input data in the target interval and the input data previous by one time to the start time of the target interval are input, and the output data are created while updating the context.

Figure 15:
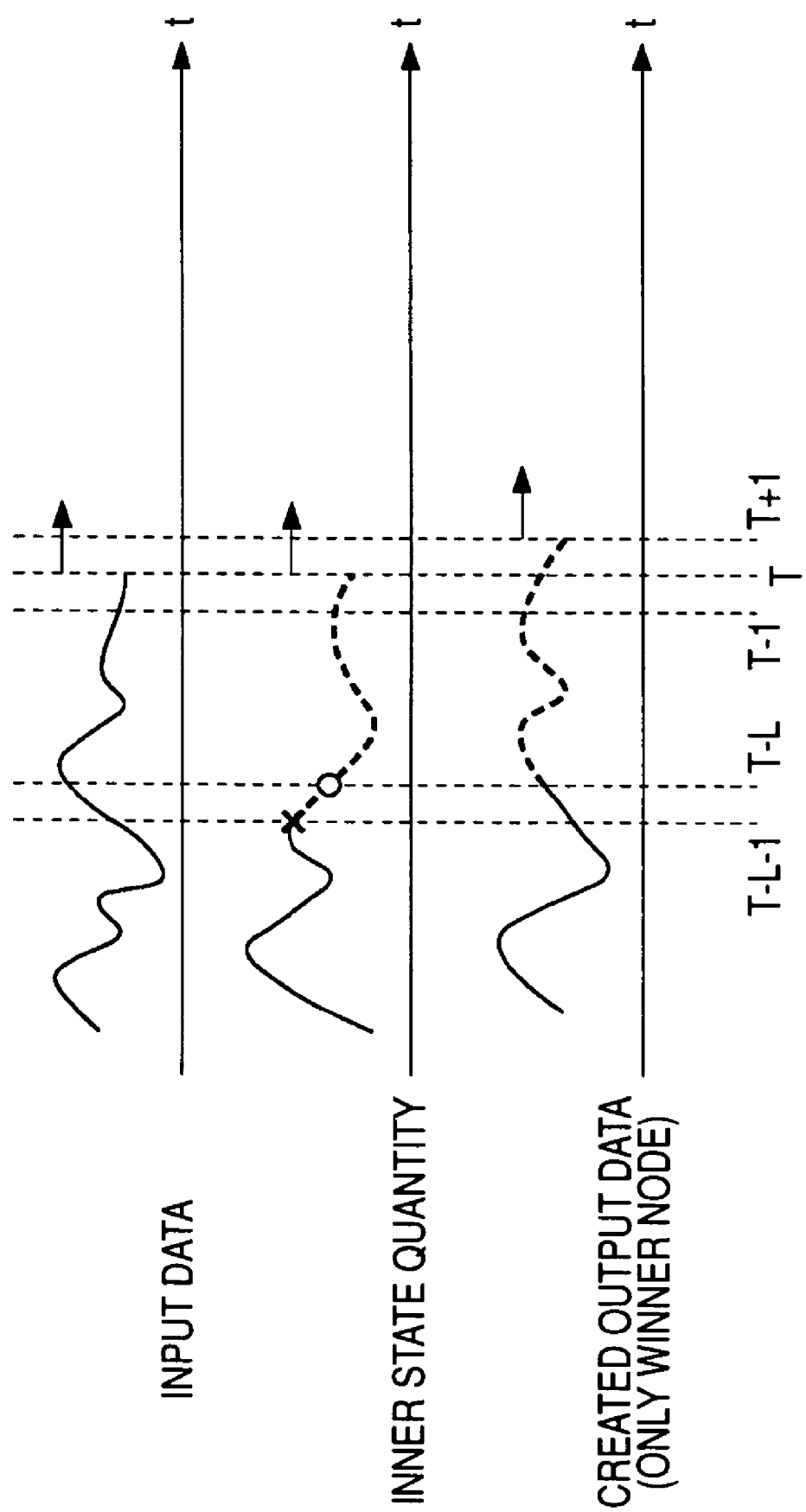
FIG. 15 is a diagram illustrating input data, an inner state quantity, and output data.

That is, FIG. 15 is temporal variations of the input data used in the second method, the context as the inner state quantity, and the output data created in the second method.

When the output data at time T is created in the recognition and creation process, the interval corresponding to L+1 times in which time T−L retracing the past by L times (where L is an integer equal to or greater than 1) from time T is the start time and time T is the end time is the target interval to be recognized.

Here, the target interval corresponding to L+1 times in which time T is the end time is referred to as target interval of time T.

In the recognition and creation process, when the input data in the target interval at time T is recognized and the output data at time T is created on the basis of the recognition result, recognition unit 1-6 calculates the score relative to the input data in the target interval at time T for each node in the dynamics storage network while changing (updating) the initial value by using the context at time T−L−1 previous by one time to start time T−L in the target interval at time T as the initial value of the context.

That is, recognition unit 1-6 calculate the score maximizing initial value which is the initial value of the context (the context at time T−L−1 previous by one time to start time T−L in the target interval at time T) maximizing the score (minimizing the prediction error) relative to the input data in the target interval at time T for each node in the dynamics storage network.

Here, when the score maximizing initial value maximizing the score is calculated relative to the input data in the target interval at time T, the initial values of the contexts of the RNNs of the nodes in the dynamics storage network are updated by using the context at end time T−L−1 in the target interval at time T−1 (context at time T−L−1 indicated by mark X in FIG. 15), which is obtained in determining the winner node in the process of recognizing the input data in the target interval at previous time T−1, as a reference.

When the initial value of the context of the RNN is updated to a certain value V, the input data retarding the target interval at time T to the past by one time, that is, the input data at time T−L−1, T−L, . . . , T−2, and T−1 are sequentially input to the RNN and the scores relative to the input data in the target interval at time T are calculated while updating the context of the RNN from the initial value V.

For example, when the score greater than a predetermined threshold value is obtained in the RNN of each node in the dynamics storage network, the initial value of the context of the RNN at the time of obtaining the score (the context, which is indicated by mark X in FIG. 15, at time T−L−1 previous by one time to start time T−L in the target interval at time T) is the score maximizing initial value.

In the second method, the updating of the initial value of the context of the RNN to maximize the score is performed by the repeated calculation including the calculation in the forward time direction and the calculation in the backward time direction, which is called the BPTT algorithm.

Recognition unit 1-6 calculates the score of each node in the dynamics storage network relative to the input data in the target interval at time T by using the score maximizing initial value as the initial value of the context and determines the node having the best score as the winner node among the nodes in the dynamics storage network.

Recognition unit 1-6 supplies and stores to inner state storage unit 1-11 the initial value (score maximizing initial value) (the context at time T−L−1 previous by one time to start time T−L in the target interval at time T, which is indicated by mark X in FIG. 15) of the context of each node in the dynamics storage network, where the initial value is obtained in determining the winner node in the process of recognizing the input data in the target interval at time T.

Creation unit 1-9 determines the winner node determined by recognition unit 1-6 as the creation node, sets the value stored in inner state storage unit 1-11, that is, the score maximizing initial value of the context of the RNN of the winner node, which is obtained in determining the winner node in the process of recognizing the input data in the target interval at time T, as the initial value of the context of the RNN of the creation node, sequentially inputs the input data at time T−L−1 previous by one time to end time T−L of the target interval at time T and the input data in the target interval at time T to the RNN of the creation node, and creates the output data at time T while updating the context.

Next, the flow of the recognition and creation process by the use of the second method will be described with reference to FIG. 16.

Measurement signal 1-1 is supplied to feature extraction unit 1-3 through signal input unit 1-2, features of measurement signal 1-1 is extracted in a time series manner by feature extraction unit 1-3, and thus the input data as the time-series data is obtained.

As described with reference to FIG. 15, when recognition unit 1-6 recognizes the input data corresponding to the L+1 times of the target interval at time T and creation unit 1-9 creates the data, which is obtained by predicting the input data at time T+1, as the output data at time T on the basis of the recognition result of recognition unit 1-6, recognition unit 1-6 reads from feature extraction unit 1-3 the input data corresponding to the total L+2 times of the input data corresponding to the L+1 times of the target interval at time T and the input data at time T−L−1 previous by one time to end time T−L in the target interval (step 16-1).

In recognition unit 1-6 (FIG. 12), the input data of the target interval at time T read from feature extraction unit 1-3 and the input data at time T−L−1 are supplied to inner state quantity updating section 12-1.

When the input data of the target interval at time T and the input data at time T−L−1 are supplied, inner state quantity updating unit 12-1 reads from inner state storage unit 1-11 the updated values of the contexts (the contexts at time T−L−1) indicated by mark X in FIG. 15) which are obtained in determining the winner node in the process of recognizing the input data of the target interval at previous time T−1 and stored in inner state storage unit 1-11, reads the (parameters of the) RNN of the respective nodes in the dynamics storage network from network storage unit 1-5, and sets the updated values of the contexts read from inner state storage unit 1-11 as the initial values of the contexts of the RNNs. Inner state quantity updating section 12-1 supplies to score calculating section 12-2 the RNNs of the respective nodes in the dynamics storage network together with the input data of the target interval at time T and the input data at time T−L−1 (step S16-2).

When the RNNs of the nodes in the dynamics storage network, the input data of the target interval at time T, and the input data at time T−L−1 are supplied from inner state quantity updating unit 12-1, score calculating section 12-2 performs the process of determining the winner node relative to the input data of the target interval at time T (step 16-3 to step 16-6).

That is, by sequentially inputting the input data other than the input data at time T among the input data of the target interval at time T and the input data at time T−L−1 supplied from inner state quantity updating section 12-1, that is the input data at times T−L−1, T−L, . . . , T−2, and T−1, to the RNNs of the nodes in the dynamics storage network supplied from inner state quantity updating section 12-1, score calculating section 12-2 calculates the output data at times T−L−1, T−L, . . . , T−2, and T−1 (data obtained by predicting the input data at times T−L−1, T−L, . . . , T−1, and T) of the nodes in the dynamics storage network and calculates the score on the basis of the output data at times T−L−1 to T−1 (step 16-3).

Specifically, for example, when the output layer of the RNN of each node in the dynamics storage network has I+1 units, the output values at time t−1 of the (i+1)-th unit (where i=0, 1, . . . , I), that is, the value obtained by predicting the input value at time t, is expressed by $X'_{i,t}$, and the ideal output value at time t−1 of the (i+1)-th unit, that is, the (i+1)-th component of the input data (vector) at time t subsequent to time t−1, is expressed by $Y'_{i,t}$, score calculating section 12-2 calculates score S by the use of Expression 3.

$$S = \frac{1}{2} \sum_{t=T-L}^{T} \sum_{i=0}^{I} (Y_{i,t} - X'_{i,t}) \qquad \text{Expression 3}$$

That is, score calculating unit 12-2 calculates the output data at time T−L−1 by using a node in the dynamics storage network as a noted node and inputting the input data at time T−L−1 to the RNN of the noted node. When the output data at time T−L−1 of the noted node is calculated, the updated values of the contexts read from inner state storage unit 1-11 in step 16-2 by inner state quantity updating section 12-1 or the updated values of the contexts calculated in step 16-4 previously performed are used as the initial values of the contexts in addition to the input data at time T−L−1 and the output data at time T−L−1 and the contexts at next time T−L (the contexts which should be input to a context unit of the input layer at next time T−L) are acquired.

Score calculating section 12-2 updates the context of the RNN of the noted node by the use of the context at time T−L and inputs the input data at time T−L to the RNN, thereby acquiring the output data at time T−L and the contexts at time T−L+1.

Similarly, when the input data at time t is input to the RNN, score calculating section 12-2 updates the contexts of the RNNs by the use of the contexts at time t which is acquired at time t−1 previous by one time, acquires the output data at time t and the contexts at time t+1, and finally acquires the output data at time T−1 and the contexts at time T.

Score calculating section 12-2 calculates score S of the noted node from Expression 3 using the input data $Y'_{i,T-L}$ to $Y'_{i,T}$ at time T−L to T and the output data at time T−L−1 to T−1, that is, the data $X'_{i,T-L}$ to $X'_{i,T}$ obtained by predicting the input data at times T−L to T.

When scores S are sequentially calculated using all the nodes in the dynamics storage network as noted nodes, score calculating section 12-2 updates the initial values of the inner state quantity of the nodes in the dynamics storage network by the use of Expression 4 and Expression 5 (step 16-4).

$$\Delta C_{0,j}(n+1) = \eta \delta_{0,j} + \alpha \Delta C_{0,j}(n) \qquad \text{Expression 4}$$

$$C_{0,j}(n+1) = \Delta C_{0,j}(n+1) + C_{0,j}(n) \qquad \text{Expression 5}$$

Here, $\Delta C_{0,j}(n)$ denotes a variation (updated quantity) of the initial value of the context obtained in the n-th step of the repeated calculation using the BPTT algorithm for updating the initial value of the context input to the j-th context unit among the units (context units) of the input layer of the RNN to which the context is input.

$\delta_{0,j}$ denotes an error relative to the initial value of the context input to the j-th context unit and obtained using the BPTT algorithm. $\eta$ is a coefficient called a learning coefficient and $\alpha 0$ is a coefficient called an inertia coefficient.

$C_{0,j}(n)$ denotes the updated value, which is obtained in the n-th step of the repeated calculation using the BPTT algorithm, of the initial value of the context input to the j-th context unit.

In Expression 4 and Expression 5, the updated value $C_{0,j}(n+1)$ in the (n+1)-th step of the initial value of the context is obtained by calculating variation $\Delta C_{0,j}(n+1)$ in the (n+1)-th step using Expression 4 and adding the varied value $C_{0,j}(n)$ in the n-th step to the variation $\Delta C_{0,j}(n+1)$ in the (n+1)-th step to update it.

When the initial values of the contexts of the RNNs as the inner state quantities of the nodes in the dynamics storage network are updated in accordance with Expression 4 and Expression 5, score calculating section 12-2 judges whether the scores of the nodes in the dynamics storage network obtained in step 16-3 are better than a threshold score which is a predetermined threshold value (step 16-5).

When it is judged that the scores of the nodes in the dynamics storage network obtained in step 16-3 are not better than the threshold score as the predetermined threshold value, score calculating section 12-2 performs the process of step 16-3 again to calculate scores S from Expression 3 using the updated value of the initial value of the context obtained in step 16-4 as the initial value of the contexts of the nodes. The same process is repeated subsequently.

On the other hand, when it is judged that the scores of the nodes in the dynamics storage network obtained in step 16-3 are better than the threshold score as the predetermined threshold value, determination section 12-3 determines a node having best score S obtained in step 16-3 previously performed by score calculating section 12-2 among the nodes in the dynamics storage network as the winner node (step 16-6) and output section 12-4 supplies information indicating the winner node determined by determination section 12-3 as recognition result 1-7 to creation unit 1-9.

Inner state quantity updating section 12-1 updates the contents stored in inner state storage unit 1-11 (step 16-7), by storing the initial value of the context (the context at time T−L−1 indicated by mark X in FIG. 15) as the initial value of the inner state quantity, which is obtained in determining the winner node (step 16-3 to step 16-6) in the process of recognizing the input data of the target interval at time T for each node in the dynamics storage network and has a score better than the threshold value, as the score maximizing initial value in inner state storage unit 1-11 and storing the score maximizing initial value in inner state storage unit 1-11 as the updated value of the context at the next time obtained as the initial value of the context (the context at time T−L−1), that is, the context at start time T−L of the target interval at time T.

The context at time T−L−1 as the score maximizing initial value stored in inner state storage unit 1-11 in step 16-6 is read in step 16-10 performed by creation unit 1-9 and is used to create the output data at time T.

The updated value of the context (the context at start time T−L of the target interval at time T when the initial value of the context having a score better than the threshold score) stored in inner state storage unit 1-11 in step 16-6 is read in step 16-2 performed by recognition unit 1-6 at the time of recognizing the input data of the target interval at next time T+1 and is used as a reference of the initial value of the context, that is, as $C_{0,j}(0)$ in Expression 5.

Here, step 16-1 to step 16-7 is the recognition process performed by recognition unit 1-6 in the recognition and creation process.

In this case, the calculation of the scores (step 16-3) and the updating of the initial values of the contexts (step 16-4) are repeated until the scores of the nodes in the dynamics storage network are better than the threshold score. However, the calculation of the scores (step 16-3) and the updating of the initial values of the contexts (step 16-4) may be repeated only by a predetermined number of times or repeated until the scores of the nodes in the dynamics storage network are better than the threshold score or by a predetermined number of times.

Creation unit 1-9 (FIG. 12) performs the creation process (step 16-8 to step 16-11) on the basis of recognition result 1-7 sent from recognition unit 1-6.

That is, in creation unit 1-9, recognition result 1-7 of the input data of the target interval at time T is received from recognition unit 1-6 and is supplied to creation node determining section 12-5.

Creation node determining section 12-5 determines as the creation node the node indicated by recognition result 1-7, that is, the winner node having best score S relative to the input data of the target interval at time T, among the nodes in the dynamics storage network stored in network storage unit 1-5 on the basis of recognition result 1-7 and supplies information indicating the creation node to inner state reading section 12-6 (step 16-8).

In Creation unit 1-9 time-series data creating section 12-7 reads from feature extraction unit 1-3 the input data corresponding to the total L+2 times of the input data corresponding to the L+1 times of the target interval at time T and the input data at time T−L−1 previous by one time to end time T−L in the target interval (step 16-9).

In Creation unit 1-9, inner state reading section 12-6 recognizes the creation node on the basis of information supplied from the creation node determining section 12-5 in step 16-8.

Then, inner state reading section 12-6 reads from inner state storage unit 1-11 the updated value of the initial value of the context of the creation node among the updated values (values indicated by mark X in FIG. 15) of the initial values of the contexts, which are obtained in determining the winner node in the process of recognizing the input data in a target interval at previous time T and stored in inner state storage unit 1-11, reads the (parameters of the) RNN of the creation node in the dynamics storage network from network storage unit 1-5, and sets the updated value of the initial value of the context read from inner state storage unit 1-11 (the initial value of the context of the creation node (winner node) which is obtained in determining the winner in the process of recognizing the input data of the target interval at previous time T and which has a score better than a threshold score) as the initial value of the context of the RNN of the creation node.

Thereafter, inner state reading section 12-6 supplies the RNN of the creation node to time-series data creating section 12-7 (step 16-10).

Time-series data creating section 12-7 acquires the output data at time T (data obtained by predicting the input data at time T+1) by sequentially inputting the input data at time T−L−1 and the input data in the target interval at time T read in step 16-9 to the RNN of the creation node supplied from inner state reading section 12-6 (step 16-11).

That is, time-series data creating section 12-7 acquires the output data at time T−L−1 by inputting the input data at time T−L−1 to the RNN of the creation node supplied from inner state reading section 12-6. When the output data at time T−L−1 is obtained for the creation node, the context at time T−L−1 (the updated initial value of the context) read from inner state storage unit 1-11 in step 16-10 is used in addition to the input data at time T−L−1 to acquire the output data at time T−L−1 and to acquire the context at time T−L (the context which should be input to the context unit of the input layer at time T−L.

Time-series data creating section 12-7 updates the context of the RNN of the creation node by the use of the context at time T−L and inputs the input data at time T−L to the RNN, thereby obtaining the output data at time T−L and the context at time T−L+1.

Similarly, when the input data at time t is input to the RNN, time-series data creating section 12-7 updates the context of the RNN by the use of the context at time t obtained at time t−1 previous by one time thereto, acquires the output data at time t and the context at time t+1, and finally obtains the output data at time T and the context at time T+1.

The output data at time T, that is, the data obtained by predicting the input data at time T+1, is supplied to output section 12-8 from time-series data creating section 12-7 and then output.

In FIGS. 13 to 16, the input data at time T or the input data in the target interval at time T is recognized and then only the output data at time T corresponding to one time step. However, the output data corresponding to a plurality of time steps after time T may be created on the basis of the input data at time T or the recognition result of the input data of the target interval at time T.

That is, as described above, By sequentially repeating the processes of calculating the output data at time T and the context at time T+1, updating the context of the RNN by the use of the context at time T+1, and giving the output data at time T as the input data at time T+1 to the RNN, it is possible to create the output data at plural times posterior to time T.

In FIGS. 14 and 15 (second method), in step 16-7, the initial values of the contexts (the contexts at time T−L−1 indicated by mark X in FIG. 15) as the initial values of the inner state quantities which are obtained in determining (steps 16-3 to 16-6) the winner node in the process of recognizing the input data of the target interval at time T for the nodes in the dynamics storage network are stored as the score maximizing initial value in inner state storage unit 1-11 and the context at the next time in which the score maximizing initial value is obtained as the initial value of the context (here, the context at time T−L−1), that is, the context at start time T−L of the target interval at time T, is stored as the updated value of the context in inner state storage unit 1-11. That is, the context at time T−L−1 as the score maximizing initial value and the context at next time T−L as the updated value of the context in which the score maximizing initial value is obtained as the initial value of the context are stored in inner state storage unit 1-11. However, inner state storage unit 1-11 may store only the context at time T−L−1 as the score maximizing initial value and the context at time T−L−1 as the score maximizing initial value among the context at next time T−L as the updated value of the context.

However, when only the context at time T−L−1 is stored as the score maximizing initial value in inner state storage unit 1-11, it is necessary to acquire the context at next time T−L as the updated value of the context by using the context at time T−L−1 as the score maximizing initial value stored in inner state storage unit 1-11 and the input data at time T−L−1 at time of recognizing the input data of the target interval at next time T+1 and then to use the context at time T−L as a reference of the initial value of the context.

In FIGS. 14 and 15 (second method), in step 16-7, the initial values of the contexts (the contexts at time T−L−1 indicated by mark X in FIG. 15) as the initial values of the inner state quantities which are obtained in determining the winner node (steps 16-3 to 16-6) in the process of recognizing the input data of the target interval at time T for the nodes in the dynamics storage network are stored as the score maximizing initial value in inner state storage unit 1-11. However, the contexts at time T as the updated values of the contexts in which the score maximizing initial values are obtained as the initial values of the contexts may be stored in inner state storage unit 1-11, instead of the contexts at time T−L−1 as the score maximizing initial values.

In this case, the creation of the output data at time T can be performed by inputting the context at time T as the updated values of the contexts stored in inner state storage unit 1-11 and the input data at time T to the RNN of the creation node.

Test Result

Next, test results of the above-mentioned learning, recognition, recognition and creation tests will be described.

First, test conditions will be described.

In the test, eight sensor motor signals in total, in which two sensor motor signals are provided for each of four types of rhythmic movement patterns, were prepared as a sensor motor signal for the robot. The sensor motor signals do not have a label indicating a movement pattern type. Time-series data corresponding to 50 steps (samples) (times) of a twelve-dimensional vector for representing a joint angle of both arms of the robot were used as features of the sensor motor signals, i.e., input data.

The number of nodes in dynamics storage network was sixteen, and the RNN was adopted as dynamical approximate model 6-1 of each node. The RNN used in the test includes twelve input units (units in an input layer), twelve output units (units in an output layer), four hidden units (units in a layer hidden between the input layer and the output layer) and two context units.

As shown in FIG. 5, links were provided so that the spatial arrangement of 16 nodes of the dynamics storage network is a two-dimensional arrangement of 4×4. Therefore, in learning, the distance from winner nodes was determined on the basis of the distance determined from the two-dimensional arrangement.

In addition, the number H of time-series data (learning data) which can be stored in learning data storage unit 6-2 of each node (FIG. 6) was set to 100 (H=100) and the time-series data were updated to have a relation of α: (H−α) in accordance with learning weight α. Here, learning weight α was given in Expression (1), G=6, γ=0.5, and Δ=1 were set, and learning weight α was adjusted by allowing Δ to gradually approach "0" with advancement of the learning.

In updating the time-series data (learning data), α input data were added and a time-series data were deleted from the oldest time-series data of the H time-series data before addition.

Here, the learning weight α was made to be an integer by rounding up the value obtained from Expression 1. The learning of the dynamics storage network was performed in online and 1000 times of input of the sensor motor signals were performed by repeatedly using 8 sensor motor signals.

The BPTT method (BPTT algorithm) was used to learn the parameters of the RNN and the least square error of a prediction output was used to calculate a score.

Figure 17:
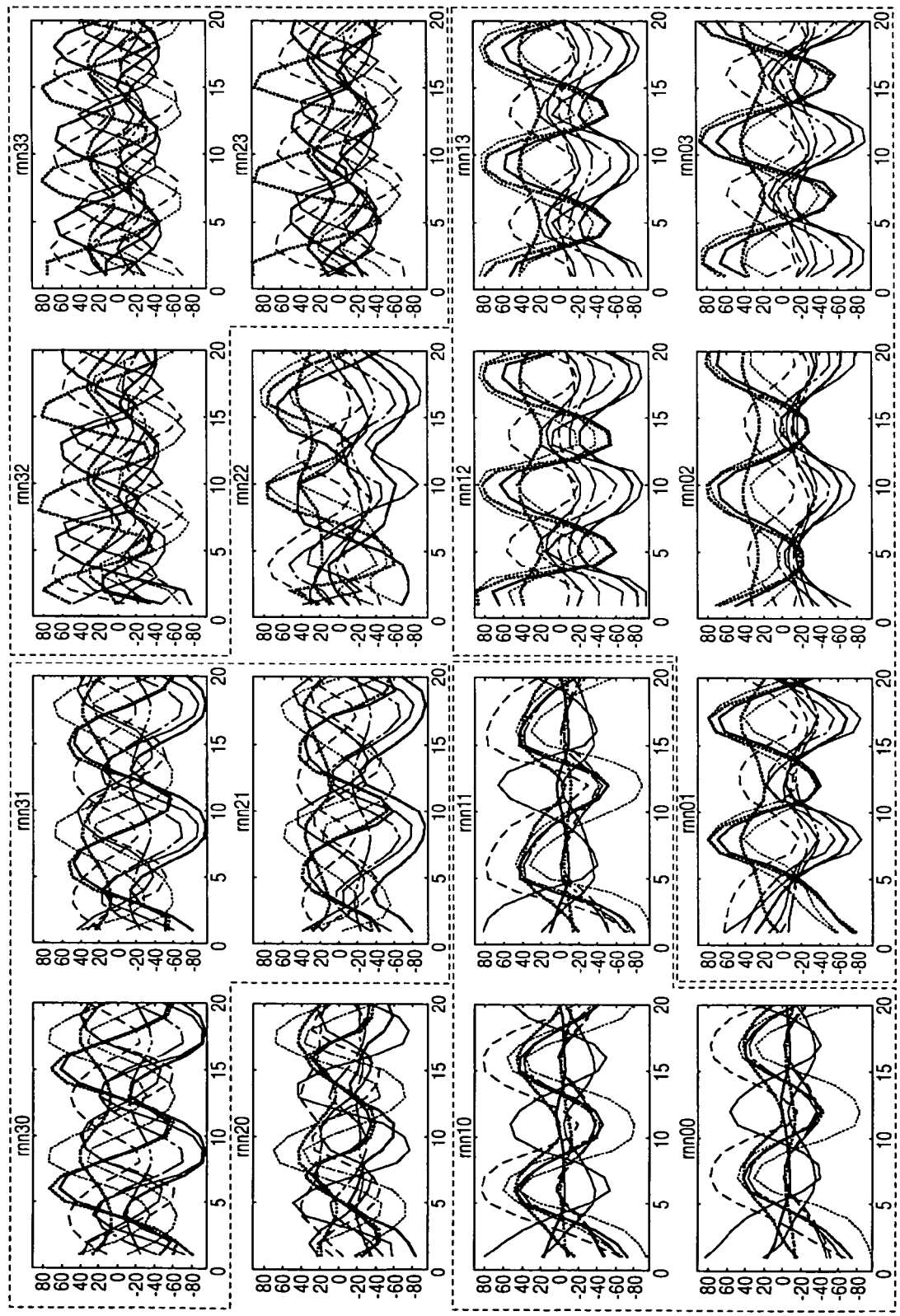
FIG. 17 is a diagram illustrating a test result of investigation of time-series data corresponding to 20 steps and being created from each node.
Figure 18:
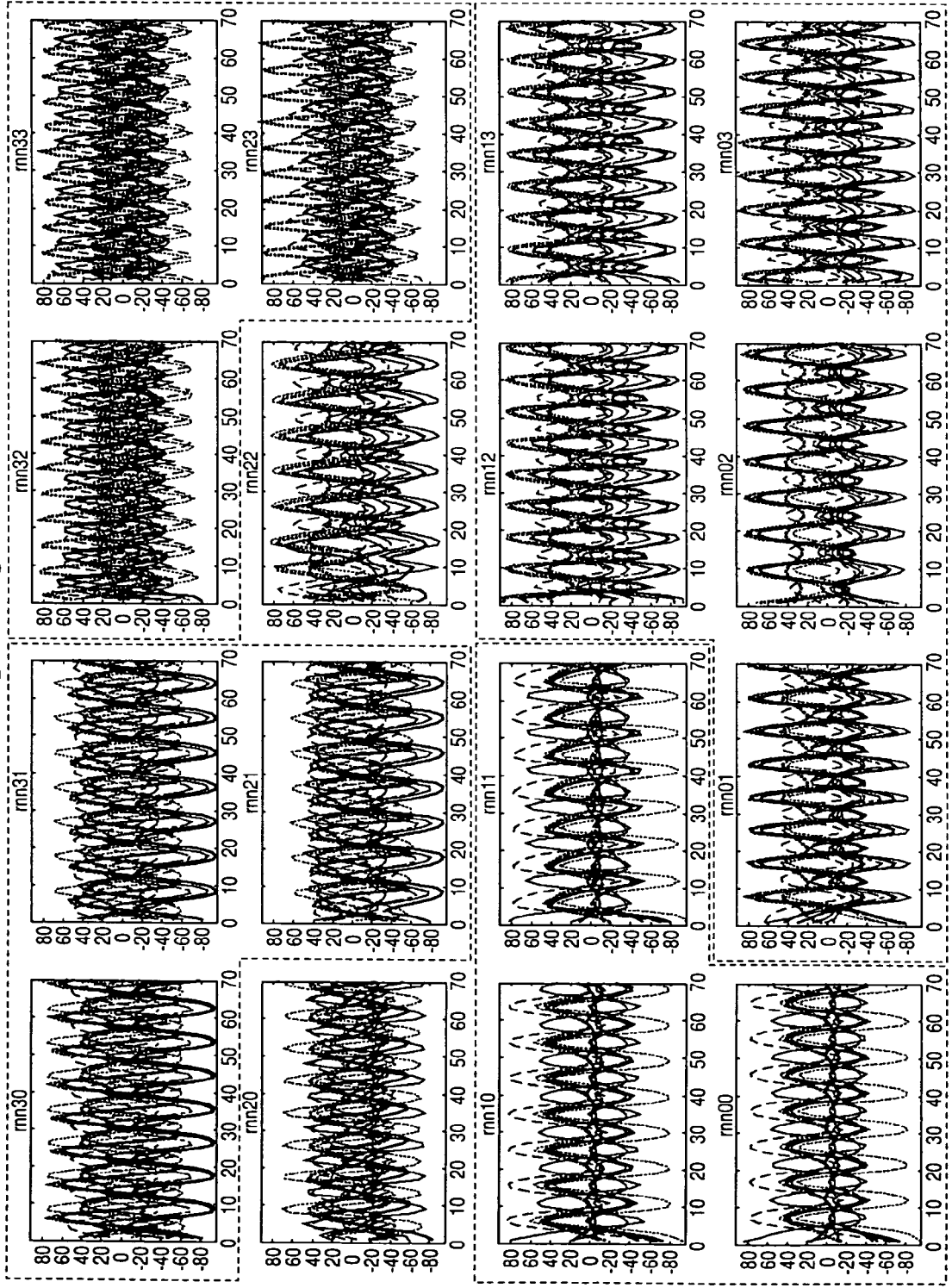
FIG. 18 is a diagram illustrating a test result of investigation of time-series data corresponding to 70 steps and being created from each node.

FIGS. 17 and 18 are graphs illustrating time-series data of (components) twelve-dimensional vectors created from the dynamics stored in the RNNs of the 4×4 nodes.

In the graphs, the horizontal axis denotes a time step and the vertical axis denotes a normalized value of a joint angle for the RNN.

In FIGS. 17 and 18, the graph in the i-th from the left end and the j-th from the upper end indicates the time-series data created from the dynamics stored in the RNN of the node in the i-th from the left end and the j-th from the upper end among the 4×4 nodes.

While the data length (time step) of the time-series data given at the time of learning is 50 steps, FIG. 17 shows the time-series data at the time of creating data corresponding to 20 steps smaller than those at the time of learning and FIG. 18 shows the time-series data at the time of creating data corresponding to 70 steps larger than those at the time of learning.

It can be confirmed from FIGS. 17 and 18 that each node can learn the dynamics creating 4 types of rhythmic movement patterns and that the similar nodes of the dynamics are arranged two-dimensionally in one node (the time-series data of which waveforms are similar are surrounded with a dotted line in FIGS. 17 and 18).

It can be confirmed from FIG. 18 that the time-series data longer than the respective nodes can create the time step of the time-series data given at the time of learning.

It can be confirmed from the test results shown in FIGS. 17 and 18 that the RNN of each node in the dynamics storage network does not simply store the time-series data given at the time of learning as an orbit, but extracts and learns the periodical dynamics of the time-series data, and that the RNN can create the time-series data having a length corresponding to the periodical dynamics of the time-series data given at the time of learning as the learning result.

Figure 19:
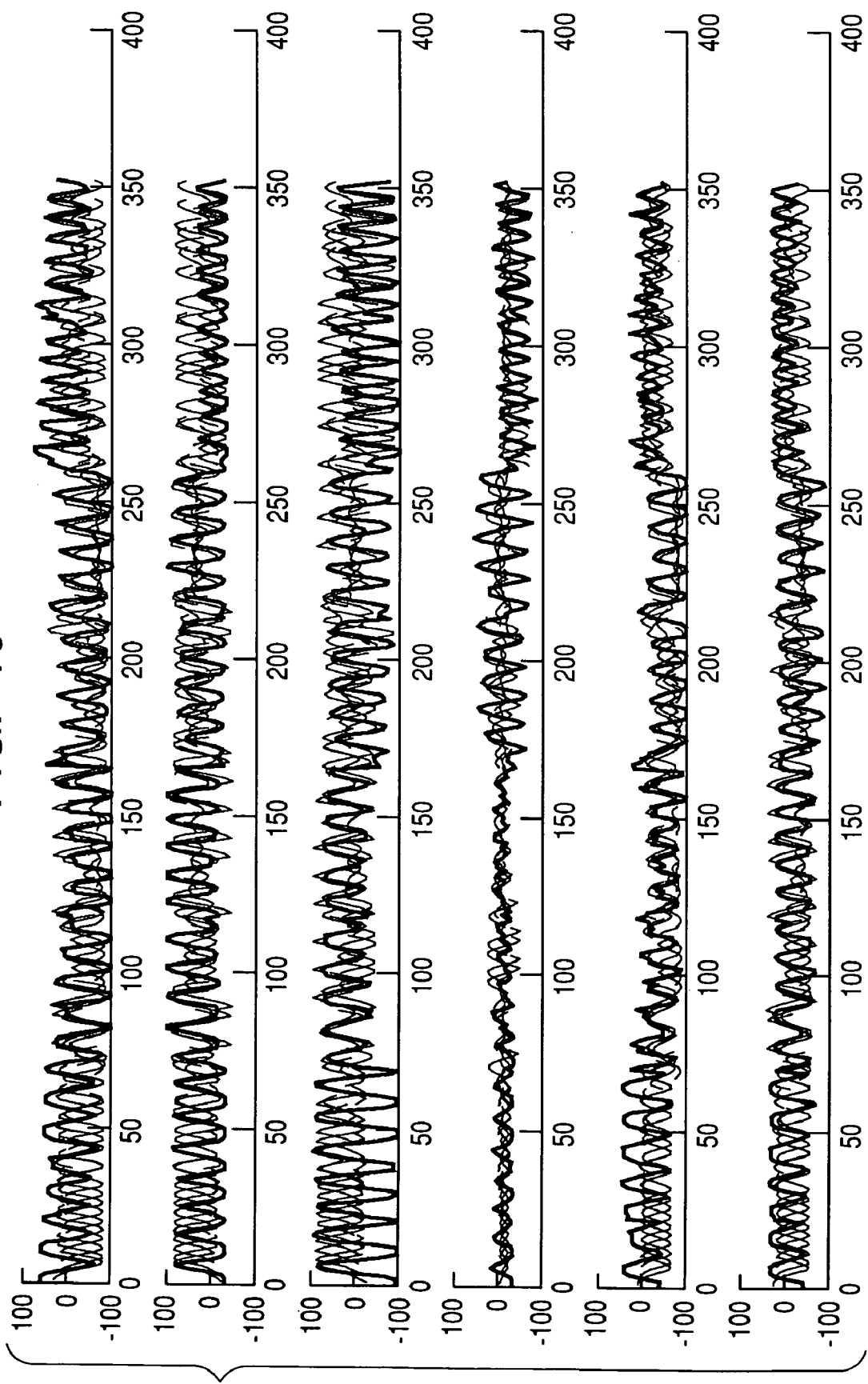
FIG. 19 is a diagram illustrating a test result of time-series data created from continuous inputs without considering an inner state quantity of a node and an external input.
Figure 20:
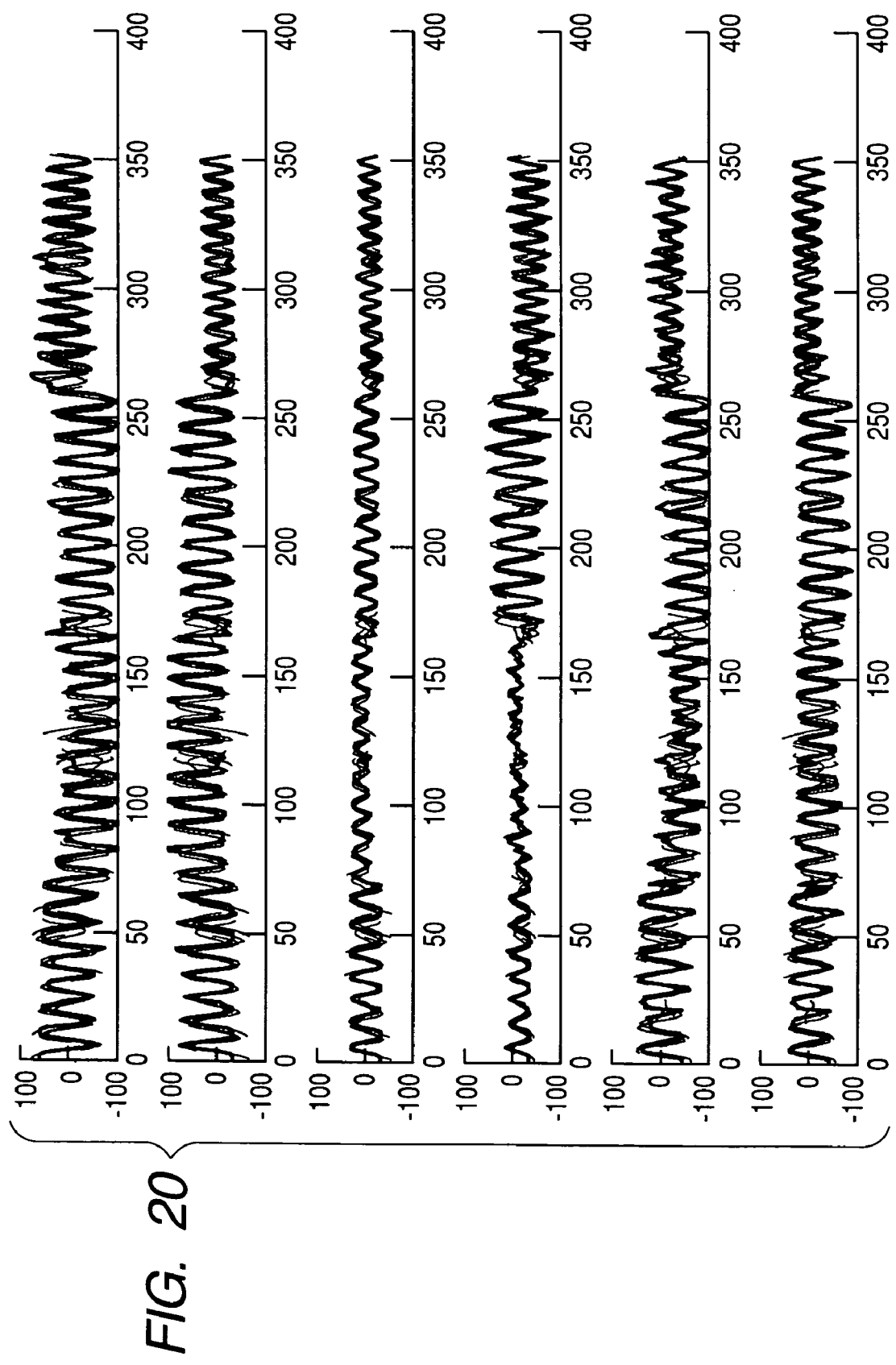
FIG. 20 is a diagram illustrating a test result of time-series data created from continuous inputs in consideration of an inner state quantity of a node and an external input.

FIGS. 19 and 20 show time-series data (thick line) in which 8 time-series data given at the time of learning is combined into one and time-series data (thin line) created in each recognition and creation process by sequentially performing the recognition and creation process to the time-series data, respectively.

In the figures, the horizontal axis denotes a time step and the vertical axis denotes a normalized value of a joint angle for the RNN. In FIGS. 19 and 20, (components of) 6 dimensions of (components of) the 12-dimensional vector as the time-series data are shown.

The sequential recognition and creation process was performed by using the time-series data corresponding to 30 steps as the process target (input data of a target interval) and retarding the categories corresponding to 30 steps to be processed by one step.

In the recognition and creation process, FIG. 19 shows the time-series data created without considering an external input (the time-series data of features extracted by feature extraction unit 1-3) or the updated inner state quantity (initial value of the inner state quantity stored in inner state storage unit 1-11) and FIG. 20 shows the time-series data created in consideration of the external input or the updated inner state quantity.

Although the time-series data shown in FIGS. 19 and 20 are obtained using the dynamics storage network in the same learning result, it can be confirmed that the time-series data shown in FIG. 20 created in consideration of the inner state quantity and the like are synchronized in phase with the external input (the time-series data to be recognized), compared with the time-series data shown in FIG. 19 created without considering the inner state quantity and the like.

From the test result, it can be said that the unsupervised learning of the dynamics without a correct label using the above-mentioned learning method is more effective.

It can be also said that it is possible to continuously create the time-series data synchronized with the external input by the use of the above-mentioned recognition and creation method.

Although the label indicating which types of sensor motor signals the time-series data used for the learning correspond to was used in the test, the label is used only for the test and the label is not used in the actual learning at all.

In the data processor shown in FIG. 1 described above, it is possible to perform a practical learning process without any entire optimization reference so as to learn a plurality of dynamics, which was not sufficient in the past.

That is, in the data processor shown in FIG. 1, first, the dynamical approximate model having an inner state quantity is used to hold the dynamical characteristics of the measured time-series data. Learning unit 1-4 learns the parameters of the dynamics storage network by introducing the dynamics storage network which is a network using the dynamical approximate model as a node.

Here, the online learning based on the SMA is used in the learning operation of learning unit 1-4. The RNN (Recurrent Neural Network) is used as the dynamical approximate model having an inner state quantity. In this case, the nodes constitute a large-scaled network provided by the RNN and the parameters thereof can be self-organizationally learned.

That is, it is possible to self-organizationally learn the parameters of the dynamics storage network as a large-scaled network including the nodes, each of which has the dynamical approximate model for modeling the dynamics, without providing a correct label to the measured time-series data. By employing the learning result, it is possible to recognize the time-series data. It is also possible to create the time-series data from the nodes. By using the self-organizational learning, it is possible to classify or analyze the time-series data.

Additional Learning

Next, an additionally learning operation will be described.

When the learning of the dynamics storage network goes ahead, the dynamics of the nodes in the dynamics storage network little vary with new input data and (the dynamics of the nodes held in) the dynamics storage network is so-called converged.

That is, the dynamics storage network forms a self-organizational structure with the lapse of time by having a plurality of experiences in learning and then has a resistance which destructs the structure even with a more or less change.

That is, after the dynamics of a category are acquired from a sufficient number of input data by learning the sufficient number of input data, the dynamics storage network has such a resistance that the dynamics of the nodes are little affected by the input data even when the input data has the dynamics not included in the category.

Here, the dynamics storage network has such a resistance by reducing the variable $\Delta$ in Expression 1 with the advancement of learning (the lapse of time) as described above, in acquiring the learning weight $\alpha$ in Expression 1.

As described above, when the dynamics held in the nodes of the dynamics storage network are converged, the dynamics storage network has a resistance to the input data of the dynamics (hereinafter, referred to as non-acquired dynamics) included in the category of the dynamics (hereinafter, referred to as acquired dynamics) acquired in the previous learning. However, it is difficult to additionally acquire the non-acquired dynamics due to trade-off thereof, particularly, to perform the learning (hereinafter, referred to as additional learning) while meaningfully maintaining the existing structure of the converged dynamics storage network.

That is, in order for the converged dynamics storage network to newly acquire the non-acquired dynamics, it is necessary to correct the existing category structure of the converged dynamics storage network. However, in the course of correction, the dynamics (acquired dynamics) held in the nodes may be destructed unnecessarily, thereby making the previous learning useless.

Since the diversity of the non-acquired dynamics is very wide, it is difficult and it takes time to learn the dynamics having the wide diversity without any clue.

In the additional learning operation of acquiring the non-acquired dynamics in the converged dynamics storage network, when the partial re-learning operation is performed with an increased learning coefficient, that is, when the learning operation is performed so that many nodes including the winner node in the dynamics storage network is affected by new input data of non-acquired dynamics by setting great the variable $\Delta$ for obtaining the learning weight $\alpha$ in Expression 1, there a high risk that the existing structure of the converged dynamics storage network (the dynamics acquired by the converged dynamics storage network or the positional relation between the nodes holding the dynamics) may be destructed.

Accordingly, as another method of performing the additional learning operation, there is a method of performing again the self-organizational learning while simultaneously using the new data and the existing data every new experience, that is, a method of storing all the input data used in the learning and performing the self-organizational learning again by adding new input data to the input data used in the learning every time new input data is given.

However, since the input data used in the learning should be all stored and it is necessary to perform the previous learning operation again every time the new input data is given, the method is not practical.

Accordingly, an additional learning method in which it is not necessary to perform the previous learning operation and the existing structure of the converged dynamics storage network is not destructed will be described now.

Figure 21:
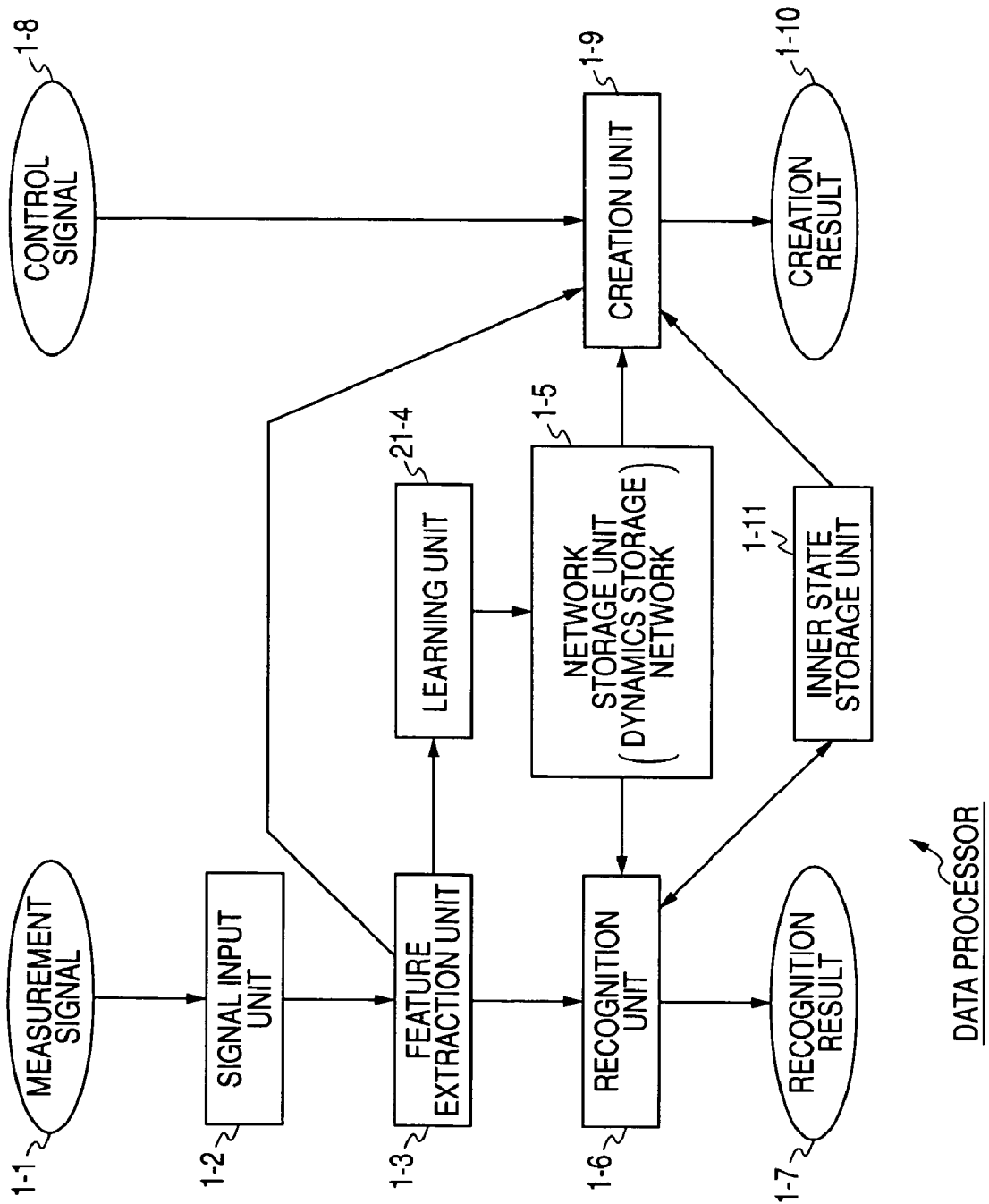
FIG. 21 is a block diagram illustrating a configuration of a data processor according to another embodiment of the invention.

FIG. 21 is a block diagram illustrating an example of the data processor according to another embodiment of the invention.

In the figure, elements corresponding to those of the data processor shown in FIG. 1 are denoted by the same reference numerals and description thereof will be omitted.

The data processor shown in FIG. 21 is similar to the data processor shown in FIG. 1, except that learning unit 21-4 is provided instead of learning unit 1-4.

Here, in the data processor shown in FIG. 21, a dynamics storage network (hereinafter, referred to as network with an additional learning function) including two types of nodes of initial learning nodes prepared in advance and additional learning nodes prepared in advance is stored in network storage unit 1-5.

The initial learning nodes and the additional learning nodes constituting the network with an additional learning function have the same configuration and include dynamical approximate model 6-1 such as RNNs having an inner state quantity and learning data storage unit 6-2 storing learning data for learning parameters of dynamic approximate model 6-1, as shown in FIG. 6.

Similarly to learning unit 1-4 shown in FIG. 1, learning unit 21-4 performs the learning operation (parameter updating) of the network with an additional learning function which is the dynamics storage network stored in network storage unit 1-5 by using the time-series data from feature extracting unit 1-3.

However, learning unit 21-4 judges whether the time-series data from feature extracting unit 1-3 is suitable for the dynamics held in the initial learning nodes of the network with an additional learning function. When it is judged that the time-series data is suitable for the dynamics held in the initial learning nodes of the network with an additional learning function, learning unit 21-4 performs a learning operation of the initial learning node for self-organizationally updating the dynamics held in the initial learning nodes of the network with an additional learning function (hereinafter, referred to as a learning operation of initial learning node) on the basis of the time-series data, similar to learning unit 1-4 shown in FIG. 1.

On the other hand, when it is judged that the time-series data is not suitable for the dynamics held in the initial learning node, learning unit 21-4 performs a learning operation of updating the dynamics held in the additional learning node other than the additional learning node of the network with an additional learning function (hereinafter, referred to as a learning operation of initial learning node) on the basis of the time-series data.

Figure 22:
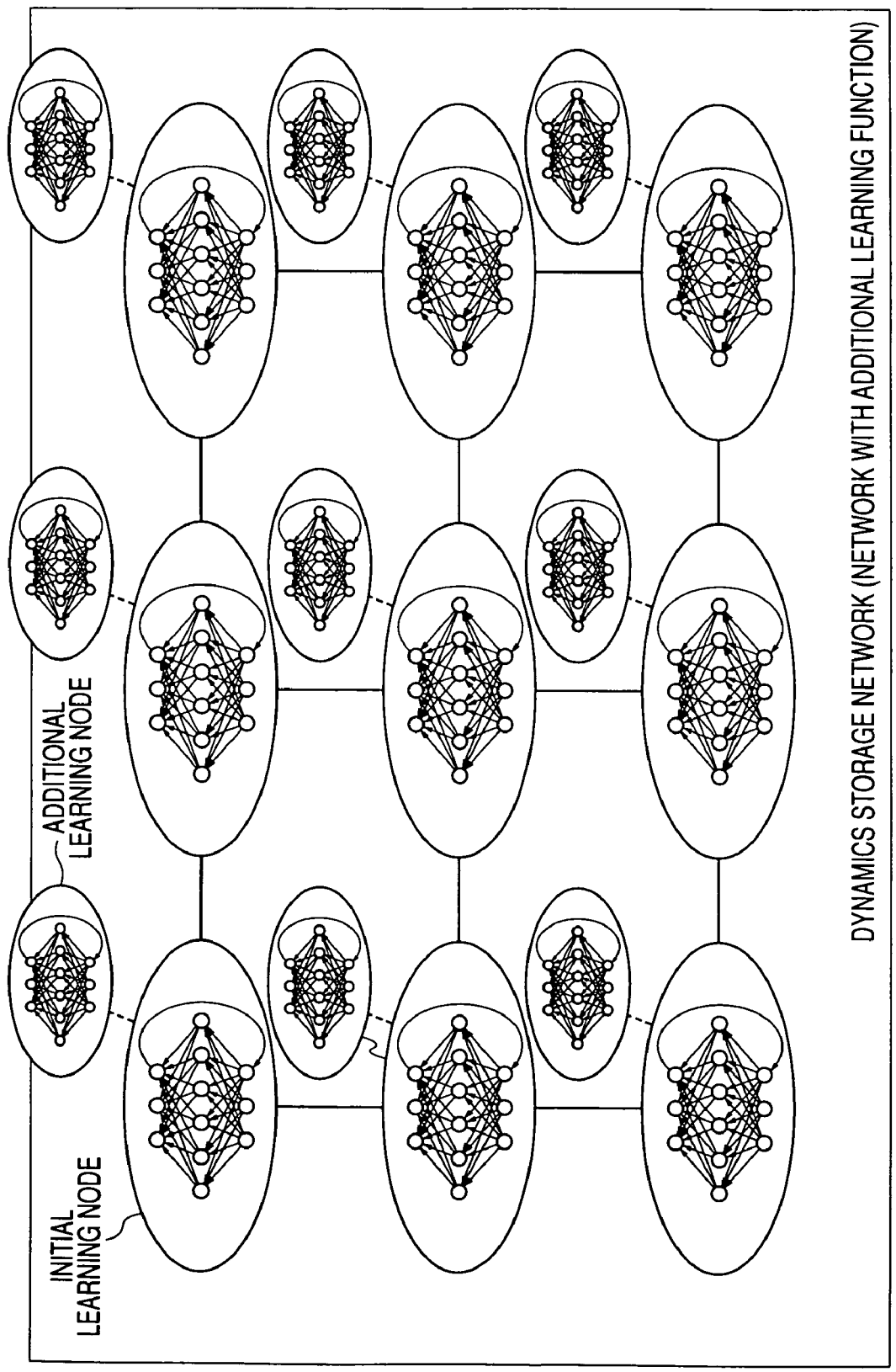
FIG. 22 is a diagram illustrating an example of a network correlated with an additional learning function.

FIG. 22 illustrates an example of the network with an additional learning function.

The network with an additional learning function shown in FIG. 22 is similar to the dynamics storage network shown in FIG. 5 in that it has 9 initial learning nodes and links are given between the nodes so as dispose the 9 initial learning nodes in a two-dimensional arrangement of 3×3.

However, the network with an additional learning function shown in FIG. 22 is different from the dynamics storage network shown in FIG. 5 in that it has additional learning nodes as well as the initial learning nodes corresponding to the nodes of the dynamics storage network shown in FIG. 5 which does not have any initial learning node.

The network with an additional learning function shown in FIG. 22 has 9 additional learning nodes corresponding to the number of initial learning nodes. Moreover, one of the initial learning nodes is correlated with one of the additional learning nodes.

In the network with an additional learning function, the entities of the initial learning nodes and the additional learning nodes are parts of storage area of network storage unit 1-5. Although the initial learning nodes are prepared in advance (i.e., the storage area serving as the initial learning nodes are secured in advance), the additional learning nodes may be prepared in advance or added later similar to the initial learning nodes (i.e., the storage area serving as the additional learning nodes are secured as needed).

Next, a learning process of the network with an additional learning function performed by the data processor shown in FIG. 21 will be described with reference to FIG. 22.

Hereinafter, the initial learning nodes and the additional learning nodes will be simply referred to as a node when it is unnecessary to distinguish both nodes from each other.

The data processor shown in FIG. 21 performs the same processes of steps 23-1 to 23-4 in which the same processes of steps 7-1 to 7-4 in FIG. 7 are performed.

That is, learning unit 21-4 initializes all the parameters of the network with an additional learning function which is the dynamics storage network stored in network storage unit 1-5 (step 23-1). Specifically, appropriate values are given as initial values to the parameters of dynamical approximate model 6-1 having an inner state quantity of the respective nodes of the network with an additional learning function. In this case, for example, when dynamical approximate model 6-1 of the nodes of the network with an additional learning function is an RNN, weights (coupling loads) given to signals input to units of the RNN are used as parameters of dynamical approximate model 6-1 in step 23-1 and appropriate initial values are set and the parameters.

When measurement signal 1-1 is input to signal input unit 1-2, feature extraction unit 1-3 extracts the feature quantity of measurement signal 1-1 in a time-series manner and sends the extracted feature quantity as time-series data to learning unit 21-4 (step 23-2). By using the time-series data sent from feature extraction unit 1-3 as input data, learning unit 21-4 calculates a score of the input data relative to dynamical approximate model 6-1 having an inner state quantity corresponding to (having respective initial learning nodes) the respective node of the network with an additional learning function stored in network storage unit 1-5 while updating the inner state quantity (step 23-3) similar to step 7-3 in FIG. 7.

Learning unit 21-4 determines a winner node which is a node having the best score, that is, an initial learning node suitable for the input data, by comparing the scores of the initial learning nodes constituting the network with an additional learning function (step 23-4).

When the winner node is determined for the input data, learning unit 21-4 judges whether the input data is suitable for the dynamics held in the initial learning node (step 23-5).

When it is judged that the input data is suitable for the dynamics held in the initial learning node, learning unit 21-4 performs a learning operation of the initial learning node for self-organizationally updating the dynamics held in the initial learning nodes of the network with an additional learning function on the basis of the input data, similar to learning unit 1-4 shown in FIG. 1 (step 23-6).

On the other hand, when it is judged that the input data is not suitable for the dynamics held in the initial learning node, learning unit 21-4 performs a learning operation of the additional learning node for updating the dynamics held in the additional learning node of the network with an additional learning function on the basis of the input data (step 23-7).

When the learning operation of the additional learning node in step 23-6 or the learning operation of the additional learning node in step unit 23-7 are performed and subsequent measurement signal 1-1 is input to signal input unit 1-2, learning unit 21-4 performs the process of step 23-2 and processes subsequent to step 23-2 are repeated.

Next, a more specific example of the processes of steps 23-5 to unit 23-7 in FIG. 23 in accordance with a first embodiment of the invention will be described with reference to FIG. 24.

In step 23-4 of FIG. 23, learning unit 21-4 determines a winner node which is a node corresponding to a dynamics most suitable for the input data among the initial learning nodes. Then, in step 24-1, learning unit 21-4 judges whether the input data is suitable for the dynamics held in the initial learning node as the winner node on the basis of a score for the dynamics held in the initial learning node as the winner node, i.e., the degree by which the input data are suitable for the dynamics, for example, by determining whether the score is equal to or greater than a predetermined threshold value.

In step 23-4 of FIG. 23, the initial learning node having a best score for the input data among the initial learning nodes is determined as the winner node. However, when the initial learning nodes of the network with an additional learning function have a poor (lower) score as a whole, it is not appropriate to judge that the dynamics held in the initial learning node determined as the winner node is suitable for the input data.

Moreover, paying attention to one of the initial learning nodes of the network with an additional learning function as a noted node, the noted node may be able to acquire any dynamics in a later learning operation immediately after the start of the learning. However, when the learning proceeds to some extent, since the noted node may have acquired a specific dynamics in a previous learning operation, the noted node is not affected by the input data for a dynamics not included in the category of the specific dynamics in a subsequent learning.

Therefore, when the score of the noted node for the input data is poor as an absolute value but relatively good compared with the score of other initial learning node immediately after the start of the learning, it is approached to judge that the input data is suitable for the dynamics held in the noted node. However, even when the score of the noted node for the input data is poor as an absolute value but relatively good compared with the score of other initial learning node after the learning has proceeded to some extent, it is inappropriate to say that the input data is suitable for the dynamics held in the noted node.

Therefore, in step 24-1, learning unit 21-4 judges whether the input data is suitable for the dynamics held in the initial learning node as the winner node by determining whether the score of the winner node for the input data is equal to or greater than the predetermined threshold value which is not a fixed one but increases with the progress of the learning (with the lapse of time).

In the invention, the predetermined threshold value used in determining whether the input data is suitable for the dynamics held in the winner node will be referred to as a suitable threshold value. The suitable threshold value is prepared for each of the initial learning node that can be the winner node.

In step 24-1, when it is judged that the input data is suitable for the dynamics held in the initial learning node as the winner node, i.e., when the score of the winner node for the input data is equal to or greater than the suitable threshold value of the winner node (the initial learning node as the winner node), learning node 21-4 performs a process of step 24-2 in which the suitable threshold value of the winner node is updated by increasing the value.

Thereafter, learning unit 21-4 sequentially performs processes of steps 24-3 and 24-4 in a similar manner to the case of steps 7-5 and 7-6 in FIG. 7 in which a learning process of the initial learning node for self-organizationally updating the dynamics held in the initial learning node of the network of an additional learning function is performed on the basis of input data.

That is, in step 24-3, learning unit 21-4 determines learning weights a of the initial learning nodes about the winner node in accordance with Formula 1 in a similar manner to the case of step 7-5 in FIG. 7 and performs a process of step 24-4.

In step 24-4, learning unit 21-4 updates the parameters of dynamical approximate model 6-1 having an inner state quantity of the initial learning nodes in accordance with the learning weights in a similar manner to the case of step 7-6 in FIG. 7 and performs again the process of step 23-2 in FIG. 23.

On the other hands in step 24-1, when it is determined that the input data is not suitable for the dynamics held in the initial learning node as the winner node, i.e., when the score of the winner node for the input data is not equal to or greater than the suitable threshold value of the winner node, learning node 21-4 sequentially performs processes of steps 24-5 and 24-6 in which a learning operation of the additional learning nodes other than the initial learning nodes is performed.

That is, in step 24-5, learning unit 21-4 specifies the additional learning nodes correlated with the initial learning node as the winner node as an additional learning target on the basis of the winner node.

Specifically, as illustrated in FIG. 22, for example, when one of the initial learning nodes is correlated with one of the additional learning nodes, the additional learning node correlated with the initial learning node as the winner node is specified as the additional learning target.

In this case, assuming that the additional learning node specified as the additional learning target is a target node, the additional learning node that can be a target node (or the storage area thereof) may be prepared in advance in a static manner or dynamically generated when the additional learning nodes are actually specified as the target node for the additional learning.

In step 24-5, when the target node is specified, learning unit 21-4 performs a process of step 24-6 in which a learning operation of the additional learning node for updating the dynamics held in the target node to be close to the input data is performed.

That is, learning unit 21-4 updates parameters of the target node in a similar manner to the case of those described in connection with FIG. 9.

Moreover, although the learning weights α is important when updating parameters in FIG. 9, a fixed value such as 1 is used as the learning weights α when updating target parameters of the additional learning nodes.

When the learning operation of the additional learning nodes are performed in step 24-6, a process of step 23-2 in FIG. 23 is performed.

Figure 24:
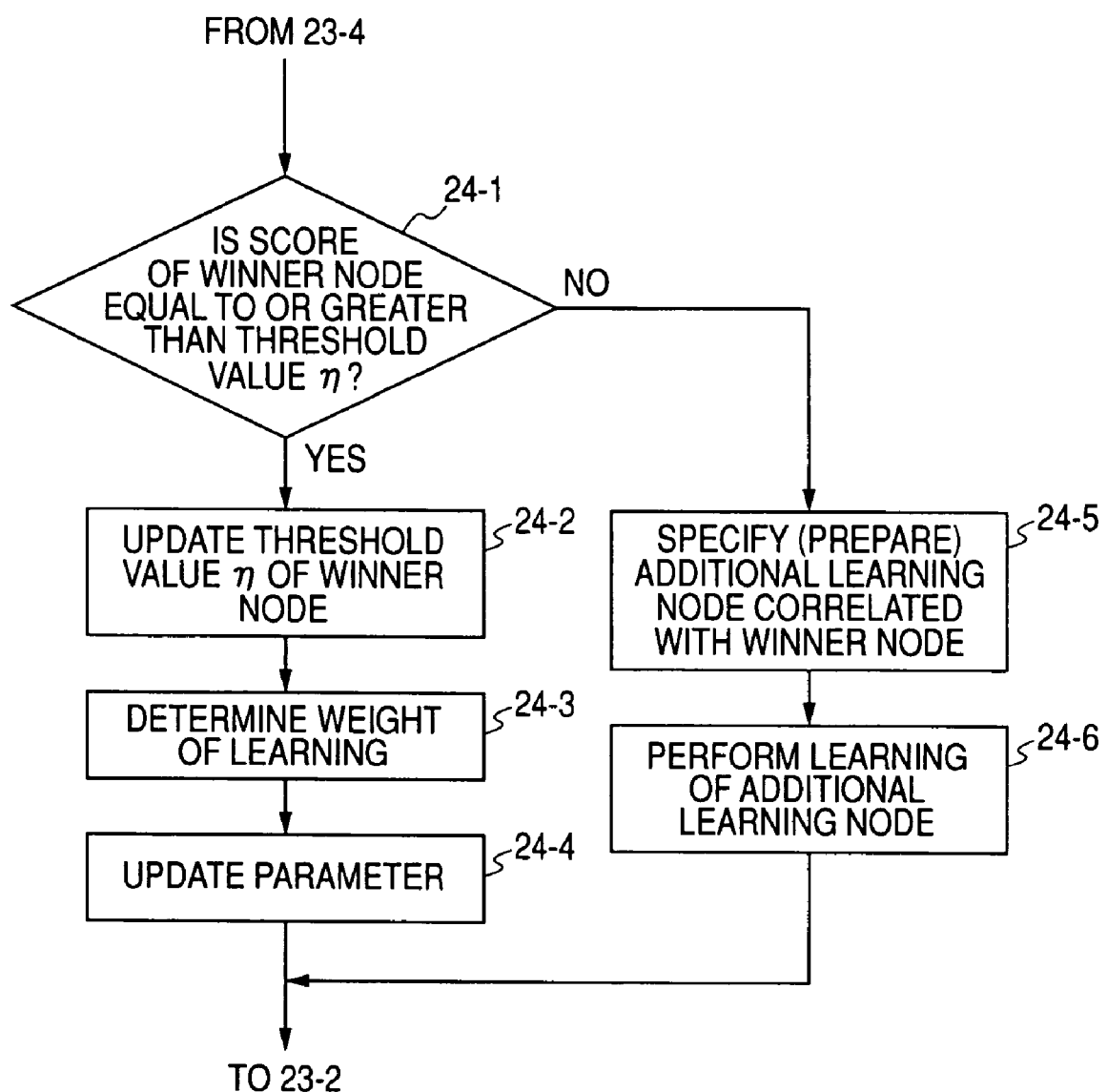
FIG. 24 is a flowchart illustrating a first specific embodiment of the processes of steps 23-5 to unit 23-7 of FIG. 23.

The step 24-1 in FIG. 24 corresponds to step 23-5 in FIG. 23. Moreover, steps 24-2 to 24-4 in FIG. 24 correspond to step 26-3 in FIG. 23 and steps 24-5 and 24-6 in FIG. 24 correspond to step unit 23-7 in FIG. 23.

Next, a more specific example of the processes of steps 23-5 to unit 23-7 in FIG. 23 in accordance with a second embodiment of the invention will be described with reference to FIG. 25.

In step 23-4 of FIG. 23, learning unit 21-4 determines a winner node which is a node corresponding to a dynamics most suitable for the input data among the initial learning nodes. Then, in step 25-1, learning unit 21-4 judges whether the network with an additional learning function is in a converged state.

In step 25-1, the converged state of the network with an additional learning function is judged, for example, by determining whether a predetermined sufficient time has passed after the start of the learning, i.e., whether the number of learning operations (the number of input data in step 23-2 in FIG. 23) is equal to or greater than a sufficient number as a predetermined threshold value.

In step 25-1, when it is judged that the network with an additional learning function is not in a converted state, i.e., when the number of learning operations is smaller than the predetermined threshold value, learning unit 21-4 skips the process of step 25-2 and sequentially performs processes of steps 25-3, 25-4 and 25-5 in which the same processes of steps 24-2, 24-3 and 24-4 in FIG. 24 are performed.

That is, in step 25-3, learning node 21-4 updates the suitable threshold value of the winner node by increasing the value. In steps 25-4 and 25-5, learning unit 21-4 performs a learning process of the initial learning node for self-organizationally updating the dynamics held in the initial learning node of the network of an additional learning function on the basis of input data. Then, the process of step 23-2 in FIG. 23 is performed again.

On the other hand, in step 25-1, when it is judged that the network with an additional learning function is in a converted state, i.e., when the number of learning operations is equal to or greater than the predetermined threshold value, learning unit 21-4 performs the process of step 25-2. In a similar manner to the case of step 24-1 in FIG. 24, in step 25-2, learning unit 21-4 judges whether the input data is suitable for the dynamics held in the initial learning node as the winner node on the basis of a score for the dynamics held in the initial learning node as the winner node, i.e., the degree by which the input data are suitable for the dynamics, for example, by determining whether the score is equal to or greater than a predetermined threshold value.

In step 25-2, when it is judged that the input data is suitable for the dynamics held in the initial learning node as the winner node, i.e., when the score of the winner node for the input data is equal to or greater than the suitable threshold value of the winner node, learning node 21-4 performs processes of steps 25-3, 25-4 and 25-5 in which the process of updating the suitable threshold value of the winner node (step 25-3) and the learning process of the initial learning nodes (steps 25-4 and 25-5) are performed. Then, the process of step 23-2 in FIG. 23 is performed again.

On the other hand, in step 25-2, when it is judged that the input data is not suitable for the dynamics held in the initial learning node as the winner node, that is, when the score of the winner node relative to the input data is not equal to or greater than the threshold value suitable for the winner node, learning unit 21-4 sequentially performs the processes of steps 24-5 and 24-6 of FIG. 24, in step 25-6 and step 25-7.

That is, in step 25-6, learning unit 21-4 specifies the additional learning node correlated with the initial learning node which is the winner node as the target node to be additionally learned on the basis of the winner node and then performs step 25-7.

In step 25-7, learning unit 21-4 performs the learning operation of the additional learning node updating the dynamics held in the target node to be close to the input data, i.e., as described in FIG. 9, learning unit 21-4 updates the parameter of the target node and then performs again step 23-3 of FIG. 23.

Figure 25:
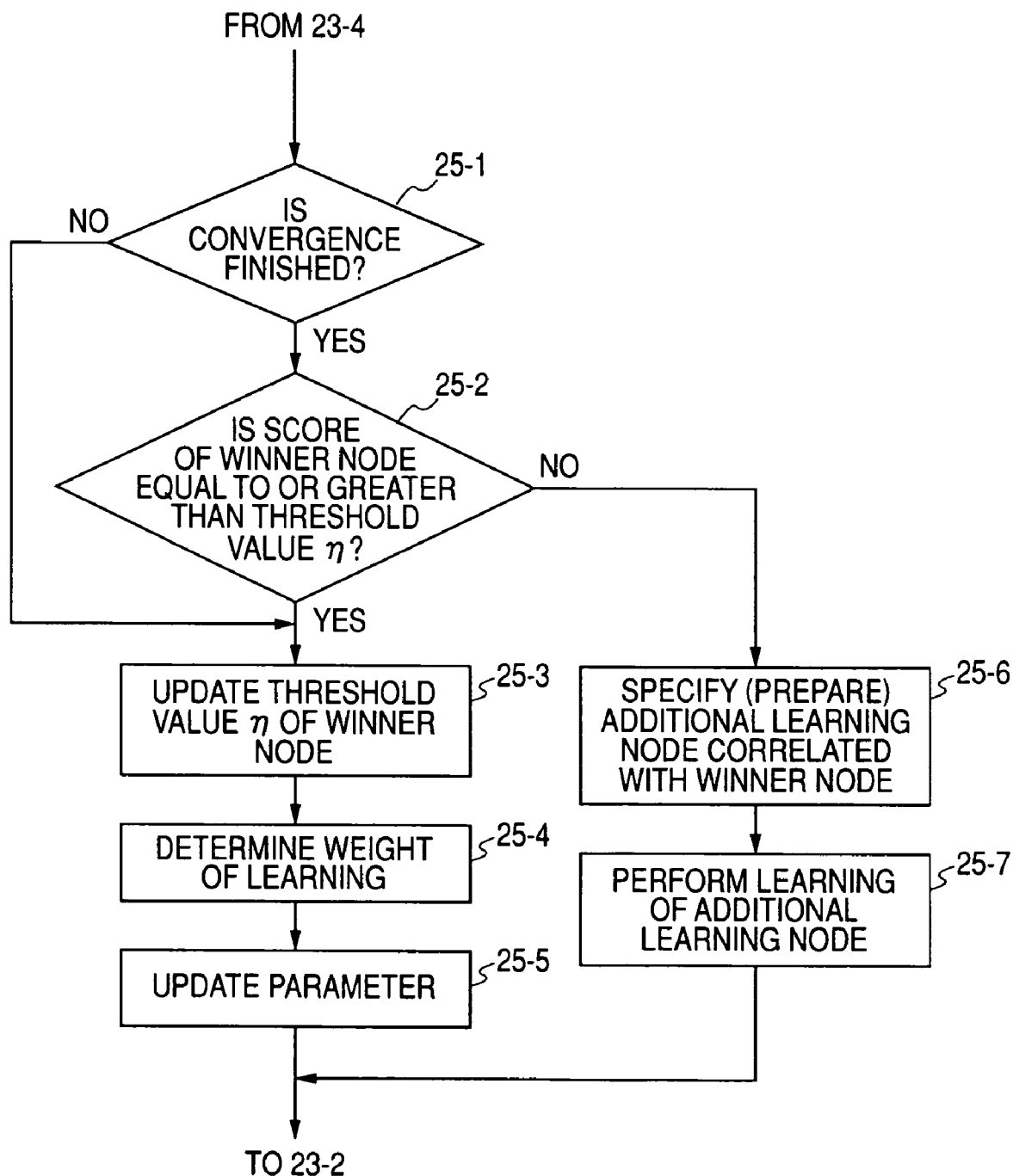
FIG. 25 is a flowchart illustrating a second specific embodiment of the processes of steps 23-5 to unit 23-7 of FIG. 23.

In addition, steps 25-1 and 25-2 of FIG. 25 correspond to step 23-5 of FIG. 23. Steps 25-3 to 23-5 of FIG. 24 correspond to 23-6 of FIG. 23. Steps 25-6 and 25-7 of FIG. 24 correspond to step unit 23-7 of FIG. 23.

As described above, in the data processor shown in FIG. 21, the network with an additional learning function which can be constructed by two types of nodes of the initial learning node prepared in advance and the additional learning node added later or prepared in advance is employed as the dynamics storage network and it is judged whether the input data is suitable for the dynamics held in the initial learning node. In addition, when it is judged that the input data is suitable for the dynamics held in the initial learning node, the learning operation of the initial learning node self-organizationally updating the dynamics held in the initial learning node is performed on the basis of the input data. On the other hand, when it is judged that the input data is not suitable for the dynamics held in the initial learning node, the additional learning operation of the additional learning node updating the dynamics held in the additional learning node is performed.

When the input data is suitable for the dynamics held in the initial learning node, that is, when the input data is the data on the dynamics (the acquired dynamics) included in the category of the dynamics held in the initial learning node constituting the network with an additional learning function, the learning operation of the initial learning node self-organizationally updating the dynamics held in the initial learning node is performed on the basis of the input data.

On the other hand, when the input data is not suitable for the dynamics held in the initial learning node, that is, when the input data is the data on the dynamics (the non-acquired dynamics) not included in the category of the dynamics held in the initial learning node constituting the network with an additional learning function, the learning operation of the additional learning node updating the dynamics not held in the initial learning node but in the additional learning node is performed so that the network with an additional learning function does not destruct the dynamics already acquired by the initial learning node.

As a result, the learning operation can be finished without performing again the learning operation from the start and the additional learning operation can be performed without destructing the structure of the converged dynamics storage network (network with an additional learning function).

Next, it is judged on the basis of a relation between the score of the initial learning node as the winner node and the threshold value suitable for the initial learning node, as described with reference to FIG. 24 or 25, whether the input data is suitable for the dynamics held in the initial learning node. The suitable threshold value can be obtained, for example, by the use of Expression 6.

$$p^{ij} = k \cdot \eta_0^{ij} \cdot \gamma(t) \qquad \text{Expression 6}$$

Expression 6 is on the premise that the links for constructing the two-dimensional arrangement structure are given to the initial learning nodes constituting the network with an additional learning function as shown in FIG. 22. In Expression 6, $P^{ij}$ denotes the threshold value of the initial learning node arranged at position (i,j) in the i-th from the left end and the j-th from the upper end.

In Expression 6, k is a constant. $\eta_t^{ij}$ denotes a predicted value of the score (predicted score value) of the initial learning node at position (i,j) in which the input data is suitable for the dynamics held in the initial learning node at position (i,j) at the time of the t-th learning (learning using the t-th input data) and is given in Expression 7.

$$\eta_0^{ij} = 0$$
$$\eta_{t+1}^{ij} = \begin{cases} \max(s_t, \eta_t^{ij}) \\ \eta_t^{ij} \end{cases} \qquad \text{Expression 7}$$

In Expression 7, the predicted score value $\eta_{t+1}^{ij}$ of the initial learning node at position (i,j) has an initial value $\eta_0^{ij}$ of 0 and is updated to $\max(s_t, \eta_t^{ij})$ or $\eta_t^{ij}$.

That is, in the initial learning node which is the winner node at the time of the t-th learning, the larger value $\max(s_t, \eta_t^{ij})$ of the score $s_t$ obtained at the time of the t-th learning and the predicted score value $\eta_t^{ij}$ at the time of the t-th learning becomes the predicted score value $\eta_{t+1}^{ij}$ at the time of the (t+1)-th.

On the other hand, in the initial learning node which is not the winner node at the time of the t-th learning, the predicted score value $\eta_t^{ij}$ at the time of the t-th learning becomes the predicted score value $\eta_{t+1}^{ij}$ at the time of the (t+1)-th learning.

The predicted score value may be obtained from Expression 8, instead of Expression 7.

$$\eta_0^{ij} = 0$$

$$\eta_{t+1}^{ij} = \begin{cases} as_t + (1-a), \eta_t^{ij} \\ \eta_t^{ij} \end{cases}$$

Expression 8

In Expression 8, the predicted score value $\eta_{t+1}^{ij}$ of the initial learning node at position (i,j) has an initial value $\eta_0^{ij}$ of 0 and is updated to $as_t+(1-a)\eta_t^{ij}$ or $\eta_t^{ij}$.

In Expression 8, in the initial learning node which is the winner at the time of the t-th learning, the value $as_t+(1-a)\eta_t^{ij}$ calculated using the score $s_t$ obtained at the time of the t-th learning becomes the predicted score value $\eta_{t+1}^{ij}$ at the time of the (t+1)-th learning.

On the other hand, in the initial learning node which is not the winner node at the time of the t-th learning, the predicted score value $\eta_t^{ij}$ at the time of the t-th learning becomes the predicted score value $\eta_{t+1}^{ij}$ at the time of the (t+1)-th learning.

In Expression 8, a denotes a parameter controlling the degree of updating the predicted score value and a value satisfying expression 0<a<1, for example, a=0.1, can be used.

In Expression 6, γ(t) is a coefficient adjusted in accordance with the degree of learning of the network with an additional learning function, that is, the convergence state. γ(t) varies basically with the lapse of time t, that is, the number of times t of learning and is given, for example, in Expression 9.

$$\gamma(t) = \frac{1}{1 + \exp\beta(t_0 - t)}$$

Expression 9

In Expression 9, $t_0$ is the time (number of times of learning) when the network with an additional learning function is expected to be converged and β is a parameter adjusting the variation of the suitable threshold value $p^{ij}$. $t_0$ and β are appropriately adjusted along with the variable Δ used to calculate the learning weight α in Expression 1.

In Expression 9, exp denotes an exponential function for reducing Napier's constant e.

In Expression 9, when β is ∞, γ(t) is the following simple threshold function.

$$\gamma(t) = \begin{cases} 0 \\ 1 \end{cases}$$

Expression 10

That is, in Expression 9, when β is ∞ and the number of times of learning t is less than a predetermined threshold value to (Expression $t_0-t>0$ is satisfied), that is, when the network with an additional learning function is not in the converged state, γ(t)=0. When the number of times of learning t is greater than the predetermined threshold value $t_0$ (Expression $t_0-t<0$ is satisfied), that is, when the network with an additional learning function is in the converged state, γ(t)=1.

In the above-mentioned case, depending on it that the score of the initial learning node which is the winner node is greater than a suitable threshold value of the initial learning node, it is judged whether the input data is suitable for the dynamics held in the initial learning node. The judgment may be performed using the scores of the initial learning nodes in the vicinity of the initial learning node which is the winner node, or the spatial distribution (score distribution) of the entire initial learning nodes in the network with an additional learning function, instead of the initial learning node which is the winner node.

Specifically, for example, when the score of the initial learning node which is the winner node is the secondly highest (best) score, or is not meaningfully higher than the score based on another initial learning node, such as an average value or a mean value of the scores of the initial learning nodes other than the winner node, it can be judged that the input data is not suitable for the dynamics held in the initial learning node, and when the score of the initial learning node which is the winner node is meaningfully higher, it can be judged that the input data is suitable for the dynamics held in the initial learning node.

Depending on it that the difference between the score of the initial learning node which is the winner node and the scores of the other initial learning nodes is equal to or greater than a predetermined threshold value, it is judged whether the score of the initial learning node which is the winner node is meaningfully higher than the scores of the other initial learning nodes. A threshold value varying with the advancement of learning (the lapse of time) can be employed as the predetermined threshold value, similarly to the suitable threshold value.

The suitableness judgment may be performed in a meaningfulness judgment whether the score distribution of the initial learning node which is the winner node and the initial learning nodes in the vicinity thereof or the entire initial learning nodes approximates the Gaussian distribution.

In this case, when it is judged that the score distribution can approximate the Gaussian distribution, it is judged that the input data is not suitable for the dynamics held in the initial learning node. When it is judged that the score distribution cannot approximate the Gaussian distribution, it is judged that the input data is suitable for the dynamics held in the initial learning node.

However, as shown in FIGS. 24 and 25, the (dynamics of the) input data which is not suitable for the dynamics held in the initial learning node in the network with an additional learning function is learned with the additional learning nodes instead of the initial learning nodes. An additional learning node correlated with the initial learning node which is the winner node relative to the input data is employed as the additional learning node for learning (additionally learning) the input data.

In the network with an additional learning function shown in FIG. 22, one initial learning node is correlated with one additional learning node. However, methods other than the method shown in FIG. 22 may be used as the method of correlating the initial learning node with the additional learning node in the network with an additional learning function.

Accordingly, a method of correlating the initial learning node with the additional learning node will be described with reference to FIGS. 26 to 31.

Figure 26:
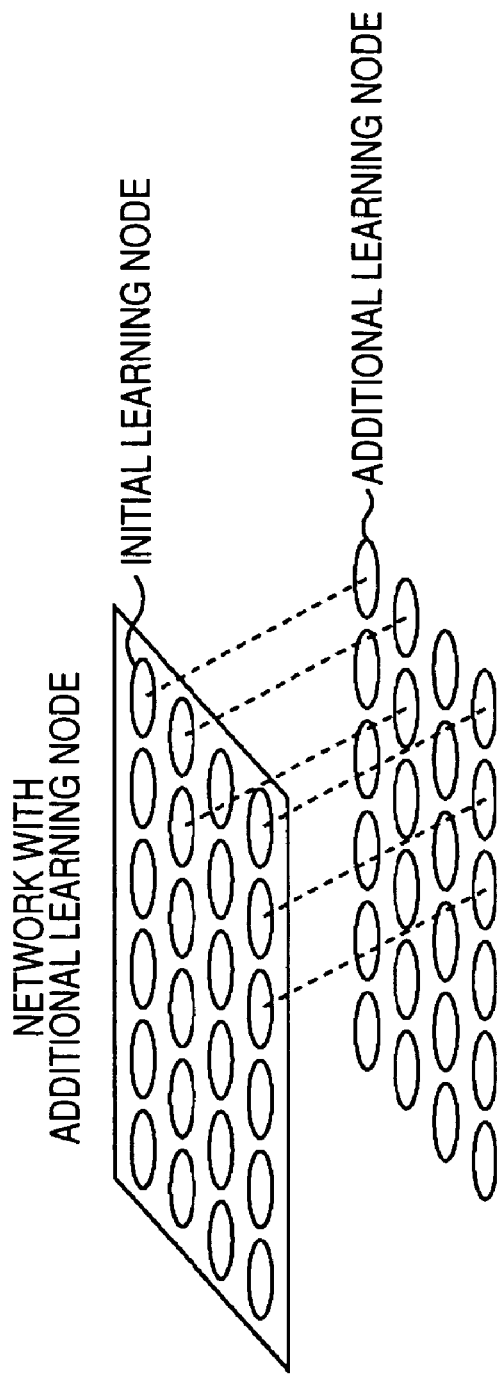
FIG. 26 is a diagram illustrating a first method of correlating an initial learning node with an additional learning node.

FIG. 26 shows a first correlating method between the initial learning node and the additional learning node.

In FIG. 26, similarly to FIG. 22, one initial learning node is correlated with one additional learning node.

As shown in FIG. 26, when one initial learning nodes is correlated with one additional learning node, the input data which is not suitable for the dynamics held in the initial learning node in the network with an additional learning function is learned with the additional learning node correlated with the initial learning node which is the winner node relative to the input data.

Figure 27:
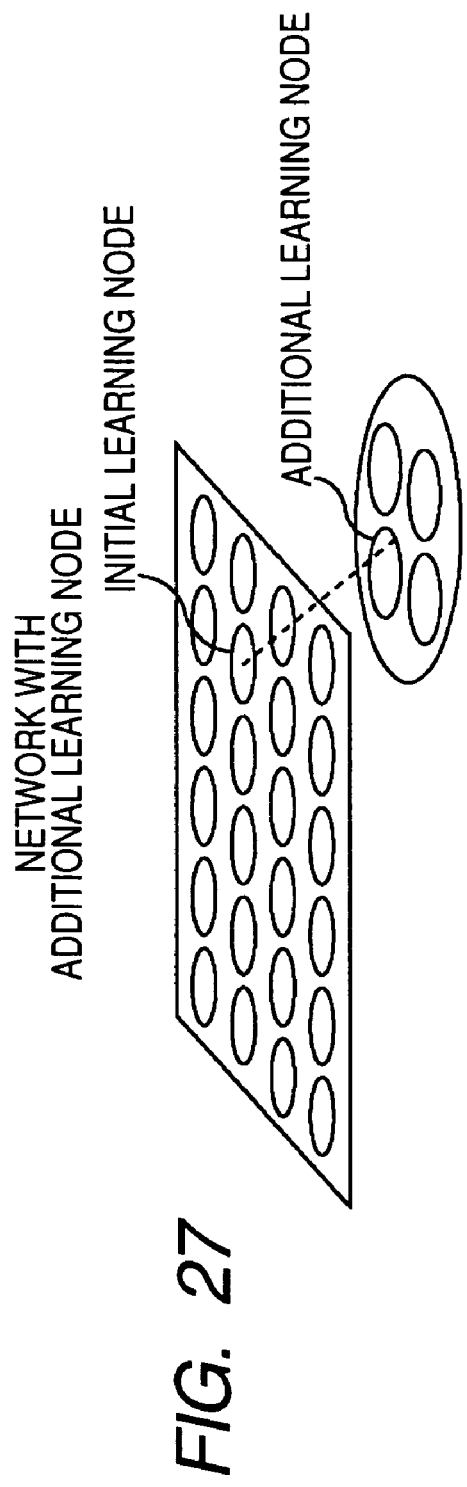
FIG. 27 is a diagram illustrating a second method of correlating an initial learning node with an additional learning node.

FIG. 27 shows a second correlating method between the initial learning node and the additional learning node.

In FIG. 27, the initial learning node with is the winner node is correlated with a plurality of additional learning nodes.

As shown in FIG. 27, when one initial learning node is correlated with a plurality of additional learning node, the input data which is not suitable for the dynamics held in the. initial learning node in the network with an additional learning function is learned with one or all of the plurality of additional learning nodes correlated with the initial learning node which is the winner node relative to the input data.

That is, when the input data is learned with one of a plurality of additional learning nodes correlated with the initial learning node which is the winner node relative to the input data, the winner node relative to the input data is determined among the plurality of additional learning nodes.

Specifically, the scores of the plurality of additional learning nodes relative to the input data are calculated and the additional learning node having the best score is determined as the winner node.

The input data is learned with the additional learning node determined as the winner node. In the learning with the additional learning node, a fixed value not varying with the lapse of time (the number of times of learning) is used as the learning weight α as described above.

On the other hand, when the input data is learned with all of the plurality of additional learning nodes correlated with the initial learning node which is the winner node relative to the input data, a value varying depending on the scores but not varying with the lapse of time (the number of times of learning) is used as the learning weight α.

That is, when the score of the i-th additional learning node among the plurality of additional learning nodes correlated with the initial learning node which is the winner node is expressed by $s_i$ and the learning weight α used to learn the i-th additional learning node is expressed by $α_i$, the learning weight $α_i$ of the i-th additional learning node is obtained, for example, by Expression 11.

$$α_i = α_0 \frac{s_i}{Z} \quad \text{Expression 11}$$

Here, in Expression 11, $α_0$ is an appropriate constant.

In Equation 11, Z is a coefficient for normalization (normalized coefficient), when the number of the additional learning nodes which are correlated with an initial learning node which becomes a winner node is N, the normalized coefficient Z is represented, for example, by Expression 12.

$$Z + \frac{1}{N} \sum_n^N s_n \quad \text{Expression 12}$$

When input data is learned using the entire additional learning nodes which are correlated with an initial learning node which becomes a winner node, a same fixed value may be used as each learning weight α of the plurality of additional learning nodes, but by using a value $α_i$ which changes based on the score in Equation 11, the improvement of the network with an additional learning function is expected.

Here, as an example of a configuration including nodes corresponding to an initial learning node which does not have an additional learning node, by providing a same link as the basic network to the plurality of additional learning nodes correlated with the initial learning node, the plurality of additional learning nodes constructs the basic network when a dynamics storage network is used as the basic network as shown in FIG. 5. In this case, in the correlation in FIG. 27, it can be considered that one initial learning node is correlated with one basic network.

As described above, when one initial learning node is correlated with a plurality of additional learning nodes constructing one basic network, a same learning (self-organizational learning) as the basic network can be made to be done as learning of the plurality of additional learning nodes.

Figure 28:
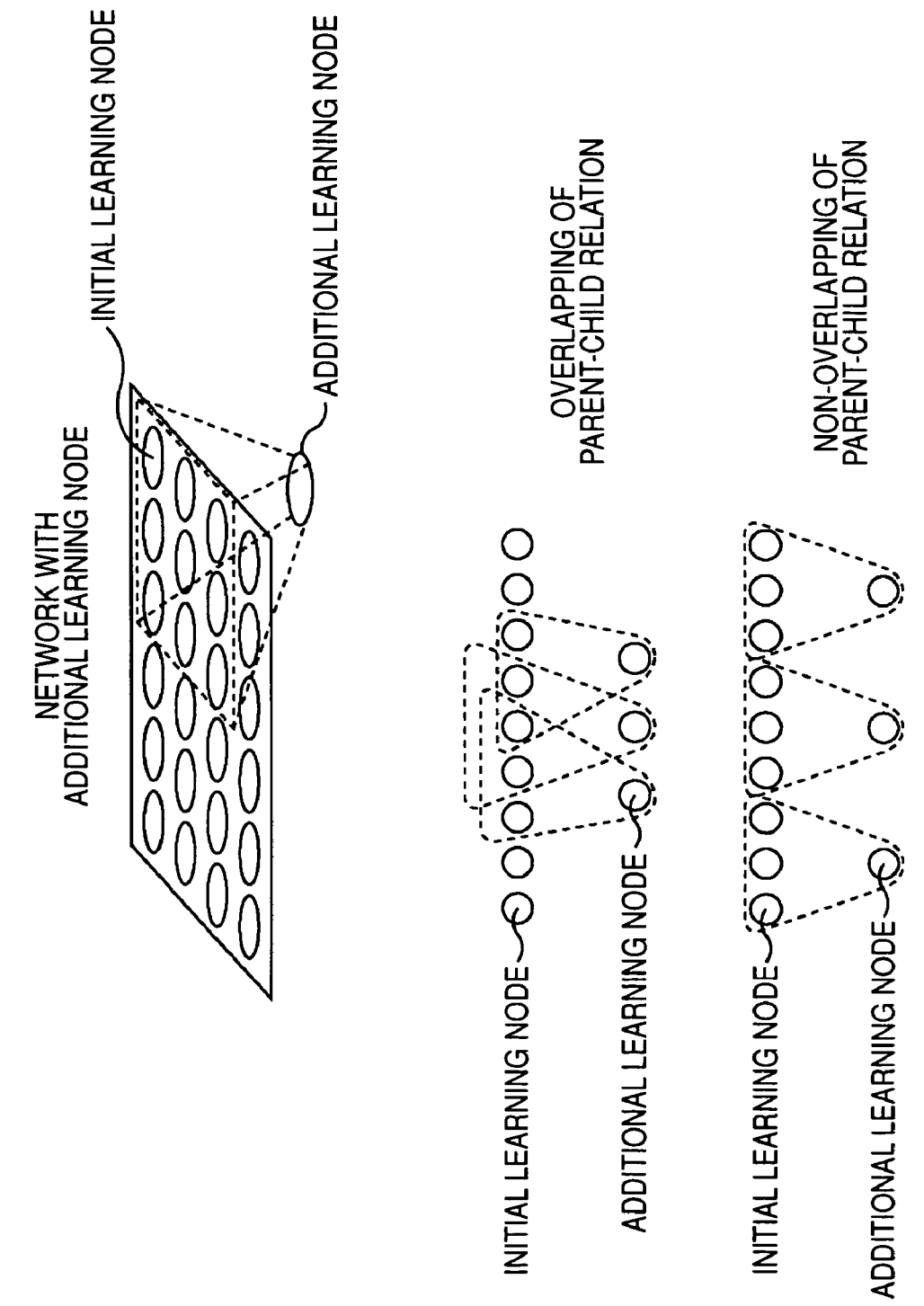
FIG. 28 is a diagram illustrating a third method of correlating an initial learning node with an additional learning node.

Next, FIG. 28 shows a third correlating method between the initial learning node and the additional learning node.

In FIG. 28, a plurality of initial learning nodes is correlated with one additional learning node. That is, FIG. 28, a plurality of initial learning nodes forms an initial learning node group and the initial learning node group is correlated with the additional learning node.

The correlation of the initial learning node group with the additional learning node may be performed so that an initial learning node belonging to one initial learning node group also belongs to another initial learning node group (the second figure from the upside in FIG. 28) or may be performed so that an initial learning node belonging to one initial learning node group does not belong to any other initial learning node group (the third figure from the upside in FIG. 28).

When a plurality of initial learning nodes constituting one initial learning node group is correlated with one additional learning node, a noted initial learning node is correlated with one or plural additional learning nodes.

Accordingly, when a plurality of initial learning nodes is correlated with one additional learning node, the learning of the additional learning node can be performed similarly to the case where one initial learning node is correlated with one additional learning node (FIG. 26) or the case where one initial learning node is correlated with a plurality of additional learning nodes (FIG. 27).

When a plurality of initial learning node constituting one initial learning node group is correlated with one additional learning node, that is, when one initial learning node constituting the network with an additional learning function and including one of a plurality of initial learning node topologically adjacent to each other is correlated with one additional learning node, the input data used for the learning of the additional learning node increases and thus a statistical characteristic of the input data used for the learning of the additional learning node, compared with the case where one initial learning node is correlated with one additional learning node (FIG. 26) or the case where one initial learning node is correlated with a plurality of additional learning nodes (FIG. 27).

When the correlation of one additional learning node with a plurality of initial learning nodes constituting one initial learning node group is performed so that an initial learning node belonging to one initial learning node group also belongs to another initial learning node group (the second figure from the upside in FIG. 28), the topological relation between the initial learning nodes can be more easily reflected than that between the additional learning nodes and thus a smooth transition between the additional learning nodes can be considered. That is, when an additional learning node is the winner node relative to the input data at time t in the recognition process, the additional learning node close to the winner node at time t becomes the winner node relative to the input data at time t+1. Accordingly, it is possible to obtain a trace smoothly varying as a trace of the additional learning node which is the winner node.

Figure 29:
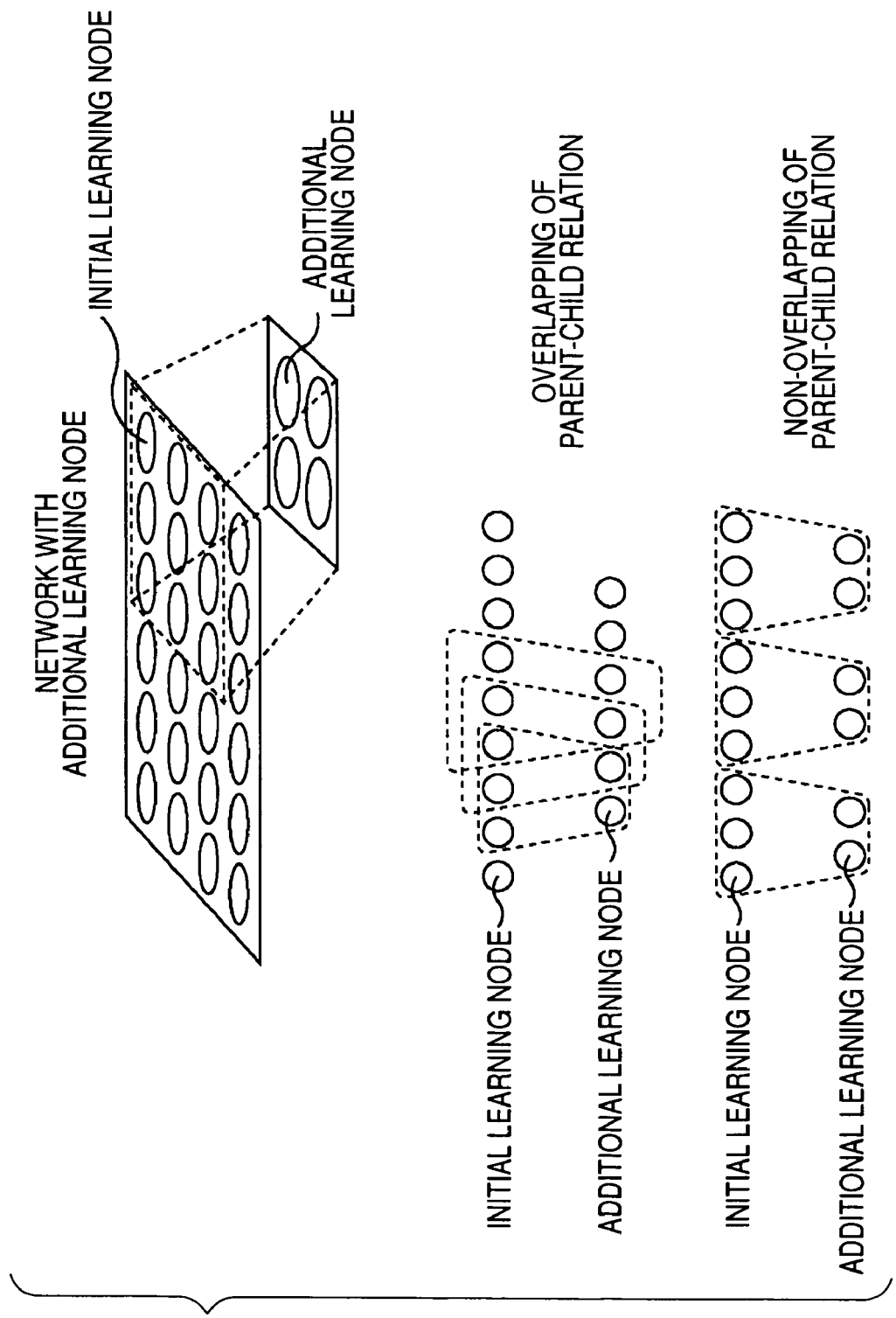
FIG. 29 is a diagram illustrating a fourth method of correlating an initial learning node with an additional learning node.

Next, FIG. 29 shows a fourth correlating method between the initial learning node and the additional learning node.

In FIG. 29, a plurality of initial learning nodes is correlated with a plurality of additional learning nodes. That is, in FIG. 29, a plurality of initial learning nodes forms an initial learning node group, a plurality of additional learning node forms an additional learning node group, and one initial learning node group is correlated with one additional learning node group.

The correlation of one initial learning node group with one additional learning node group may be performed so that an initial learning node belonging to one initial learning node group also belongs to another initial learning node group or so that an additional learning node belonging to one additional learning node group also belongs to another additional learning node group (the second figure from the upside in FIG. 29).

The correlation of one initial learning node group with one additional learning node group may be performed so that an initial learning node belonging to one initial learning node group does not belong to another initial learning node group and an additional learning node belonging to one additional learning node group does not belong to another additional learning node group (the third figure from the upside in FIG. 29).

When a plurality of initial learning nodes constituting one initial learning node group is correlated with a plurality of additional learning nodes constituting one additional learning node group, a noted initial learning node is correlated with a plurality of additional learning nodes.

Accordingly, when a plurality of initial learning nodes is correlated with a plurality of additional learning nodes, the learning of the additional learning node can be performs similarly to the case where one initial learning node is correlated with a plurality of additional learning nodes (FIG. 27).

When the correlation of one initial learning node group with one additional learning node group is performed so that an initial learning node belonging to the initial learning node group also belongs to another initial learning node group, or so that an additional learning node belonging to the additional learning node group also belongs to another additional learning node group (the second figure from the upside in FIG. 29), the topological relation between the initial learning nodes can be easily reflected between the additional learning nodes and thus the smooth transition between the additional learning nodes can be considered.

When the correlation of one initial learning node group with one additional learning node group is performed so that an initial learning node belonging to the initial learning node group does not belong to another initial learning node group and so that an additional learning node belonging to the additional learning node group does not belong to another additional learning node group (the third figure from the upside in FIG. 29), the topology does not exist necessarily between the additional learning nodes. Here, the topology is generated by giving the links like a basic network between the additional learning nodes to form a basic network with a plurality of additional learning nodes.

Next, in FIGS. 24 and 25, when the initial learning nodes are correlated with the additional learning nodes and the input data is not suitable for the initial learning node which is the winner node, the additional learning node correlated with the initial learning node as the winner node is specified as a target node for learning the input data on the basis of the winner node and the input data is learned (additionally learned) with the target node. However, the specification of the target node may not be performed on the basis of (the initial learning node as) the winner node, but may be performed on the basis of the distribution of scores (score distribution) of the initial learning node relative to the input data.

Figure 30:
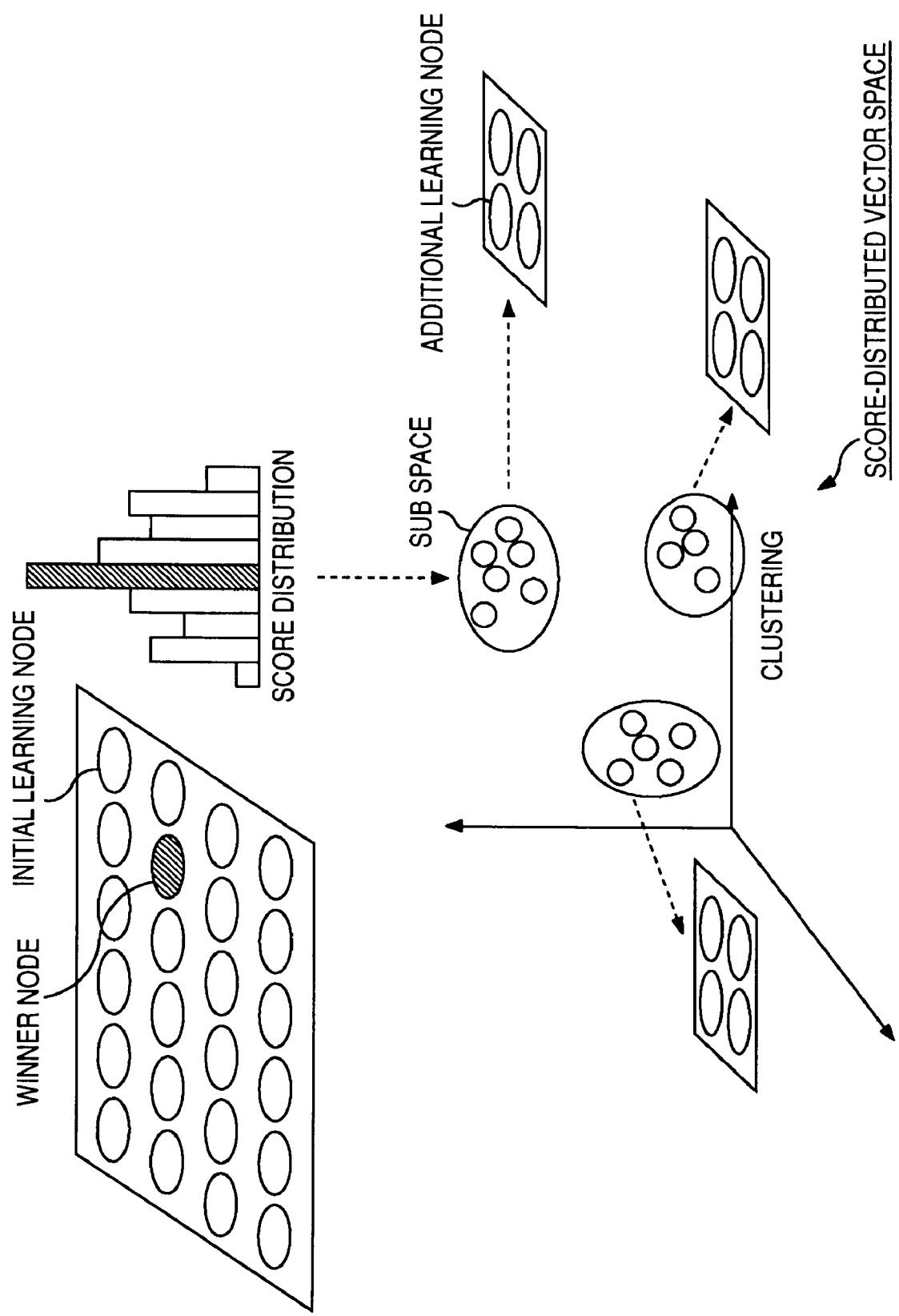
FIG. 30 is a diagram illustrating a fifth method of correlating an initial learning node with an additional learning node.

That is, FIG. 30 is a diagram illustrating a method of specifying the target node on the basis of the score distribution of the initial learning nodes relative to the input data.

The score distribution used to specify the target node may be a distribution of scores of all the initial learning nodes in the network with an additional learning function or may be a distribution of scores of some initial learning nodes in the network with an additional learning function, like the initial learning node which is the winner node relative to the input data and the initial learning nodes in the vicinity of the initial learning node.

Here, for the purpose of simple explanation, the score distribution of all the initial learning nodes in the network with an additional learning function is employed as the score distribution used to specify the target node.

Here, it is assumed that a vector including the scores of all the initial learning nodes in the network with an additional learning function as components is called a score distribution vector. Then, when the target node is specified on the basis of the score distribution of the initial learning nodes relative to the input data, a space of the score distribution vector (score distribution vector space) is divided into several sub spaces and the sub spaces are correlated with one or more additional learning nodes.

Then, in specifying the target node, as shown in FIG. 30, a clustering process of the score distribution vector, which detects which sub space of the score distribution vector space the score distribution vector relative to the input data belongs to, that is, the vector quantization, is performed and the additional learning node correlated with the sub space to which the score distribution vector belongs and which is obtained as the result of the clustering process (the vector quantization) is specified as the target node.

The score distribution vector used to specify the target node on the basis of the score distribution may be a vector having a small number of dimensions through analysis of main components or the like.

The score distribution vector space can be divided into sub spaces having the same shape and size by dividing the score distribution vector space into sub spaces with a constant gap. In addition, for example, a k-means method may be used as the method of dividing the score distribution vector space into several sub spaces.

When the k-means method is used to divide the score distribution vector space into several sub spaces, it is necessary to collects a certain number of input data not suitable for the initial learning node as the winner node, to acquire a score distribution vector relative to the input data, and to perform the preparation (learning) of a code book (which divides the score distribution vector space into sub spaces) by means of the k-means method using the score distribution vector.

Here, the recognition process using the network with an additional learning function can be performed similarly to the case where a basic network is a target. That is, the recognition process using the network with an additional learning function as a target can be performed similarly to the recognition process of the basic network as a target, by considering all the learning nodes as the nodes in the basic network without distinguishing the initial learning nodes and the additional learning nodes. The same is true of the creation process and the recognition and creation process using the network with an additional learning function as a target.

The recognition process using the network with an additional learning function may be performed as follows, with the initial learning node and the additional learning node distinguished from each other.

That is, in the recognition process using the network with an additional learning function as a target, recognition unit 1-6 calculates a score relative to the input data to be recognized for only the initial learning node among the initial learning node and the additional learning node and determines the initial learning node having the best score as a temporary winner node.

On the basis of the score of the initial learning node which is the temporary winner node, similarly to step 24-1 in FIG. 24 (step 25-2 in FIG. 25), recognition unit 1-6 judges whether the input data to be recognized is suitable for the dynamics held in the initial learning node which is the temporary winner node, depending on it that the score is equal to or greater than the suitable threshold value of the initial learning node which is the winner node.

Then, when it is judged that the input data to be recognized is suitable for the dynamics held in the initial learning node which is the temporary winner node, that is, when the score of the initial learning node which is the temporary winner node is equal to or greater than the suitable threshold value of the initial learning node which is the temporary winner node, recognition unit 1-6 determines the temporary winner node as the final winner node and outputs information indicating the final winner node as the recognition result of the input data to be recognized.

On the other hand, when it is judged that the input data to be recognized is not suitable for the dynamics held in the initial learning node which is the temporary winner node, that is, when the score of the initial learning node which is the temporary winner node is smaller than the suitable threshold value of the initial learning node which is the temporary winner node, recognition unit 1-6 determines the additional learning node, which is correlated with the initial learning node which is the temporary winner node, as the final winner node and outputs information indicating the final winner node as the recognition result of the input data to be recognized.

When the initial learning node which is a temporary winner node is correlated with a plurality of additional learning nodes, an additional learning node of which the score for the input data to be recognized is best among the plurality of additional learning nodes is determined as the final winner node.

The recognition process in the recognition creation process can be performed similarly.

Next, a series of processes described above may be performed in hardware or in software. When the series of processes are performed in software, a program constituting the software is installed in a general-purpose computer or the like.

FIG. 31 illustrates a structural example of a computer in which the program for performing the series of processes described above is installed.

The program may be recorded in advance in hard disc 105 or ROM 103 as a recording medium built in the computer.

Alternatively, the program may be temporarily or permanently stored in removable recording medium 111 such as a flexible disc, a CD-ROM (Compact Disc Read Only Memory), an MO (Magneto-Optical) disc, a DVD (Digital Versatile Disc), a magnetic disc, and a semiconductor memory. Such removable recording medium 111 can be provided as so-called package software.

As well as installing the program into the computer from removable recording medium 111 described above, the program may be transmitted to the computer through a satellite for digital satellite broadcasting from a download site by wireless or may be transmitted to the computer through a network such as LAN (Local Area Network) and Internet, and communication unit 108 of the computer may receive the program transmitted in this way and may install the received program in hard disc 105 built therein.

A computer has CPU (Central Processing Unit) 102 built therein. Input/output interface 110 is connected to CPU 102 through bus 101 and CPU 102 executes the program stored in ROM (Read Only Memory) 103 when a command is input by a user's manipulation of input unit 107 including a keyboard, a mouse, a microphone, and the like. Alternatively, CPU 102 loads into RAM (Random Access Memory) 104 the program which is stored in hard disc 105, the program which is transmitted from a satellite or a network, received by communication unit 108, and installed in hard disc 105, or the program which is read from removable recording medium 111 mounted to drive 109 and installed in hard disc 105 and executes the loaded program. Accordingly, CPU 102 executes the process corresponding to the above-mentioned flowchart or the process performed by the configuration of the above-mentioned block diagram. The CPU 102 outputs the process result from output unit 106 including an LCD (Liquid Crystal Display) or a speaker through input/output interface 110, transmits the process result from communication unit 108, or records the process result in hard disc 105, as needed.

Here, in this description, the process step of describing programs making a computer to perform a variety of processes may not be necessarily performed in a time-series manner in accordance with the procedure described in the flowchart, and may include process steps (for example, a parallel process or a process using an object) performed in parallel or individually The program may be processed by a computer or may be processed in a distributed manner by a plurality of computers. The program may be transmitted to a remote computer and executed by the remote computer.

In this embodiment, the initial learning node and the additional learning node constituting the network with an additional learning function have the same configuration, but the additional learning node may have a configuration different from that of the initial learning node. That is, the additional learning node may be formed of a learning machine learning time-series data, such as a learning machine using a non-recurrent neural network or a support vector regression (SVR), other than the RNN.

The invention is not limited to the above-mentioned embodiments, but may be modified in various forms without departing from the gist of the invention.

It should be understood by those skilled in the art that various modifications, combinations, sub-combinations and alternations may occur depending on design requirements and other factors insofar as they are within the scope of the appended claims or the equivalents thereof.

What is claimed is:

1. A learning system comprising:
    network storage means for storing a network including a plurality of nodes, each of which holds a dynamics; and
    learning means for self-organizationally updating the dynamics of the network on the basis of measured time-series data.

2. The learning system of claim 1, wherein the dynamics is modeled by a dynamical approximate model having an inner state quantity.

3. The learning system of claim 1, wherein the dynamics is modeled by a recurrent neural network.

4. The learning system of claim 1, wherein the learning means determines a winner node which is a node corresponding to a dynamics most suitable for the measured time-series data,
   determines a learning weight of the nodes with reference to the winner node, and
   updates the dynamics held by the nodes so as to be close to the measured time-series data depending on the learning weight of the respective nodes.

5. The learning system of claim 4, wherein the learning means determines the learning weight of the respective nodes on the basis of correlations between the winner node and the nodes.

6. The learning system of claim 4, wherein the learning means determines the learning weight of the respective nodes on the basis of a rank corresponding to the degree by which the measured time-series data are suitable for the dynamics held by the respective nodes.

7. The learning system of claim 4, further comprising learning data storage means for storing learning data corresponding to the dynamics held by the respective nodes,
   wherein the learning means updates the learning data by mixing the measured time-series data with the learning data stored in the learning data storage means and updates the dynamics on the basis of the updated learning data.

8. The learning system of claim 1, wherein the network can include two types of nodes of an initial learning node prepared in advance and an additional learning node added later or prepared in advance, and
   wherein the learning means determines whether the measured time-series data are suitable for the dynamics held in the initial learning node,
   performs a learning operation of the initial learning node, which includes self-organizationally updating the dynamics held in the initial learning node on the basis of the measured time-series data when determining that the measured time-series data are suitable for the dynamics held in the initial learning node, and
   performs a learning operation of the additional learning node, which includes updating the dynamics held in the additional learning node on the basis of the measured time-series data when determining that the measured time-series data are not suitable for the dynamics held in the initial learning node.

9. The learning system of claim 8, wherein the learning means performs a learning operation of the initial learning node, which includes:
   determining a winner node which is an initial learning node corresponding to a dynamics most suitable for the measured time-series data,
   determining a learning weight of the respective initial learning nodes relative to the winner node, and
   updating the dynamics held in the respective initial learning nodes so as to be close to the measured time-series data in accordance with the learning weights of the respective initial learning nodes.

10. The learning system of claim 8, wherein the learning means determines whether the measured time-series data is suitable for the dynamics held in the initial learning node, on the basis of the degree by which the measured time-series data are suitable for the dynamics held in the winner node as the initial learning node corresponding to the dynamics most suitable for the measured time-series data.

11. The learning system of claim 8, wherein the learning means performs a learning operation of the additional learning node, which includes:
   determining a winner node which is the initial learning node corresponding to the dynamics most suitable for the measured time-series data;
   specifying an additional learning node to be learned on the basis of the winner node; and
   updating the dynamics held in the additional learning node so as to be close to the measured time-series data.

12. The learning system of claim 8, wherein the learning operation of the additional learning node is performed which includes:
   calculating scores indicating the degree by which the dynamics held in the initial learning node is suitable for the measured time-series data;
   specifying an additional learning node to be learned on the basis of a distribution of the scores; and
   updating the dynamics held in the additional learning node so as to be close to the measured time-series data.

13. A recognition device comprising:
   network storage means for storing a network including a plurality of nodes, in which a dynamical approximate model having an inner state quantity is set as a node and a dynamics is held in each node; and
   recognition means for determining a winner node which is a node holding the dynamics most suitable for measured time-series data while updating the inner state quantity on the basis of the measured time-series data, and outputting information indicating the winner node as a recognition result of the measured time-series data.

14. A creation device comprising:
   network storage means for storing a network including a plurality of nodes, in which a dynamical approximate model having an inner state quantity is set as a node and a dynamics is held in each node; and
   creation means for determining a creation node which is a node used to create time-series data and creating the time-series data while updating the inner state quantity of the creation node.

15. A recognition and creation device comprising:
   network storage means for storing a network including a plurality of nodes, in which a dynamical approximate model having an inner state quantity is set as a node and a dynamics is held in each node;
   recognition means for determining a winner node which is a node holding the dynamics most suitable for measured time-series data while updating the inner state quantity on the basis of the measured time-series data, and outputting information indicating the winner node as a recognition result of the measured time-series data;
   inner state storage means for storing the inner state quantity acquired in determining the winner node; and
   creation means for determining the winner node as a creation node which is a node used to create time-series data on the basis of the recognition result, determining the inner state quantity of the creation node on the basis of the value stored in the inner state storage means, and creating the time-series data while updating the inner state quantity of the creation node.

16. The recognition and creation device of claim 15, wherein the inner state storage means stores an updated value of the inner state quantity finally acquired when the winner node is determined, and wherein the creation means creates the time-series data while updating the inner state quantity of the creation node by using the value stored in the inner state storage means as an initial value of the inner state quantity of the creation node.

17. The recognition and creation device of claim 15, wherein the inner state storage means stores an initial value of the inner state quantity when the winner node is determined, and wherein the creation means creates the time-series data while updating the inner state quantity of the creation node by using the value stored in the inner state storage means as an initial value of the inner state quantity of the creation node.

18. A learning method comprising the step of:
self-organizationally updating dynamics of a network including a plurality of nodes, each of which holds a dynamics, on the basis of measured time-series data.

19. A program having a computer execute a learning process comprising the step of:
self-organizationally updating dynamics of a network including a plurality of nodes, each of which holds a dynamics, on the basis of measured time-series data.

20. A recognition method comprising the step of:
determining a winner node which is a node holding the dynamics most suitable for measured time-series data while updating the inner state quantity on the basis of the measured time-series data, among nodes of a network including a plurality of nodes in which a dynamical approximate model having an inner state quantity is set as a node and a dynamics is held in each node, and outputting information indicating the winner node as a recognition result of the measured time-series data.

21. A program having a computer execute a recognition process comprising the step of:
determining a winner node which is a node holding the dynamics most suitable for measured time-series data while updating the inner state quantity on the basis of the measured time-series data, among nodes of a network including a plurality of nodes in which a dynamical approximate model having an inner state quantity is set as a node and a dynamics is held in each node, and outputting information indicating the winner node as a recognition result of the measured time-series data.

22. A creation method comprising the step of:
determining a creation node which is a node used to create time-series data, among nodes of a network including a plurality of nodes in which a dynamical approximate model having an inner state quantity is set as a node and a dynamics is held in each node, and creating the time-series data while updating the inner state quantity of the creation node.

23. A program having a computer execute a creation process comprising the step of:
determining a creation node which is a node used to create time-series data, among nodes of a network including a plurality of nodes in which a dynamical approximate model having an inner state quantity is set as a node and a dynamics is held in each node, and creating the time-series data while updating the inner state quantity of the creation node.

24. A recognition and creation method comprising the steps of:
determining a winner node which is a node holding the dynamics most suitable for measured time-series data while updating the inner state quantity on the basis of the measured time-series data, among nodes of a network including a plurality of nodes in which a dynamical approximate model having an inner state quantity is set as a node and a dynamics is held in each node, and outputting information indicating the winner node as a recognition result of the measured time-series data;
storing the inner state quantity acquired in determining the winner node in inner state storage means; and
determining the winner node as a creation node which is a node used to create time-series data on the basis of the recognition result, determining the inner state quantity of the creation node on the basis of the value stored in the inner state storage means, and creating the time-series data while updating the inner state quantity of the creation node.

25. A program having a computer execute a recognition and creation process comprising the steps of:
determining a winner node which is a node holding the dynamics most suitable for measured time-series data while updating the inner state quantity on the basis of the measured time-series data, among nodes of a network including a plurality of nodes in which a dynamical approximate model having an inner state quantity is set as a node and a dynamics is held in each node, and outputting information indicating the winner node as a recognition result of the measured time-series data;
storing the inner state quantity acquired in determining the winner node in inner state storage means; and
determining the winner node as a creation node which is a node used to create time-series data on the basis of the recognition result, determining the inner state quantity of the creation node on the basis of the value stored in the inner state storage means, and creating the time-series data while updating the inner state quantity of the creation node.

26. A learning system comprising:
a network storage unit that stores a network including a plurality of nodes, each of which holds a dynamics; and
a learning unit self-organizationally updating the dynamics of the network on the basis of measured time-series data.

27. A recognition device comprising:
a network storage unit that stores a network including a plurality of nodes, in which a dynamical approximate model having an inner state quantity is set as a node and a dynamics is held in each node; and
a recognition unit that determines a winner node which is a node holding the dynamics most suitable for measured time-series data while updating the inner state quantity on the basis of the measured time-series data, and outputs information indicating the winner node as a recognition result of the measured time-series data.

28. A creation device comprising:
a network storage unit that stores a network including a plurality of nodes, in which a dynamical approximate model having an inner state quantity is set as a node and a dynamics is held in each node; and
a creation unit that determines a creation node which is a node used to create time-series data and creates the time-series data while updating the inner state quantity of the creation node.

29. A recognition and creation device comprising:
a network storage unit that stores a network including a plurality of nodes, in which a dynamical approximate model having an inner state quantity is set as a node and a dynamics is held in each node;
a recognition unit that determines a winner node which is a node holding the dynamics most suitable for measured time-series data while updating the inner state quantity on the basis of the measured time-series data, and outputs information indicating the winner node as a recognition result of the measured time-series data;

an inner state storage unit that stores the inner state quantity acquired in determining the winner node; and a creation unit that determines the winner node as a creation node which is a node used to create time-series data on the basis of the recognition result, determines the inner state quantity of the creation node on the basis of the value stored in the inner state storage unit, and creates the time-series data while updating the inner state quantity of the creation node.

30. A recognition and creation method comprising the steps of:

determining a winner node which is a node holding the dynamics most suitable for measured time-series data while updating the inner state quantity on the basis of the measured time-series data, among nodes of a network including a plurality of nodes in which a dynamical approximate model having an inner state quantity is set as a node and a dynamics is held in each node, and outputting information indicating the winner node as a recognition result of the measured time-series data;

storing the inner state quantity acquired in determining the winner node in an inner state storage unit; and determining the winner node as a creation node which is a node used to create time-series data on the basis of the recognition result, determining the inner state quantity of the creation node on the basis of the value stored in the inner state storage unit, and creating the time-series data while updating the inner state quantity of the creation node.

* * * * *